(12) United States Patent
Nishimura et al.

(10) Patent No.: US 10,473,456 B2
(45) Date of Patent: Nov. 12, 2019

(54) DRIVING CONTROL SYSTEM AND DRIVING CONTROL METHOD

(71) Applicant: Panasonic Intellectual Property Management Co., Ltd., Osaka (JP)

(72) Inventors: Kazuko Nishimura, Kyoto (JP); Yasuo Miyake, Osaka (JP); Yoshiaki Satou, Kyoto (JP); Osamu Shibata, Hyogo (JP); Hiroshi Iwai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/217,076

(22) Filed: Dec. 12, 2018

(65) Prior Publication Data

US 2019/0113332 A1 Apr. 18, 2019

Related U.S. Application Data

(63) Continuation of application No. PCT/JP2018/000608, filed on Jan. 12, 2018.

(30) Foreign Application Priority Data

Jan. 25, 2017 (JP) .................................. 2017-011651
Jan. 25, 2017 (JP) .................................. 2017-011652

(51) Int. Cl.
*G01B 11/14* (2006.01)
*G01P 3/36* (2006.01)
(Continued)

(52) U.S. Cl.
CPC .............. *G01B 11/14* (2013.01); *G01B 11/00* (2013.01); *G01P 3/36* (2013.01); *G06T 7/20* (2013.01);
(Continued)

(58) Field of Classification Search
CPC .......... G01B 11/14; G01B 11/00; G06T 7/70; G06T 7/20; G01P 3/36; G08G 1/09;
(Continued)

(56) References Cited

U.S. PATENT DOCUMENTS

2010/0027847 A1 2/2010 Ess et al.
2011/0109745 A1 5/2011 Nakatani et al.
(Continued)

FOREIGN PATENT DOCUMENTS

JP 1-077377 3/1989
JP 10-257474 9/1998
(Continued)

OTHER PUBLICATIONS

International Search Report of PCT application No. PCT/JP2018/000608 dated Mar. 27, 2018.

*Primary Examiner* — Jamil Ahmed
(74) *Attorney, Agent, or Firm* — McDermott Will & Emery LLP

(57) ABSTRACT

A driving control system includes: an imaging device that is installed on a moving body and that images a target object in a first frame period a plurality of times to generate a multiple-exposure image data including a first image data and a second image data; and a processor that detects a relative motion state of the moving body with respect to the target object, based on the first image data and the second image data. The imaging device images the target object with a first sensitivity in a first exposure period in the first frame period to generate the first image data and images the target object with a second sensitivity in a second exposure period in the first frame period to generate the second image data, the second exposure period being different from the first exposure period, the second sensitivity being different from the first sensitivity.

21 Claims, 37 Drawing Sheets

(51) Int. Cl.
- *G06T 7/20* (2017.01)
- *G06T 7/70* (2017.01)
- *G08G 1/09* (2006.01)
- *G08G 1/16* (2006.01)
- *H04N 5/232* (2006.01)
- *H04N 5/374* (2011.01)
- *G01B 11/00* (2006.01)
- *H04N 5/351* (2011.01)
- *H04N 5/355* (2011.01)

(52) U.S. Cl.
CPC ............. *G06T 7/70* (2017.01); *G08G 1/09* (2013.01); *G08G 1/16* (2013.01); *H04N 5/232* (2013.01); *H04N 5/351* (2013.01); *H04N 5/35581* (2013.01); *H04N 5/374* (2013.01)

(58) Field of Classification Search
CPC .......... G08G 1/16; H04N 5/232; H04N 5/351; H04N 5/35581; H04N 5/374
See application file for complete search history.

(56) References Cited

U.S. PATENT DOCUMENTS

| | | |
|---|---|---|
| 2013/0271631 A1 | 10/2013 | Tatsuzawa et al. |
| 2016/0161611 A1 | 6/2016 | Ito et al. |
| 2016/0307054 A1 | 10/2016 | Takemura et al. |
| 2017/0230563 A1 | 8/2017 | Satou et al. |
| 2019/0246053 A1 | 8/2019 | Beiley et al. |

FOREIGN PATENT DOCUMENTS

| | | | | |
|---|---|---|---|---|
| JP | 11-242735 | 9/1999 | | |
| JP | 2002-148270 | 5/2002 | | |
| JP | 2007-081806 | 3/2007 | | |
| JP | 2009-257982 | 11/2009 | | |
| JP | 2010-003253 | 1/2010 | | |
| JP | 2012-088217 | 5/2012 | | |
| JP | 2013-150304 | 8/2013 | | |
| JP | 2013-223043 | 10/2013 | | |
| JP | 2015-095886 | 5/2015 | | |
| JP | 2015133078 A | * | 7/2015 | ............... G06T 1/00 |
| JP | 2015-158418 | 9/2015 | | |
| JP | 2016-225805 | 12/2016 | | |
| JP | 2017-005300 | 1/2017 | | |
| WO | 2010/004689 | 1/2010 | | |
| WO | 2015/025497 | 2/2015 | | |
| WO | 2017/010047 | 1/2017 | | |

* cited by examiner

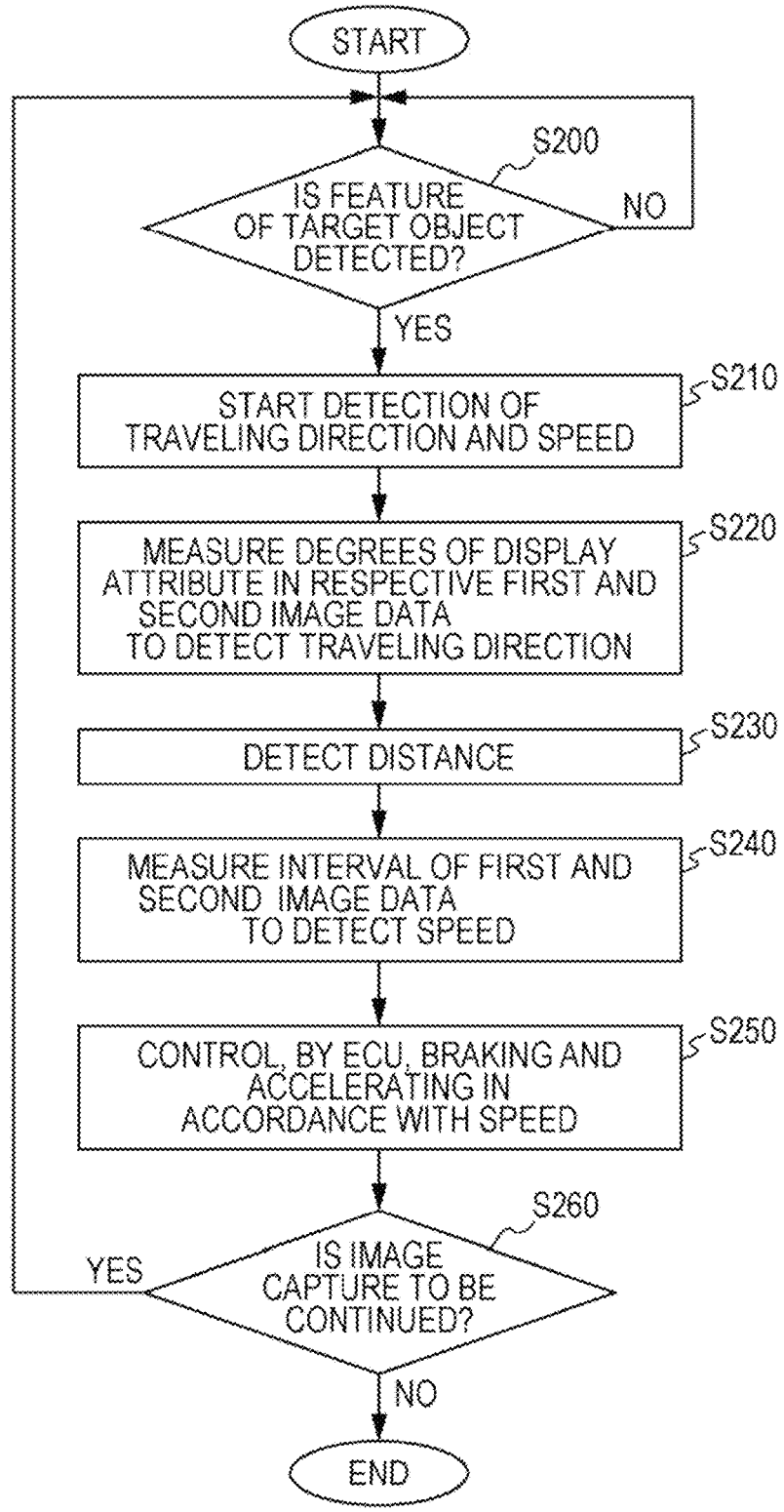

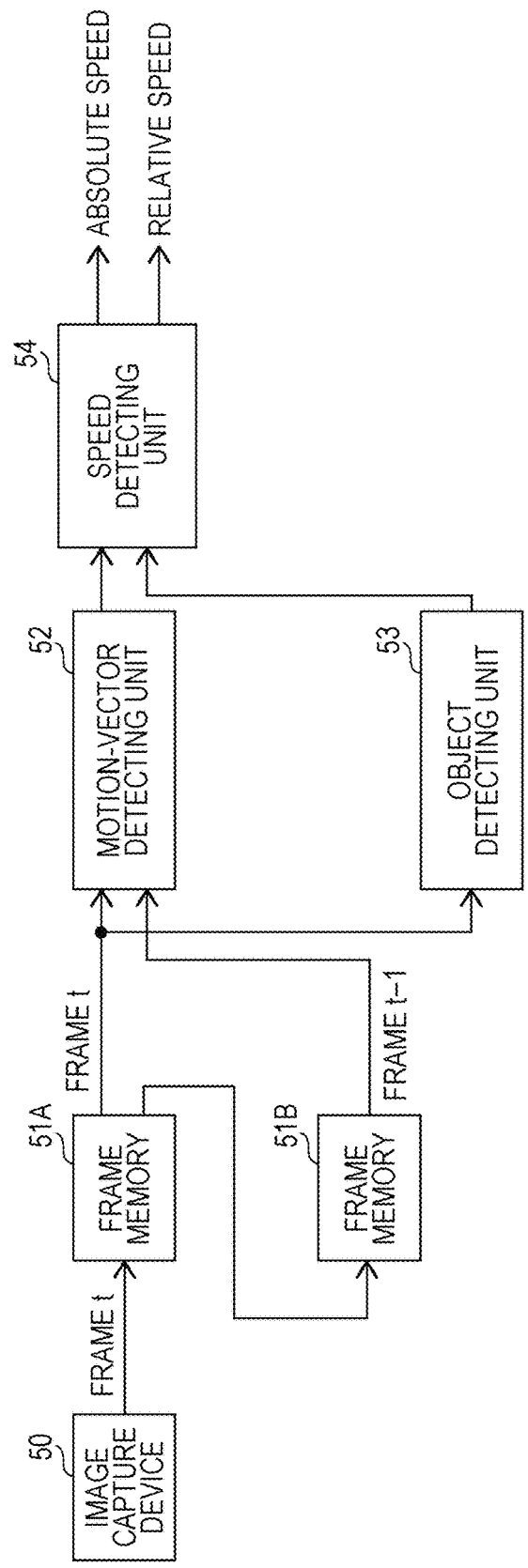

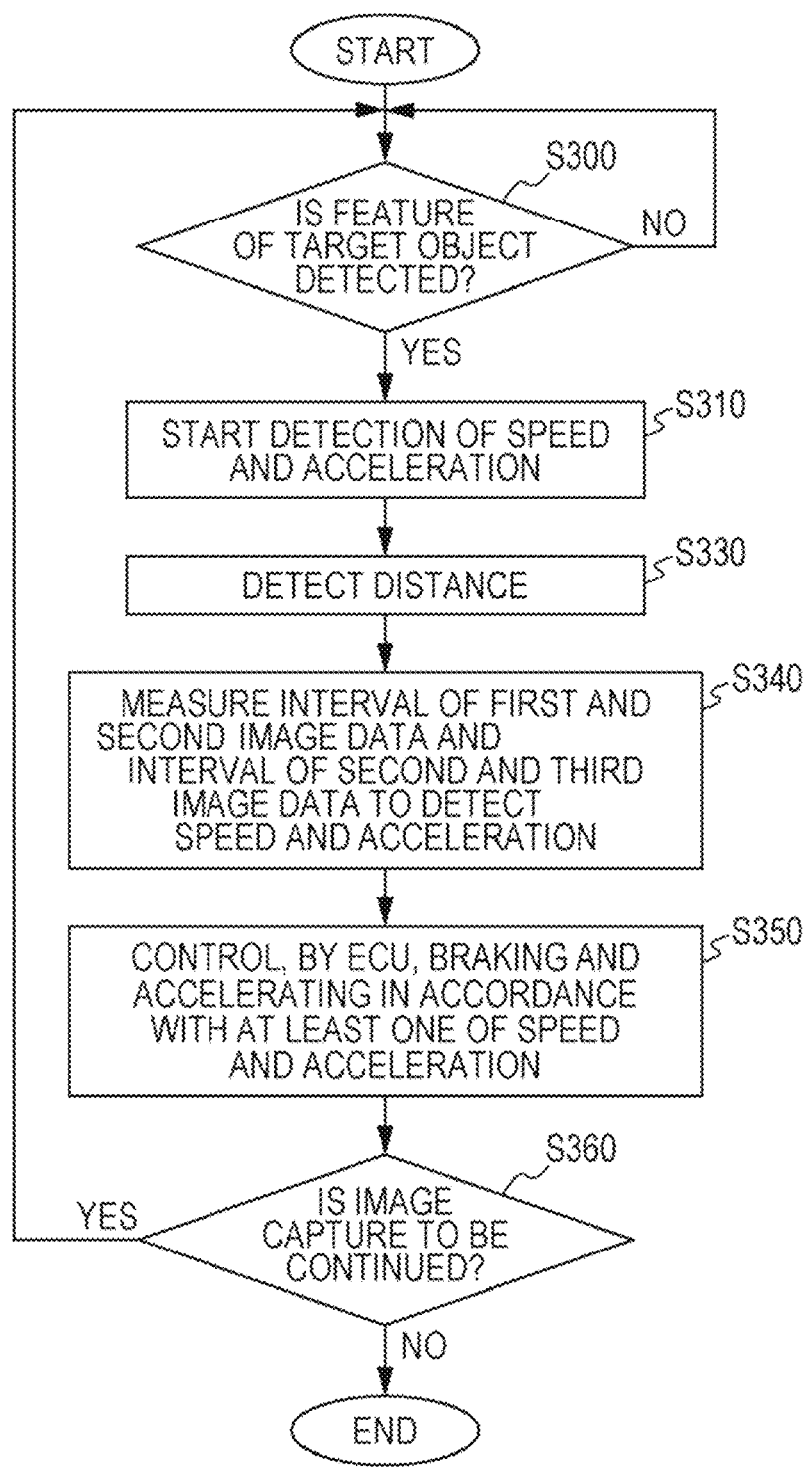

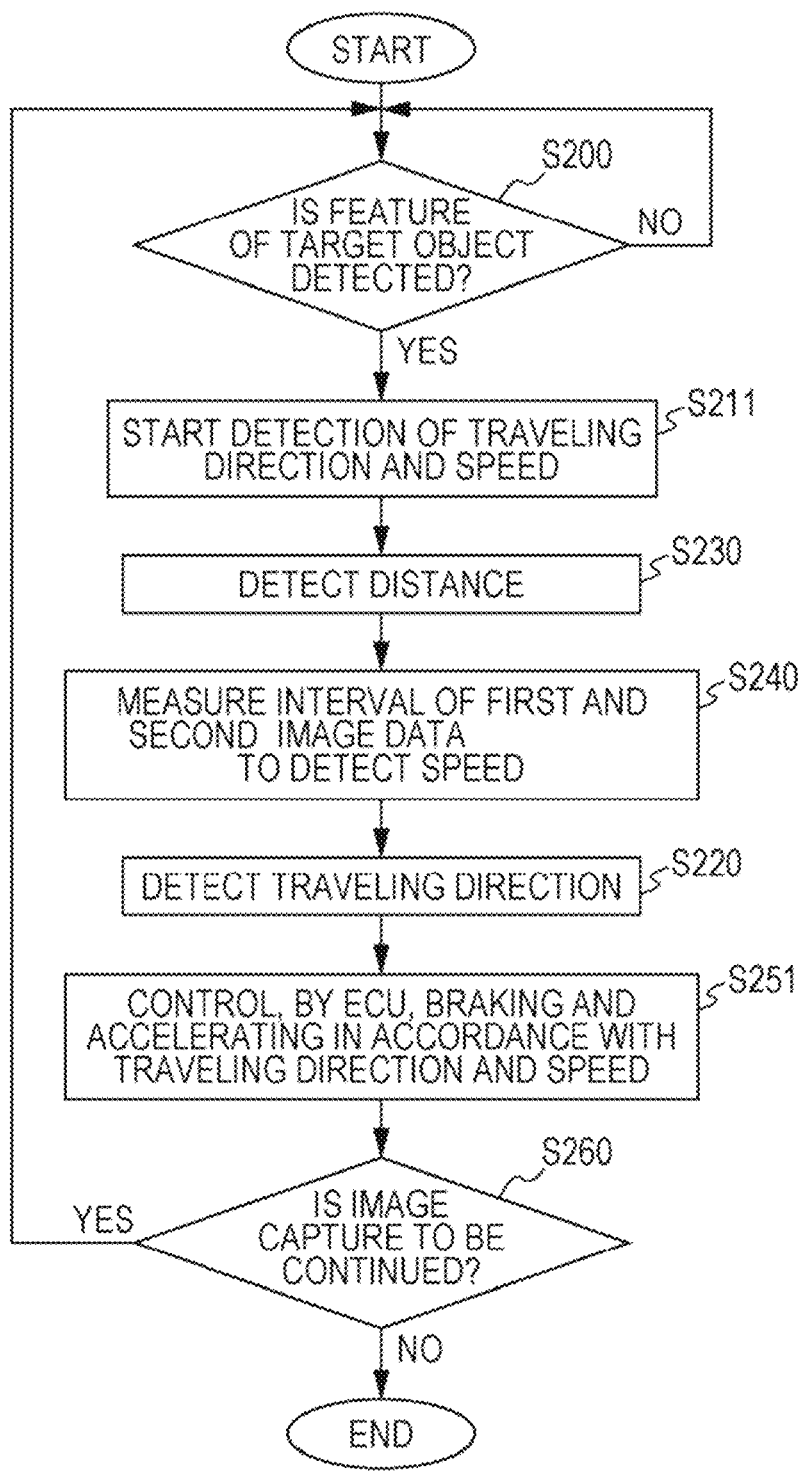

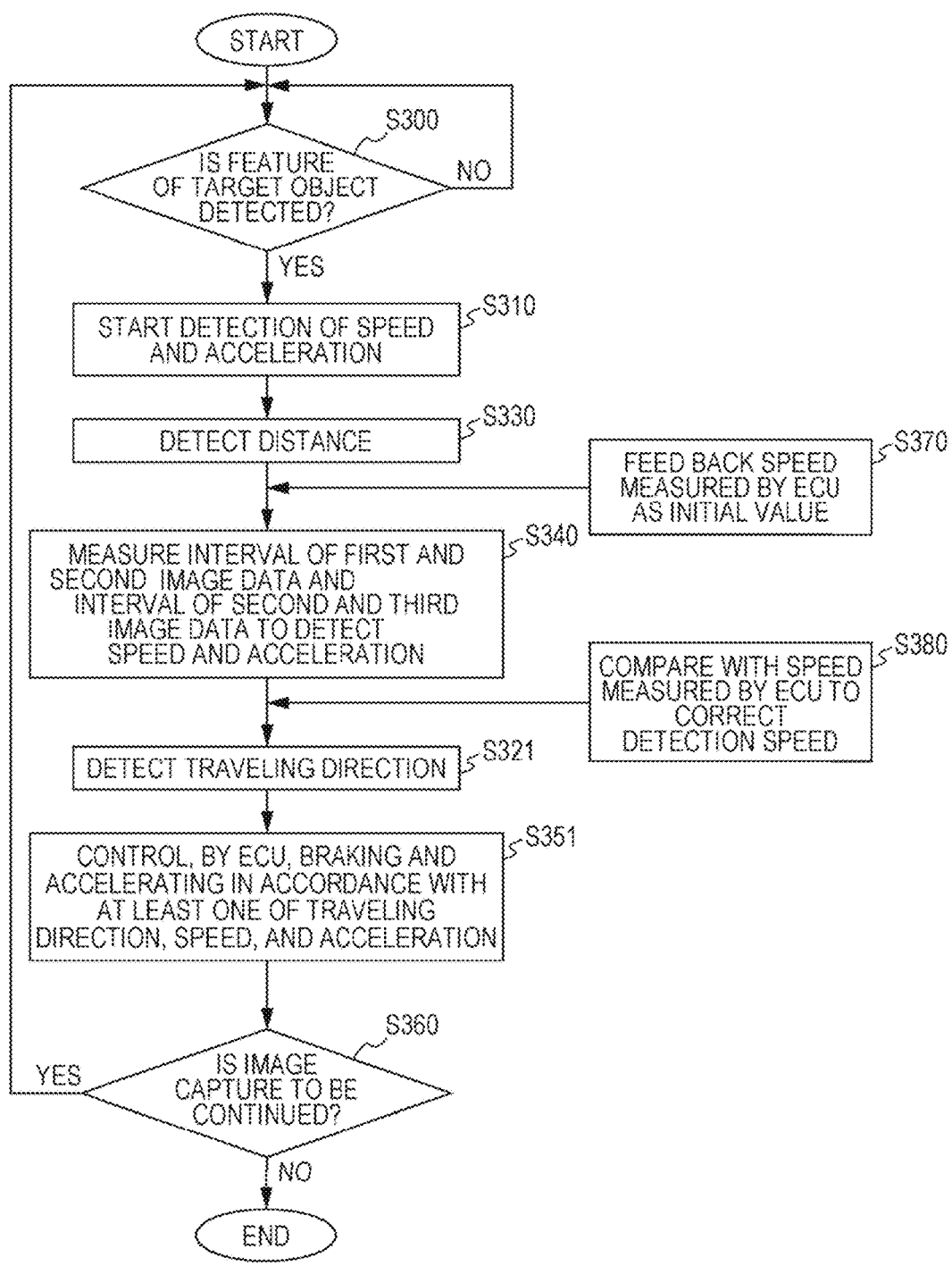

DRIVING CONTROL SYSTEM AND DRIVING CONTROL METHOD

BACKGROUND

1. Technical Field

The present disclosure relates to a driving control system and a driving control method that assist driving of a moving body, such as a vehicle or an aircraft.

2. Description of the Related Art

Various traveling assistance systems that assist vehicle-traveling control have been proposed in recent years. In order to control accelerating, braking, and steering, each traveling assistance system requires information about, for example, a vehicle speed, a distance to an obstacle, and so on. The vehicle speed can generally be measured based on the rotational speed (rpm) of wheels.

Japanese Unexamined Patent Application Publication No. 2007-81806 discloses an imaging system that can measure a distance to an obstacle by stereo imaging. The imaging system includes a plurality of imaging devices including imaging elements having photoelectric conversion characteristics that differ depending on subject illuminance. Making imaging timings of a plurality of imaging devices and so on to match each other enables a stereo image to be accurately processed at high speed.

SUMMARY

In recent years, the traveling assistance systems have evolved dramatically.

Expectations for such systems are high, and many requests for further improving the systems have been received.

Thus, there are demands for obtaining information with higher accuracy.

In one general aspect, the techniques disclosed here feature a control system including: an imaging device that is installed on a moving body and that images a target object in a first frame period a plurality of times to generate a multiple-exposure image data including a first image data and a second image data; and a processor that detects a relative motion state of the moving body with respect to the target object, based on the first image data and the second image data included in the multiple-exposure image data. The imaging device images the target object with a first sensitivity in a first exposure period in the first frame period to generate the first image data and images the target object with a second sensitivity in a second exposure period in the first frame period to generate the second image data, the second exposure period being different from the first exposure period, the second sensitivity being different from the first sensitivity.

Illustrative embodiments of the present disclosure provide a driving control system that can detect the motion state of a moving body, for example, the speed or the traveling direction thereof, a control method for the moving body, a vehicle-traveling control system that can detect the motion state of a vehicle, for example, the speed or the traveling direction thereof, and a control method for traveling of the vehicle.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 14 is a flowcharted illustrating an example of a processing flow for detecting a traveling direction and a relative speed of a vehicle and controlling braking and accelerating of the vehicle based on the detection results;

FIG. 16A is a functional block diagram illustrating functional blocks of a controller in a reference example;

FIG. 27 is a flowchart illustrating one example of a processing flow for detecting an absolute speed and an acceleration based on multiple-exposure image data and controlling the braking and accelerating of the vehicle based on the absolute speed and the acceleration;

FIG. 29 is a flowchart illustrating one example of a processing flow for detecting a speed based on multiple-exposure image data, further detecting the traveling direction, and controlling the braking and accelerating;

FIG. 32 is a flowchart illustrating one example of a processing flow for controlling braking/accelerating by using a vehicle speed measured by the ECU;

DETAILED DESCRIPTION

Figure 1:
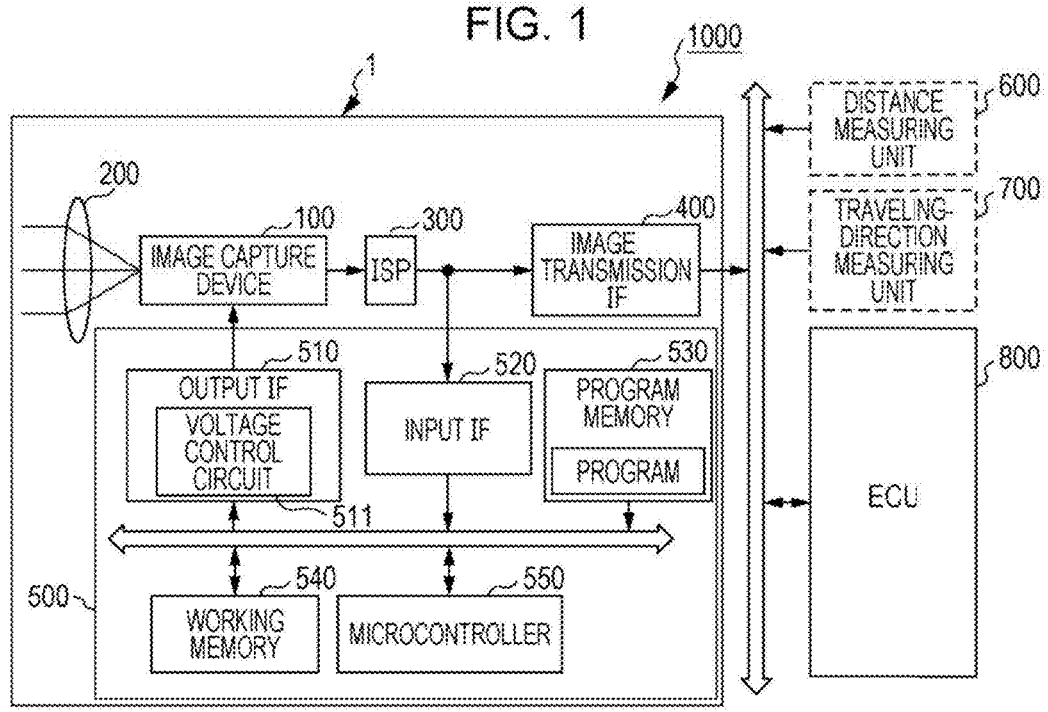
FIG. 1 is a block diagram illustrating a block configuration example of a vehicle-traveling control system including a detecting device.

First, a description will be given of problems with the related art which were considered by the present inventor. In recent years, the traveling assistance systems have evolved dramatically. The systems are turning from systems in which automobile driving operation by the human is assisted into automobile-centric systems in which an automobile itself obtains information, makes decisions, and performs driving operation. Expectations for such systems are high, and many requests for further improving the systems have been received. It cannot necessarily be said that, in the related technology, information required for vehicle-traveling control has been obtained with high accuracy. Thus, there are demands for obtaining the information with higher accuracy.

Heretofore, the speed of a vehicle has been generally measured based on a pulse signal that is proportional to the rotational speed of wheels. However, owing to wear of the tires on the wheels and a measurement environment, its measurement error and uncertainty are not constant. For example, there are possibilities that the tires skid during right turn or left turn on a frozen road or the wheels are locked during braking. In such a state, it is difficult to accurately measure the vehicle speed based on the pulse signal. In the future, in advanced driver-assistance systems (ADAS), autonomous cars, and so on whose further advancements are desired, it is necessary that information needed for traveling control be properly acquired, and the control be performed instantaneously.

In view of such issues, the present inventor has conceived a novel detecting device. One non-limiting and exemplary embodiment provides a moving-body control system that can detect the motion state of a moving body, for example, the speed or the traveling direction thereof, and is mainly aimed to provide a driving control system that can detect the motion state of a vehicle, for example, the speed or the traveling direction thereof. An overview of one aspect of the present disclosure is described in the following items.

[Item 1] A driving control system includes:
an imaging device that is installed on a moving body and that images a target object in a first frame period a plurality of times to generate a multiple-exposure image data including a first image data and a second image data; and
a processor that detects a relative motion state of the moving body with respect to the target object, based on the first image data and the second image data included in the multiple-exposure image data, wherein
the imaging device images the target object with a first sensitivity in a first exposure period in the first frame period to generate the first image data and images the target object with a second sensitivity in a second exposure period in the first frame period to generate the second image data, the second exposure period being different from the first exposure period, and the second sensitivity being different from the first sensitivity.

[Item 2] The driving control system according to item 1 may further include:
a first control device, wherein
the first control device generates a signal for causing the motion state of the moving body to change, based on the relative motion state of the moving body.

[Item 3] The driving control system according to item 2 may further include:
a second control device, wherein
the second control device may cause the motion state of the moving body to change, based on the signal.

[Item 4] The driving control system according to item 1 may further include:
a first control device, wherein
the target object may be fixed to another moving body, and
the first control device may generate a signal for causing a motion state of the other moving body to change, based on the relative motion state of the moving body.

[Item 5] The driving control system according to item 4 may further include:
a second control device, wherein
the second control device may cause the motion state of the other moving body, based on the signal.

[Item 6] In the driving control system according to item 1, the moving body may be a vehicle.

[Item 7] In the driving control system according to item 1, the target object may be stationary relative to a ground surface, and
the processor may detect an absolute speed of the moving body.

[Item 8] In the driving control system according to item 1, the target object may be stationary relative to a ground surface; and
the processor may detect a distance between the moving body and the target object, based on the first image data, and may generate position information of the moving body, based on position information of the target object and the distance.

[Item 9] In the driving control system according to item 1, the first image data may be generated by a first imaging in the first frame period; and
the second image data may be generated by a last imaging in the first frame period.

[Item 10] In the driving control system according to item 1, of a plurality of image data included in the multiple-exposure image data, at least one image data other than the second image data may be generated by imaging the target object with the first sensitivity.

[Item 11] In the driving control system according to item 1, of a plurality of image data included in the multiple-exposure image data, at least one image data other than the first image data may be generated by imaging the target object with the second sensitivity.

[Item 12] In the driving control system according to item 1, the processor may detect a traveling direction of the moving body with respect to the target object, based on the first image data and the second image data.

[Item 13] In the driving control system according to item 1, the processor may detect a relative speed of the moving body with respect to the target object, based on the first image data and the second image data.

[Item 14] In the driving control system according to item 1, the processor may detect an acceleration of the moving body with respect to the target object, based on the first image data and the second image data.

[Item 15] In the driving control system according to item 1, the processor may switch, every predetermined period, between a first mode in which a traveling direction of the moving body with respect to the target object is detected and a second mode in which a relative speed of the moving body with respect to the target object is detected, based on the first image data and the second image data.

[Item 16] The driving control system according to item 1 may further include:
 a control device, wherein
 the target object may be fixed to another moving body;
 the processor may detect a change in a distance between the moving body and the target object, based on the first image data and the second image data; and
 when it is detecting that the distance has become smaller than a predetermined value, the control device may generate a signal for causing a motion state of the moving body or the other moving body to change so that the distance increases.

[Item 17] The driving control system according to item 1 may further include:
 a control device, wherein
 the target object may be fixed to another moving body; and
 the processor
  may detect a change in a distance between the moving body and the target object, based on the first image data and the second image data, and
  may generate a signal for causing a motion state of the moving body or the other moving body to change so that the distance decreases, when it is detected that the distance has become larger than a predetermined value.

[Item 18] In the driving control system according to item 1, the processor may detect a relative motion state of the moving body with respect to the target object, based on feature points of images of the target object in the first image data and the second image data.

[Item 19] In the driving control system according to item 3, the first control device and the second control device may be a common control device.

[Item 20] A driving control method includes:
 imaging a target object with a first sensitivity in a first exposure period in a first frame period to generate a first image data, and imaging the target object with a second sensitivity in a second exposure period in the first frame period to generate a second image data, by using an imaging device installed on a moving body, to thereby generate a multiple-exposure image data including the first image data and the second image data, the second exposure period being different from the first exposure period, and the second sensitivity being different from the first sensitivity;
 detecting a relative motion state of the moving body with respect to the target object, based on the first image data and the second image data included in the multiple-exposure image data;
 generating a signal for causing a motion state of the moving body to change, based on the relative motion state of the moving body; and
 causing the motion state of the moving body to change, based on the signal.

[Item 21] A driving control method includes:
 imaging a target object fixed to another moving body with a first sensitivity in a first exposure period in a first frame period to generate a first image data, and imaging the target object with a second sensitivity in a second exposure period in the first frame period to generate a second image data, by using an imaging device installed on a moving body, to thereby generate a multiple-exposure image data including the first image data and the second image data, the second exposure period being different from the first exposure period, the second sensitivity being different from the first sensitivity;
 detecting a relative motion state of the moving body with respect to the target object, based on the first image data and the second image data included in the multiple-exposure image data;
 generating a signal for causing a motion state of the other moving body to change, based on the relative motion state of the moving body; and
 causing the motion state of the other moving body to change, based on the signal.

According to one aspect of the present disclosure, a multiple-exposure image data acquired by performing a plurality of image captures in one frame period is used, in order to recognize the motion state or the surrounding state of a moving body, for example, a vehicle or an aircraft. Thus, for example, it is possible to significantly reduce the amount of computation performed in order to determine the speed and the traveling direction of a vehicle, compared with a case in which one piece of image data is acquired for each frame period and the acquired plurality of pieces of image data is used to detect the motion state.

When the motion state of a target object is detected using a plurality of pieces of image data, the detection interval is limited by the reading speed of an image sensor. In contrast, the multiple-exposure image data includes a plurality of pieces of image data that are superimposed. Thus, in the present disclosure, the detection interval of a target object is defined by an exposure interval of multiple exposures. Hence, according to the present disclosure, the measurement speed can be significantly enhanced, and the measurement accuracy can be improved. Also, according to the present disclosure, since the detection interval is small, the amount of movement of a target object in the detection interval is small, thus making it possible to more finely detect the motion state of the target object. Hence, when the motion state of a target object is predicted from a result of the detection, an improvement in the prediction probability can be expected, and in addition, since the motion state is detected using one piece of multiple-exposure image data, a computational area needed for detection in an image can be narrowed down, and the amount of computation can be reduced.

Embodiments of the present disclosure will be described below in detail with reference to the accompanying drawings. The embodiments described below each represent a general or specific example. Numerical values, shapes, materials, constituent elements, the arrangement and the connection forms of constituent elements, steps, the order of steps, and so on described in the embodiments below are examples and are not intended to limit the present disclosure. Various aspects described herein can be combined together, as long as such a combination does not cause contradiction. Also, of the constituent elements in the embodiments below, constituent elements not set forth in the independent claims that represent the broadest concept will be described as optional constituent elements. In the following description, constituent elements having substantially the same functions are denoted by the same reference numerals, and descriptions thereof may be omitted.

The present disclosure relates to a technology for mainly detecting the relative traveling direction of a moving body and the speed or the acceleration of the moving body. The relative traveling direction of a moving body means, for example, the relative traveling direction of a moving body with respect to another moving body or the traveling direction of a moving body with respect to a stationary body. Also, the relative speed and acceleration of a moving body mean the relative speed and acceleration of a moving body with respect to another moving body.

The present disclosure further relates to a technology for mainly detecting the absolute traveling direction of a moving body and the speed and acceleration of the moving body. The absolute traveling direction of a moving body means, for example, the absolute traveling direction of a moving body itself. Also, the absolute speed and acceleration of a moving body mean the absolute speed and acceleration of a moving body itself.

Herein, the states of motions of a moving body which include the above-described traveling direction, speed, and acceleration may be collectively referred to as a "motion state" of a moving body.

Herein, the moving body refers to any object that moves. Examples of the moving body include a human, a vehicle, industrial control equipment, a self-contained robot, and an aircraft. Examples of the vehicle include an automobile, a motorcycle, and a train. Examples of the aircraft include an airship and a multicopter. The multicopter is, for example, a drone, regardless of whether it is manned or unmanned.

First Embodiment

<1.1. Configurations of Vehicle-Traveling Control System 1000 and Detecting Device 1>

FIG. 1 illustrates a block configuration example of a vehicle-traveling control system 1000 including a detecting device 1.

The detecting device 1 in the present embodiment is a device mounted on a vehicle and mainly detects a relative traveling direction of a vehicle. The vehicle is, for example, an automobile. The detecting device 1 can be arranged at, for example, at least one of a front side and a rear side of the vehicle. This makes it possible to image target objects in a wide range at either the front side or the rear side of the vehicle.

The detecting device 1 can communicably connect to, for example, a distance measuring unit 600, a traveling-direction measuring unit 700, and an electronic control unit 800 through a bus. The electronic control unit is hereafter referred to as "ECU". Communication between the constituent elements is performed in a wired or wireless manner. For example, communication using a controller area network (CAN), which is an in-vehicle network, is possible. This constructs the vehicle-traveling control system 1000 in which the ECU 800 serves as a core. The vehicle-traveling control system 1000 is desirably mounted, for example, on an automobile. In addition, the vehicle-traveling control system 1000 can be constructed by a plurality of vehicles including a host vehicle and a surrounding vehicle that travels in the surroundings of the host vehicle. In the vehicle-traveling control system 1000, the distance measuring unit 600 and the traveling-direction measuring unit 700 are not essential, as described below.

The detecting device 1 includes an imaging device 100, an optical system 200, an image signal processor 300, an image transmission interface 400, and a control device 500. Hereinafter, the control device is referred to as a "controller", and the image signal processor is referred to as an "ISP".

The imaging device 100 is, for example, a complementary metal-oxide semiconductor (CMOS) image sensor. The imaging device 100 can acquire multiple-exposure image data of a subject. Details of the imaging device 100 are described later. The imaging device 100 is typically mounted on the host vehicle.

The optical system 200 has a known lens group constituted by a focus lens, a zoom lens, and so on. In the lens group, for example, the focus lens moves in an optical axis direction. This makes it possible to adjust a subject-image focusing position in the imaging device 100.

The ISP 300 is a processor for performing image processing on image data output from the imaging device 100. The ISP 300 first receives output data from the imaging device 100. The output data from the imaging device 100 is, for example, uncompressed, unprocessed raw data. The ISP 300 can perform, for example, gamma correction, color interpolation processing, space interpolation processing, and automatic white balancing processing on the output data from the imaging device 100.

The image transmission interface 400 is an interface (IF) for outputting multiple-exposure image data and so on to outside thereof. The outside of the image transmission interface 400 is, for example, the ECU 800. For example, the image transmission interface 400 can communicate with the ECU 800 through a CAN. The multiple-exposure image data and so on may be directly output as raw data or may be output according to a specified format after being subjected to image compression or predetermined image processing.

The controller 500 is a control circuit for controlling the entire detecting device 1 and functions as a computational processing device. The controller 500 can process the multiple-exposure image data from the ISP 300. The controller 500 can detect, for example, a relative traveling direction and a relative speed of the vehicle, based on the multiple-exposure image data. The controller 500 can be mounted on the host vehicle or a surrounding vehicle that travels in the surroundings of the host vehicle.

The controller 500 includes, for example, an output interface 510 having a voltage control circuit 511, an input interface 520, a program memory 530, a working memory 540, and a microcontroller 550.

The input interface 520 is an interface for receiving the multiple-exposure image data output from the ISP 300.

The microcontroller 550 temporarily loads a program, pre-stored in the program memory 530, to the working memory 540 and performs various operations in accordance with a command group of the program. The program memory 530 is, for example, a read-only memory (ROM), and the working memory 540 is, for example, a random-access memory (RAM). The program stored in the program memory 530 has, for example, a command group for controlling the imaging device 100.

The output interface 510 is an interface for outputting control signals to the imaging device 100. The output interface 510 includes the voltage control circuit 511. For example, the voltage control circuit 511 generates a desired voltage to be applied to a photoelectric conversion layer in pixels in the imaging device 100. The voltage control circuit 511 supplies the voltage to a transparent electrode 109A, which is described later with reference to FIG. 5. The voltage control circuit 511 can control, for example, a global shutter in the imaging device 100. The present disclosure can employ, in addition to the voltage control circuit 511, any other configuration that can realize the global shutter in the imaging device 100.

Since the configuration and so on of the controller 500 are not inherent portions in the present disclosure, detailed descriptions thereof are omitted.

Figure 2:
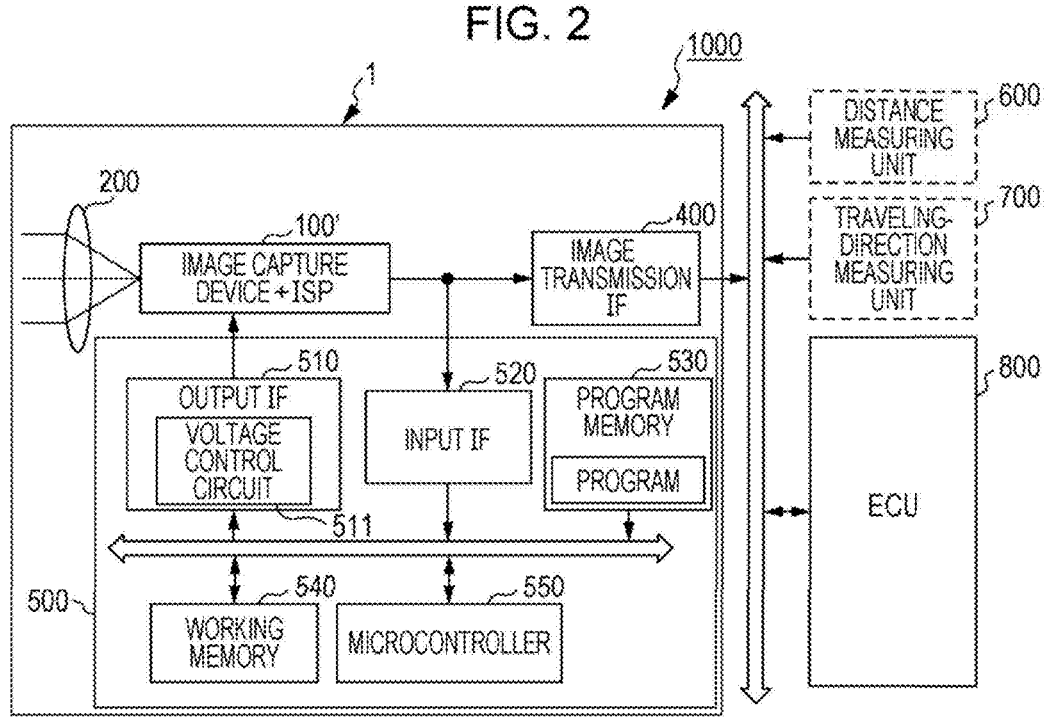
FIG. 2 is a block diagram illustrating another block configuration example of the detecting device.

FIG. 2 illustrates another block configuration example of the detecting device 1.

In the configuration example in FIG. 1, the ISP 300 is in a chip different from that of the imaging device 100 and is provided external to the imaging device 100. On the other hand, in the configuration example in FIG. 2, the imaging device 100 and the ISP 300 are implemented in the same chip. According to this configuration example, it is possible to process image data at higher speed and it is possible to reduce the cost of the hardware. Although the detecting device 1 has been described as including the imaging device 100 or 100', the detecting device 1 does not necessarily have to include the imaging device 100 or 100', and the imaging device 100 or 100' may be provided outside the detecting device 1.

Figure 3:
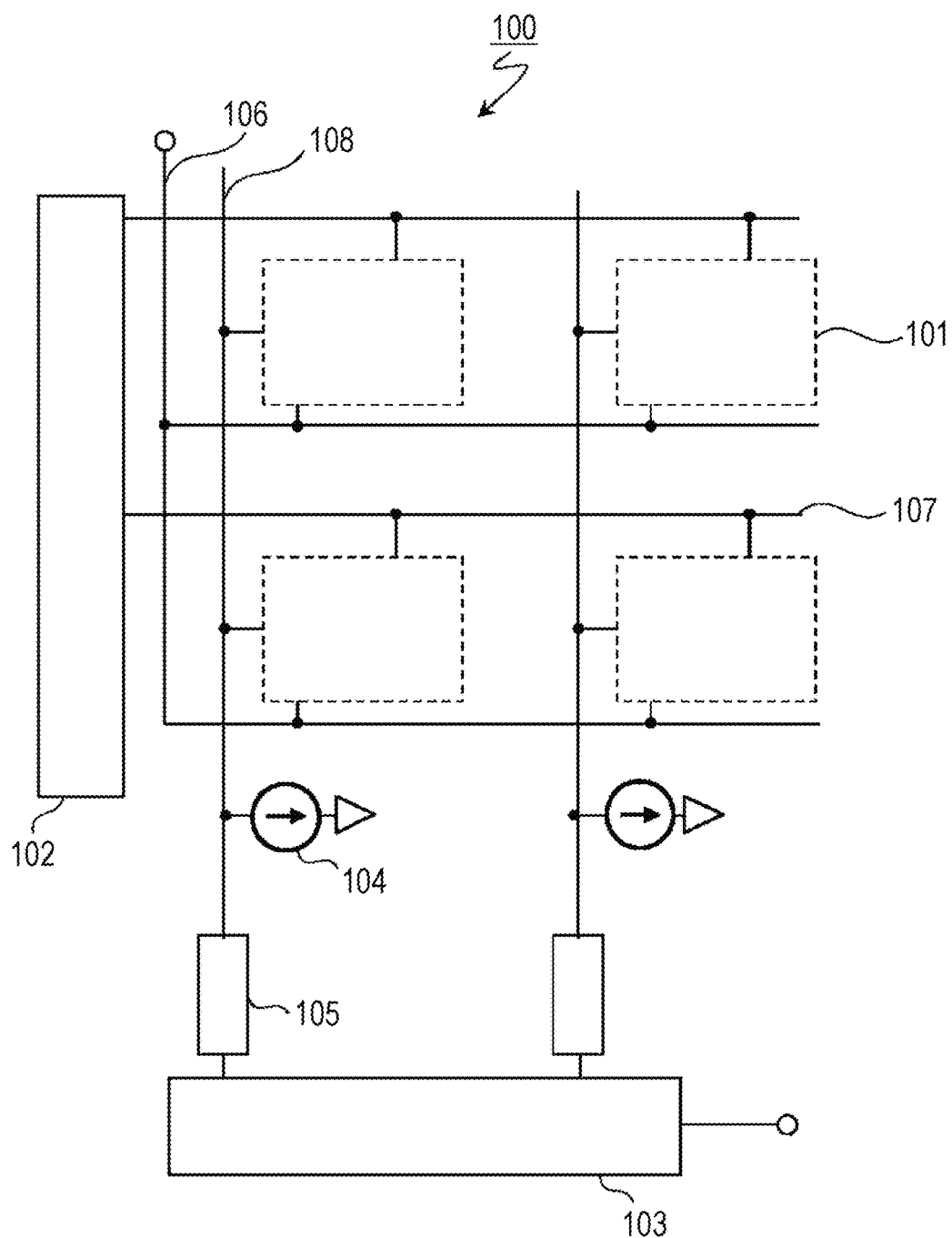
FIG. 3 is a schematic diagram illustrating a configuration example of the imaging device.

FIG. 3 illustrates a configuration example of the imaging device 100.

The imaging device 100 includes a pixel array constituted by a plurality of unit pixels 101 arranged two-dimensionally. Although, in practice, millions of unit pixels 101 can be arranged two-dimensionally, FIG. 3 illustrates a state thereof while paying attention to the unit pixels 101 arranged in a 2×2 matrix.

The imaging device 100 includes the plurality of unit pixels 101, a row scanning circuit 102, a column scanning circuit 103, current sources 104 provided for respective columns, and analog-to-digital (AD) conversion circuits 105. Horizontal signal lines 107 are provided for respective rows, and vertical signal lines 108 are provided for respective columns. Each unit pixel 101 is electrically connected to the row scanning circuit 102 through the corresponding horizontal signal line 107 and is electrically connected to the column scanning circuit 103 through the corresponding vertical signal line 108.

For example, a common power-supply line 106 is connected to all of the unit pixels 101. A common voltage is supplied to all of the unit pixels 101 through the common power-supply line 106. Pixel signals based on optical signals photoelectrically converted in the unit pixels 101 are analog signals, which are converted into digital signals by the AD conversion circuits 105. The signals converted into the digital signals are output from the column scanning circuit 103 as output signals. In this configuration, when the start timings and the end timings of exposures in a plurality of unit pixels 101 are the same, a global shutter function is realized. However, in the present disclosure, it is sufficient that the start timings and the end timings of exposures in at least two unit pixels 101 of the of unit pixels 101 are the same. The AD conversion circuits 105 do not have to be provided for the respective columns, and the pixel signals may be directly output as analog signals. The pixel signals from the plurality of unit pixels 101 can be subjected to addition or subtraction, and values after the computation can be output from the column scanning circuit 103. Alternatively, the pixel signals from the plurality of unit pixels 101 can be directly output from the column scanning circuit 103.

Figure 4A:
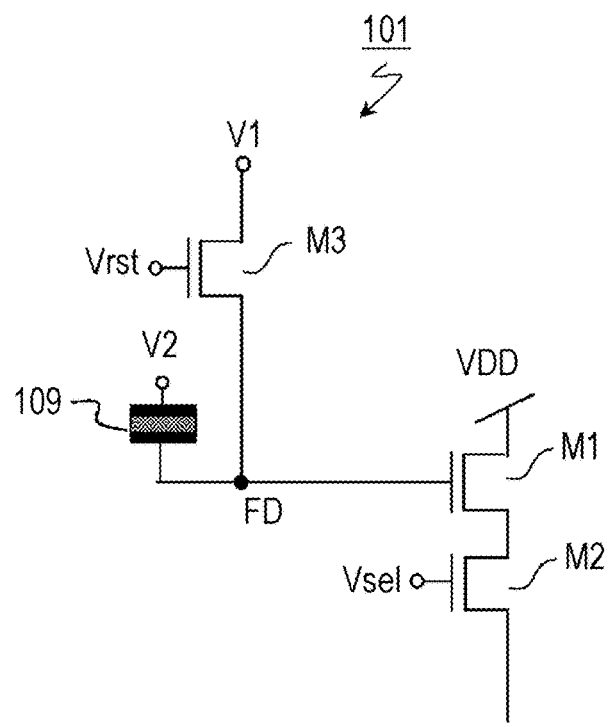
FIG. 4A is a circuit diagram illustrating a configuration example of a unit pixel.
Figure 5:
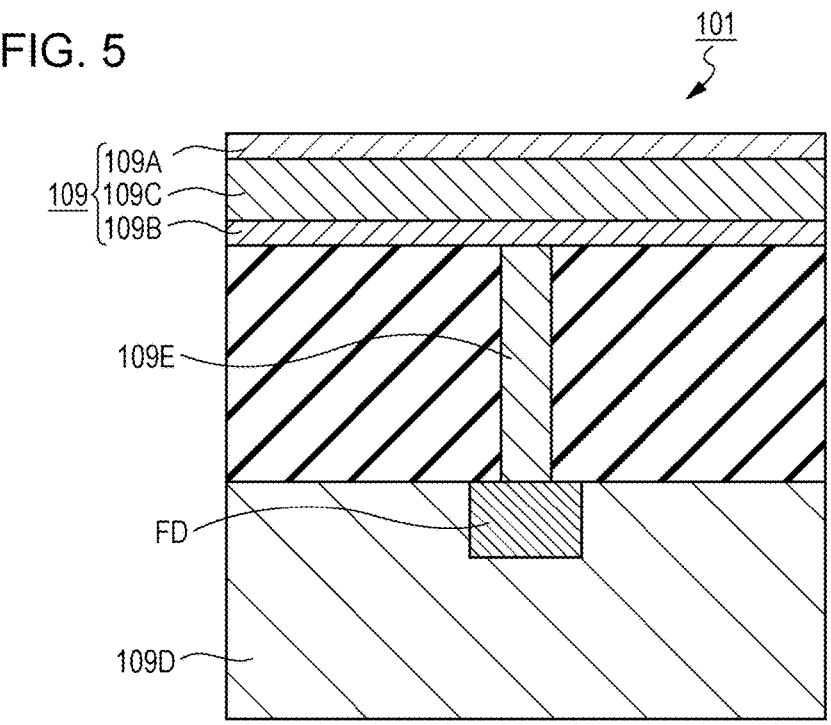
FIG. 5 is a sectional view of the unit pixel, taken along a normal direction of a semiconductor substrate.

FIG. 4A illustrates a configuration example of each unit pixel 101. FIG. 5 schematically illustrates a section of the unit pixel 101, taken along a normal direction of a semiconductor substrate 109D.

The unit pixel 101 illustrated in FIG. 4A includes a photoelectric converter 109, a floating diffusion, an amplifying transistor M1, a selecting transistor M2, and a reset transistor M3. The floating diffusion is hereinafter referred to as an "FD". The photoelectric converter 109 photoelectrically converts incident light. The FD accumulates electrical charge. The amplifying transistor M1 amplifies the electrical charge accumulated in the FD. The selecting transistor M2 selects whether or not an amplified signal is to be output to the vertical signal line 108. The reset transistor M3 resets the FD to a desired reset potential Vrst. Herein, a circuit constituted by the amplifying transistor M1, the selecting transistor M2, the reset transistor M3, and so on is referred to as a "signal processing circuit". The signal processing circuit is electrically connected to the photoelectric converter 109 to detect an electrical signal.

The photoelectric converter 109 in the unit pixel 101 has the transparent electrode 109A, a pixel electrode 109B, and a photoelectric conversion layer 109C arranged between the transparent electrode 109A and the pixel electrode 109B. The pixel electrode 109B is electrically connected to the signal processing circuit. The FD is provided in the semiconductor substrate 109D and is electrically connected to the pixel electrode 109B via a contact plug 109E. Light is incident on the photoelectric conversion layer 109C from the transparent electrode 109A side of the photoelectric conversion layer 109C. When a bias voltage is applied between the transparent electrode 109A and the pixel electrode 109B, an electrical field is generated. One of positive and negative electrical charge generated by the photoelectric conversion is collected by the pixel electrode 109B and is accumulated in the FD.

A potential difference between the transparent electrode 109A and the pixel electrode 109B is controlled through the above-described power-supply line 106. For example, a change from a state in which the potential difference between the transparent electrode 109A and the pixel electrode 109B is large to a state in which the potential difference is small makes it possible to reduce the amount of electrical charge photoelectrically converted in the photoelectric conversion layer 109C. Alternatively, adjusting the potential difference also makes it possible to reduce the amount of electrical charge photoelectrically converted in the photoelectric conversion layer 109C to zero.

In the case of this configuration, merely controlling the magnitude of the bias voltage applied to the photoelectric conversion layer 109C makes it possible to control generation and accumulation of the electrical charge in the unit pixel 101. That is, an electrical-charge transfer transistor and an element, such as a capacitor, for accumulating transferred electrical charge do not have to be added to each unit pixel as in the related art. Controlling the bias voltage is performed by, for example, the voltage control circuit 511 in the controller 500. Simultaneously controlling the bias voltages for two or more of the plurality of unit pixels 101 allows a shutter to be simultaneously released between the two or more unit pixels. That is, a global shutter is realized among those unit pixels. A global shutter may be realized among all of the unit pixels 101. Alternatively, a global shutter may be realized among the unit pixels 101 that exist in a specific imaging area or may be realized among specific unit pixels 101. In addition, the shutter may be released in a plurality of separate stages.

When a voltage between the transparent electrode 109A and the pixel electrode 109B is reduced in a state in which signal charge is already accumulated in the FD, the accumulation of electrical charge in the FD stops. Thereafter, when the voltage between the transparent electrode 109A and the pixel electrode 109B is increased, signal charge can be further accumulated in the FD. Thus, controlling the bias voltage at a plurality of different timings in one frame period makes it possible to acquire a plurality of pieces of image data in one frame period. That is, multiple-exposure image data in which a plurality of pieces of image data is multiplexed can be acquired in one frame period.

With known imaging elements, a plurality of pieces of image data needs to be treated as a group of pieces of data acquired in respective different frame periods. According to the present disclosure, the multiple-exposure image data can be handled as one piece of data. Thus, the present disclosure has advantages in that the amount of data can be reduced and load on data processing in a circuit at a subsequent stage can be reduced.

In addition, when the imaging device 100 generates multiple-exposure image data, bias voltages that are different from each other may be applied between electrodes at the respective timings in one frame period. This makes it possible to acquire multiple-exposure image data including a plurality of pieces of image data having sensitivities that are different from each other. Herein, such multiple exposures may be referred to as "multiple exposures via sensitivity modulation".

With known imaging elements, it is impossible to modulate the sensitivity by controlling a voltage applied to unit pixels. The present disclosure has an advantage in that the sensitivity can be modulated by controlling the magnitude of the bias voltage. Since the above detailed description of the multiple exposures via sensitivity modulation is given in, for example, Japanese Unexamined Patent Application Publication No. 2007-104113 by the present applicant, the description thereof is omitted herein. These entire contents of the disclosure are incorporated herein for reference.

Figure 4B:
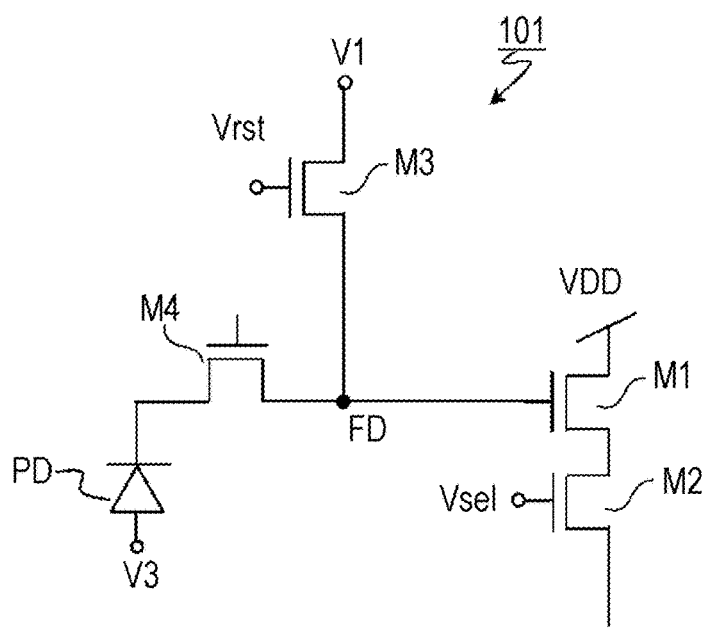
FIG. 4B is a circuit diagram illustrating another configuration example of the unit pixel.

FIG. 4B illustrates another configuration example of the unit pixel 101.

The unit pixel 101 in FIG. 4B includes a photodiode (hereinafter referred to as a "PD") as the photoelectric converter. Typically, the unit pixel 101 in this configuration example further includes an electrical-charge transfer transistor M4 for transferring electrical charge generated in the PD to the FD. In this manner, an image sensor constituted by unit pixels having PDs may also be utilized as the imaging device 100. Although FIG. 4B illustrates a configuration in which the electrical-charge transfer transistor M4 is provided, a configuration in which the electrical-charge transfer transistor M4 is not provided may be used.

Reference is made to FIGS. 1 and 2 again.

Data processed by the ISP 300 or an imaging device 100' is read as multiple-exposure image data, which is output to the image transmission interface 400 and the controller 500. In addition to the multiple-exposure image data, naturally, the imaging device 100 may generate image data via a single exposure.

The distance measuring unit 600 can measure a distance between the host vehicle and a target object. The distance measuring unit 600 can be realized by, for example, a device, such as a time-of-flight (TOF) sensor, a laser radar, and a sonar.

The traveling-direction measuring unit 700 can measure a relative traveling direction of the host vehicle relative to a target object. The relative traveling direction of the host vehicle relative to a target object refers to, for example, the positional relationship of the host vehicle relative to a target object and the direction of change thereof. The traveling-direction measuring unit 700 can be realized by, for example, devices, such as a TOF, a laser radar, and a sonar. The target object may be a moving body or may be a stationary body.

As described above, the distance measuring unit 600 and the traveling-direction measuring unit 700 are not essential. As described below, analyzing the multiple-exposure image data makes it possible to obtain information, such as the distance and the relative traveling direction. Acquiring those pieces of information through data analysis makes it possible to reduce the number of pieces of hardware in the vehicle-traveling control system 1000. As a result, the vehicle-traveling control system 1000 can be simplified and optimized. Naturally, the distance detection by the device and by data analysis may also be selectively used depending on the type of control.

The ECU 800 is a unit that serves as a core of an in-vehicle network and that performs engine control as well as various types of vehicle control on braking, steering, accelerating, and so on. For example, the ECU 800 can control braking and accelerating of the vehicle, based on an output from the detecting device 1. Also, the ECU 800 can perform various computations of the detecting device 1.

<1.2. Basic Operation of Imaging Device 100>

First, a basic operation of the imaging device 100 will be described with reference to FIGS. 6A and 6B.

Figure 6A:
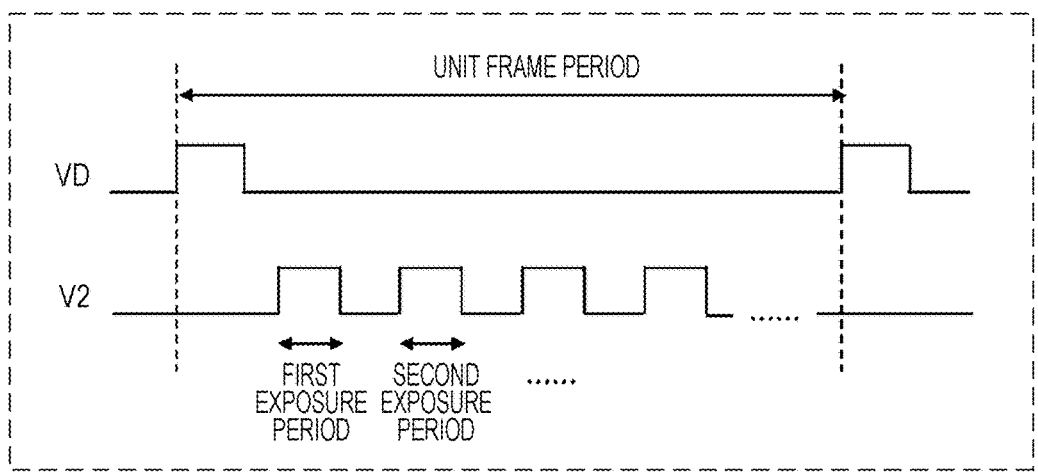
FIG. 6A is a timing diagram illustrating a typical operation timing of multiple exposures in a unit frame period.

FIG. 6A illustrates a typical operation timing of multiple exposures in a unit frame period. FIG. 6B illustrates one example of an image represented by multiple-exposure image data. In FIG. 6A, VD represents a start pulse in the unit frame period. A period between two start pulses corresponds to the unit frame period. A control signal V2 represents a bias voltage applied to the photoelectric conversion layer 109C in the unit pixel 101.

A plurality of pieces of image data acquired via multiple exposures in one frame period is acquired according to the level of the control signal V2 generated by the voltage control circuit 511. Each period in which the control signal V2 is high is an exposure period, and each period in which the control signal V2 is low is a non-exposure period. In each exposure period, the electrical charge generated by photoelectric conversion in the photoelectric conversion layer 109C moves to the pixel electrodes 109B. On the other hand, in each non-exposure period, the electrical charge generated by the photoelectric conversion in the photoelectric conversion layer 109C recouples and vanishes.

The imaging device 100 in the present embodiment can change the exposure period, the number of exposures, and the sensitivity. Specifically, the voltage control circuit 511 can control exposures by changing the pulse width and the pulse amplitude of the control signal V2 in a unit frame period.

FIG. 6A illustrates an example in which four or more exposures are executed in a unit frame period without changing the sensitivity. However, it is acceptable that the number of exposures in the unit frame period is two or more. The imaging device 100 generates multiple-exposure image data including a plurality of pieces of image data (first, second, . . . , and n-th image data; n is an integer greater than or equal to 2) acquired in the respective exposures. Accordingly, the multiple-exposure image data includes at least the first and second image data. The first image data is acquired in a first exposure period, and the second image data is acquired in a second exposure period. Herein, multiple exposures that are performed without changing the sensitivity of pixels in respective exposure periods may be referred to as "general multiple exposures". According to the general multiple exposures, for example, when a stationary body is imaged, images of the subject are captured by, for example, a plurality of same unit pixels 101 in the pixel array, illustrated in FIG. 3, in the individual exposure periods. In contrast, when a moving body is imaged, images of the subject are captured by a plurality of different unit pixels 101 in the individual exposure periods. In this case, the expression "images are captured by a plurality of different unit pixels 101 in the individual exposure periods" refers to, for example, a plurality of unit pixels 101 by which a subject is imaged in the first exposure period and a plurality of unit pixels 101 by which the subject is imaged in the second exposure period do not match partly or completely. As a result, for example, image data acquired via four or more exposures are included in one piece of multiple-exposure image data as four or more images that are independent or that partly overlap each other. FIG. 6B illustrates one example of an image represented by multiple-exposure image data acquired by imaging, four times at timings different from each other, the license plate of a vehicle that is traveling ahead of the host vehicle in a unit frame period.

Next, an applicative operation of the imaging device 100 will be described with reference to FIGS. 7A to 7D.

Figure 7A:
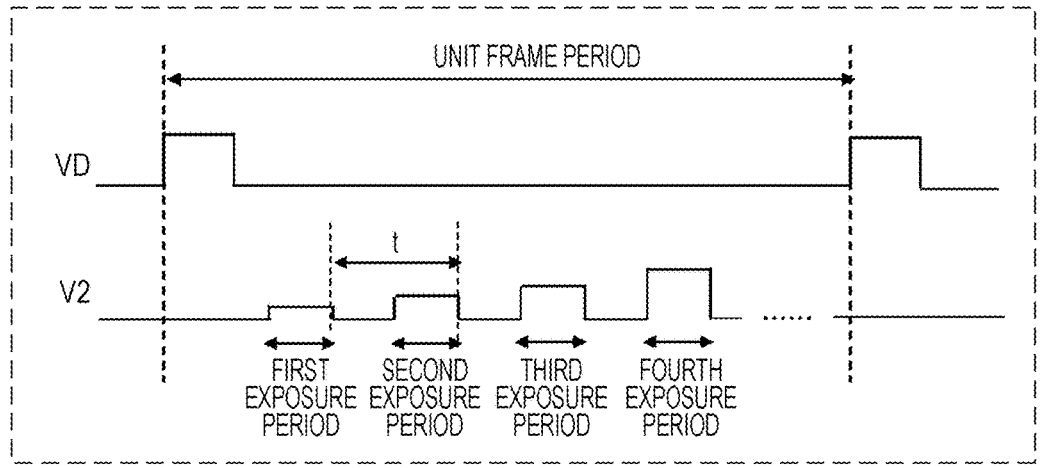
FIG. 7A is a timing diagram illustrating an example of an applicative operation timing of multiple exposures in a unit frame period.
Figure 7B:
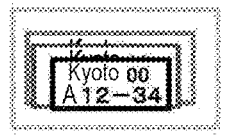
FIG. 7B is a schematic diagram illustrating one example of multiple-exposure image data according to an application example.
Figure 7C:
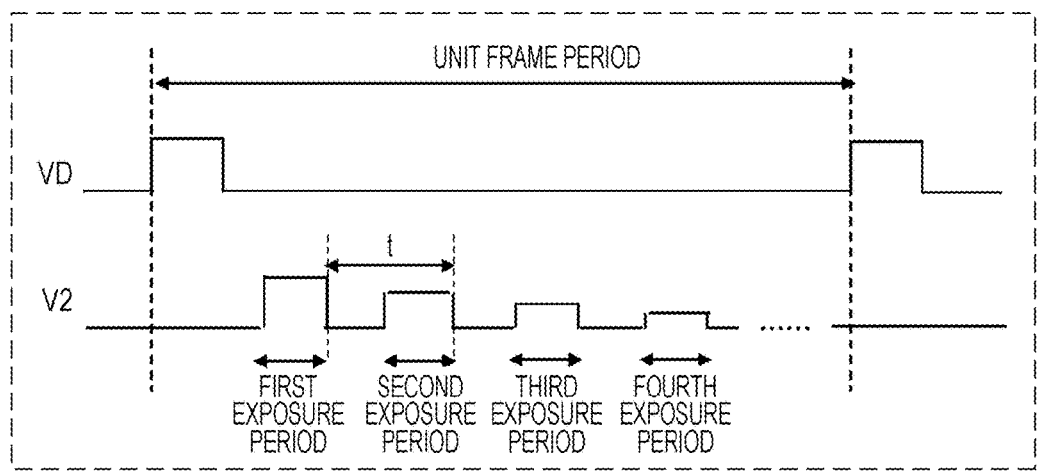
FIG. 7C is a timing diagram illustrating another example of the applicative operation timing of the multiple exposures in the unit frame period.
Figure 7D:
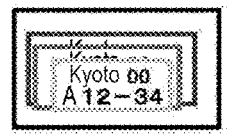
FIG. 7D is a schematic diagram illustrating another example of the multiple-exposure image data according to the application example.

FIG. 7A illustrates an example of an applicative operation timing of multiple exposures in a unit frame period. FIG. 7B illustrates one example of an image represented by multiple-exposure image data according to an application example. FIG. 7C illustrates another example of the applicative operation timing of the multiple exposures in the unit frame period. FIG. 7D illustrates another example of the image represented by the multiple-exposure image data according to the application example.

In this application example, multiple exposures via sensitivity modulation are executed by changing the level of the control signal V2 between exposures. Thus, the sensitivity and the amount of exposure differ between two exposure periods. The level of the control signal V2 is changed, for example, by changing the amplitude of the pulse. FIG. 7A illustrates an example in which four or more multiple exposures in which the sensitivities differ from each other are executed in a unit frame period. The control signal V2 is set to a voltage whose level differs for each exposure. The level of the control signal V2 may increase monotonically, as illustrated in FIG. 7A. Alternatively, the level of the control signal V2 may decrease monotonically, as illustrated in FIG. 7C. When the change in the level of the control signal V2 is a monotonical increase, for example, as illustrated in FIG. 7A, lightness in first image data acquired in a first exposure period is the lowest, and lightness in fourth image data acquired in a fourth exposure period is the highest. The imaging device 100 generates multiple-exposure image data including a plurality of pieces of image data that were acquired from individual exposures and in which the sensitivities differ from each other. The control signal V2 can be arbitrarily set and may take various patterns depending on the detection purpose. For example, the level of the control signal V2 does not have to increase monotonically or decrease monotonically or may be caused to increase or decrease in an arbitrary pattern.

FIGS. 7B and 7D each illustrate one example of an image represented by multiple-exposure image data acquired by imaging, four times in a unit frame period, the license plate of a vehicle traveling ahead of the host vehicle.

In this application example, in the multiple-exposure image data, lightness differs among four images acquired by imaging a subject having motion. Thus, the motion of the subject can be checked in a time series. Herein, the lightness is one example of a "degree of a common display attribute". The degree of a common display attribute can be, for example, a degree of color saturation and hue, other than the lightness.

Figure 6B:
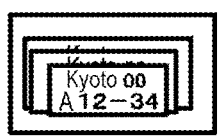
FIG. 6B is a schematic diagram illustrating one example of multiple-exposure image data.

FIGS. 6B, 7B, and 7D each illustrate one example of an image represented by multiple-exposure image data acquired by imaging the same subject having motion. When all of the degrees of a common display attribute in the exposures are the same, the image data illustrated in FIG. 6B is acquired. When the degrees of a common display attribute differ among the exposures, the image data illustrated in FIG. 7B or 7D is acquired. FIG. 7B shows that the higher the lightness of an image is, the later acquired subject image in a time series the image is. Also, FIG. 7D shows that the lower the lightness of an image is, the later acquired subject image in a time series the image is. This means that the relative traveling direction and the relative speed of the host vehicle with respect to a vehicle traveling ahead can be detected based on the multiple-exposure image data, as described below. The host vehicle is one example of a first moving body, and the vehicle traveling ahead is one example of a second moving body.

For example, in FIG. 7B, the higher the lightness of the image of the license plate is, the smaller the displayed image is. That is, the later the image is acquired in a time series, the smaller the size of the image is. Therefore, it can be detected that the host vehicle is relatively moving backward or is relatively decelerating relative to the vehicle traveling ahead. Similarly, for example, in FIG. 7D, the lower the lightness of the image of the license plate is, the smaller the size of the displaced image is. That is, the later the image is acquired in a time series, the smaller the size of the image is. Therefore, it can be detected that the host vehicle is relatively moving backward or is relatively decelerating relative to the vehicle traveling ahead.

Also, as another example, it is possible to modulate the sensitivity by varying the exposure period from one exposure to another. One example of the modulation will be described below.

Figure 8A:
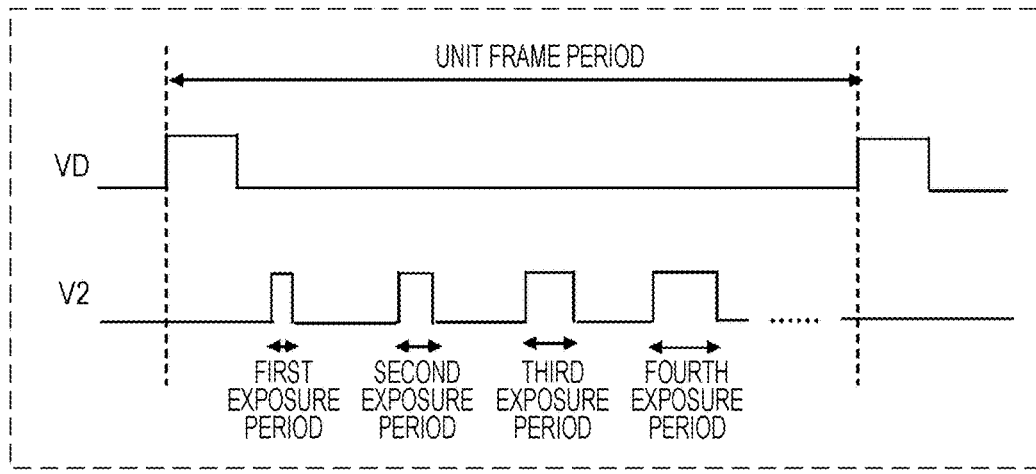
FIG. 8A is a timing diagram illustrating an example of an applicative operation timing of multiple exposures in a unit frame period.
Figure 8B:
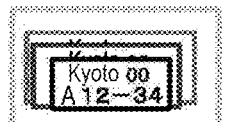
FIG. 8B is a schematic diagram illustrating one example of the multiple-exposure image data according to the application example.
Figure 8C:
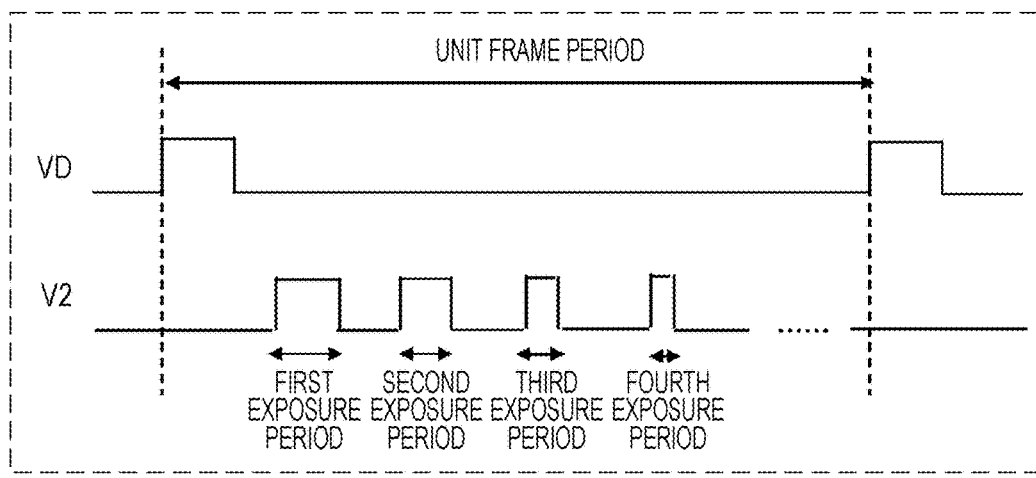
FIG. 8C is a timing diagram illustrating another example of the applicative operation timing of the multiple exposure in the unit frame period.
Figure 8D:
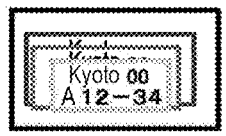
FIG. 8D is a schematic diagram illustrating another example of the multiple-exposure image data according to the application example.

FIG. 8A illustrates an example of an applicative operation timing of multiple exposures in a unit frame period. FIG. 8B illustrates one example of an image represented by multiple-exposure image data according to an application example. FIG. 8C illustrates another example of the applicative operation timing of the multiple exposures in the unit frame period. FIG. 8D illustrates another example of the image represented by the multiple-exposure image data according to the application example.

In this application example, the lengths of the exposures from a first exposure period to a fourth exposure period differ from each other. Although the lengths of the exposures in all the exposure periods differ in this application example, the lengths of at least two exposure periods may differ. The exposure period, that is, the pulse width of the control signal V2, is varied between the exposures to thereby modulate the sensitivity. FIG. 8B shows that the higher the lightness of an image is, the later acquired image in a time series the image is. Also, FIG. 8D shows that the lower the lightness of an image is, the later acquired image in a time series the image is.

For example, in FIG. 8B, the higher the lightness of the image of the license plate is, the smaller the displayed image is. That is, the later the image is acquired in a time series, the smaller the size of the image is. Therefore, it can be detected that the host vehicle is relatively moving backward or is relatively decelerating relative to the vehicle traveling ahead. Similarly, for example, in FIG. 8D, the lower the lightness of the image of the license plate is, the smaller the size of the displaced image is. That is, the later the image is acquired in a time series, the smaller the size of the image is. Therefore, it can be detected that the host vehicle is relatively moving backward or is relatively decelerating relative to the vehicle traveling ahead.

Next, some typical examples of an imaging sequence will be described with reference to FIGS. 9A to 9D.

FIGS. 9A to 9D illustrate typical examples of an imaging sequence.

Figure 9A:
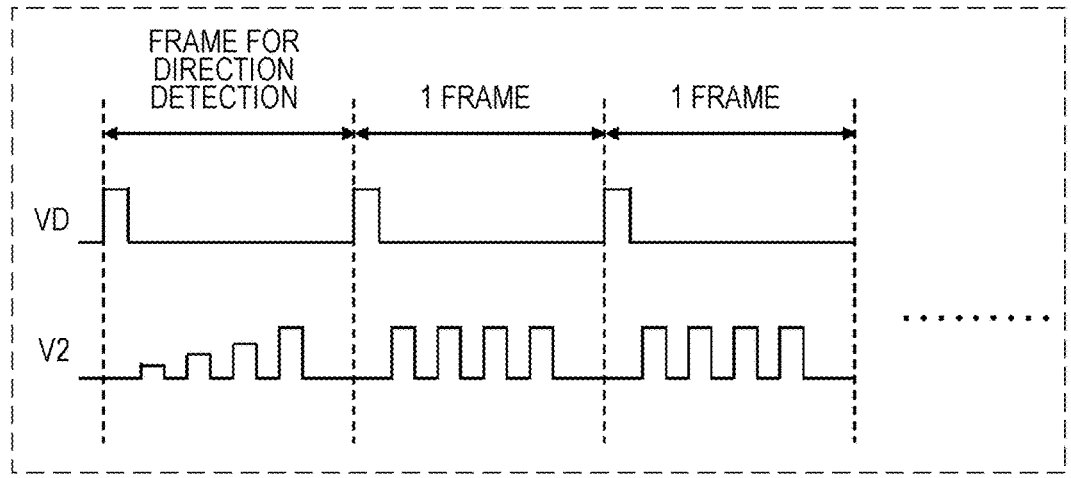
FIG. 9A is a sequence diagram illustrating a typical example of an imaging sequence.
Figure 9B:
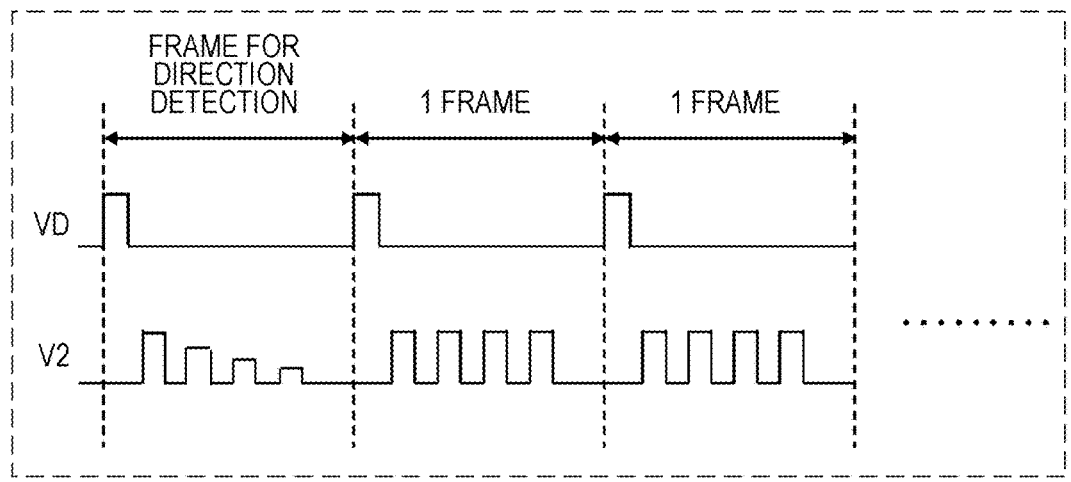
FIG. 9B is a sequence diagram illustrating a typical example of the imaging sequence.

As illustrated in FIGS. 9A and 9B, in one imaging sequence, sensitivity modulation may be applied to only a frame period for sensing a traveling direction, and the traveling direction may be detected based on multiple-exposure image data acquired in the frame period. In addition, the general multiple-exposure image capture may be performed in a remaining frame period. A frame for sensing a traveling direction will hereinafter be referred to as a "frame for direction detection".

Figure 9C:
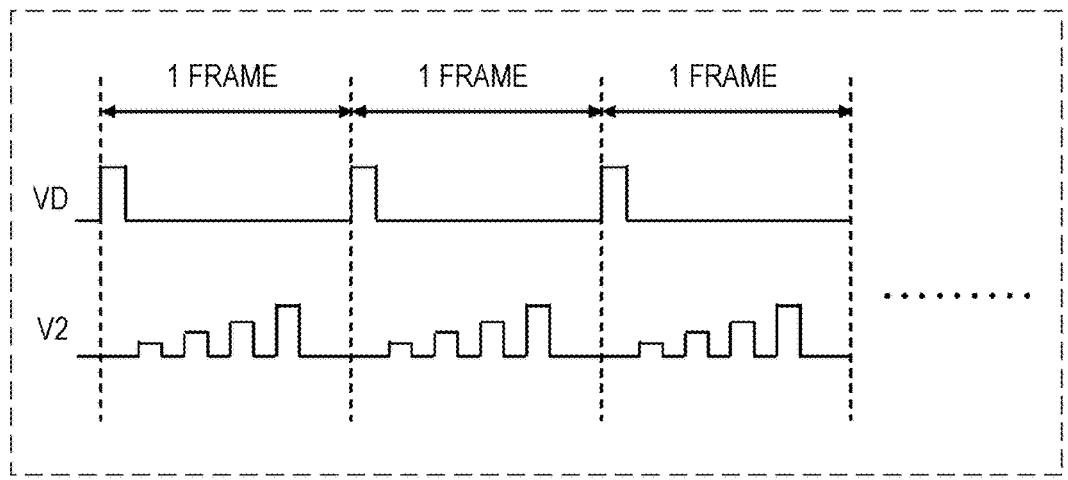
FIG. 9C is a sequence diagram illustrating a typical example of the imaging sequence.
Figure 9D:
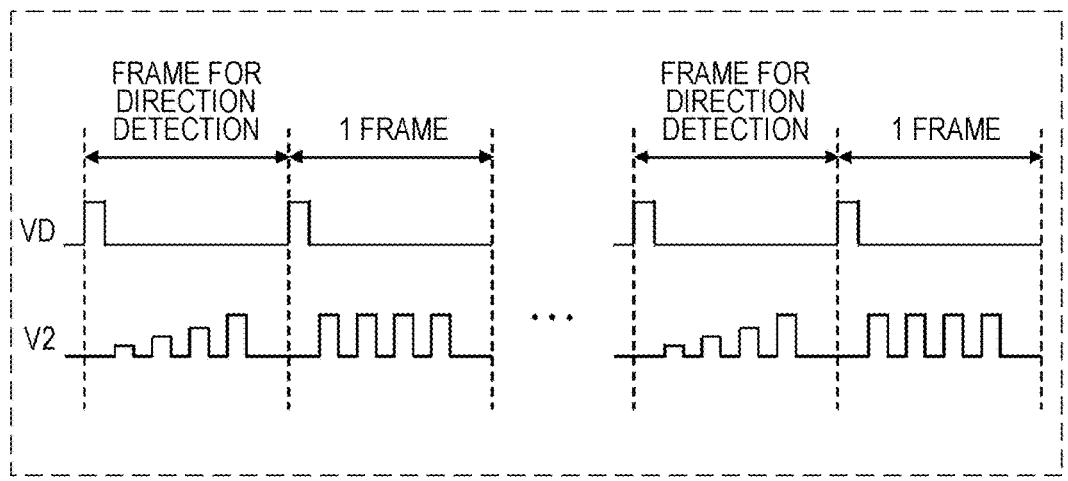
FIG. 9D is a sequence diagram illustrating a typical example of the imaging sequence.

As illustrated in FIG. 9C, through constant application of sensitivity modulation in each frame period of one imaging sequence, the traveling direction may be constantly detected based on multiple-exposure image data acquired in each frame period. Also, as illustrated in FIG. 9D, a period of the frame for direction detection may be periodically set in a plurality of frame periods in one imaging sequence, and through application of the sensitivity modulation to only the set frame period, the traveling direction may be detected based on multiple-exposure image data acquired in the period. Also, in accordance with control of the controller 500, the imaging device 100 may be caused to operate, while switching the configurations of some of the above-described imaging sequences according to a traveling condition.

In one imaging sequence, a period of a frame for sensing a traveling state may be set, and through detection of a speed based on multiple-exposure image data acquired in the period, the exposure interval in multiple-exposure imaging in a remaining frame period may be controlled based on the speed. A frame for sensing the traveling state is hereinafter referred to as a "frame for traveling-state detection". The frame for traveling-state detection may be periodically set in a plurality of frame periods in one imaging sequence. When the amount of data acquired is too small relative to a vehicle speed, it is difficult for the detecting device 1 to accurately follow the speed. Also, when the amount of data acquired is too large, it leads to an increase in the amount of computation and an increase in the power consumed by a chip. As a result, it is difficult to perform high-speed processing. Meanwhile, setting the frame for traveling-state detection in an imaging sequence, as described above, and controlling the exposure interval of subsequent image captures based on its measurement result makes it possible to appropriately put the amount of data acquired into an appropriate range and makes it possible to maintain the detection accuracy.

<1.3. Specific Example 1 of Operation of Detecting Device 1>

Specific example 1 of the operation of the detecting device 1 will be described with reference to FIGS. 10 to 12C.

When the engine in the host vehicle starts, the imaging device 100 according to the present embodiment starts imaging. The imaging device 100 images a specific target object included in another vehicle. Based on first image data and second image data of a specific target object imaged via sensitivity modulation, the controller 500 can detect the relative traveling direction of the host vehicle with respect to the other vehicle. The specific target object is an object whose dimensions are specified by a standard. The specific target object is, for example, the license plate of another vehicle or lamps, such as headlights or brake lights of another vehicle.

Figure 10:
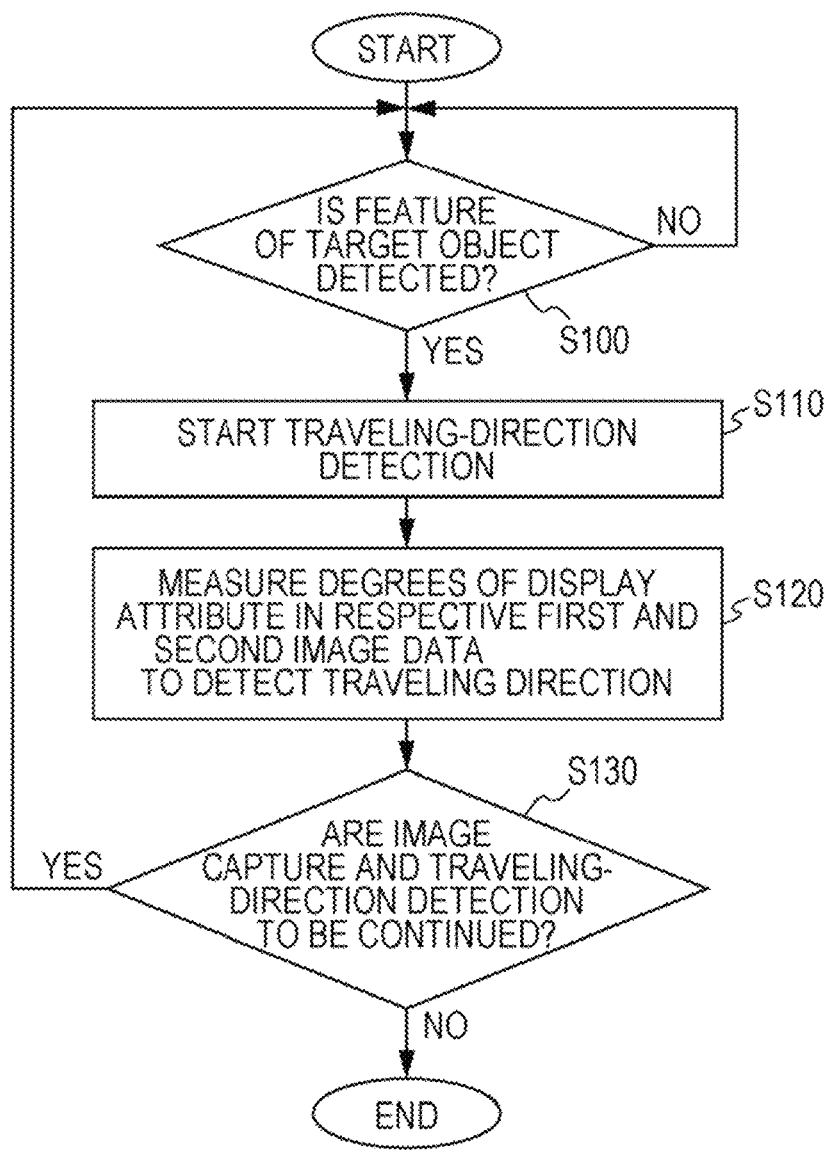
FIG. 10 is a flowchart illustrating one example of a processing flow for detecting a traveling direction.

FIG. 10 illustrates one example of a processing flow for detecting the traveling direction. Herein, a description will be given of an example in which the controller 500 executes individual processes to detect the relative traveling direction or the relative speed of the host vehicle or both thereof. A main body for the processes may be the ECU 800. In other words, the ECU 800 may detect the relative traveling direction or the relative speed of the host vehicle or both thereof, based on output data from the detecting device 1.

The controller 500 can detect a feature of a specific target object, for example, by using a known object-recognition algorithm. Upon detecting the feature, the controller 500 starts booting a program for detecting a vehicle traveling direction. Then, the process proceeds to a process for detecting a relative traveling direction (START and step S100 in FIG. 10).

The controller 500 starts detection of the relative traveling direction (step S110). For example, in the imaging sequence illustrated in FIG. 9A, the controller 500 sets a frame for direction detection.

Now, consider acquiring multiple-exposure image data in accordance with the general multiple exposures described above with reference to FIG. 6A. For example, in the multiple-exposure image data illustrated in FIG. 6B, which of arbitrary two pieces of image data is acquired first is not distinguishable. This is due to the degrees of a common display attribute being the same between the two pieces of image data. In the multiple-exposure image data illustrated in FIG. 6B, the common display attribute is lightness. That is, it is difficult to detect the relative traveling direction of the host vehicle with respect to a vehicle ahead, based on the multiple-exposure image data. More specifically, a clear distinction cannot be made as to whether the host vehicle relatively accelerates to reduce the distance to the vehicle ahead or the host vehicle relatively decelerates to increase the distance to another vehicle.

The imaging device 100 performs a plurality of image captures with the sensitivity per unit time being varied by changing the level of the control signal V2 between a plurality of exposures in a unit frame period, for example, as illustrated in FIG. 7A or 7C. As a result, it is possible to acquire multiple-exposure image data including a plurality of pieces of image data in which the degrees of the common display attribute differ from each other. The controller 500 receives the multiple-exposure image data output from the imaging device 100. The controller 500 can measure a difference in the degrees of the common display attribute, based on the multiple-exposure image data, and can distinguish which of two pieces of image data was acquired earlier. Thus, the controller 500 can detect the relative traveling direction, based on the lightness of license plate images in first and second image data (step S120).

Thereafter, the controller 500 determines whether or not the image capture and the traveling-direction detection are to be continued (step S130). When the image capture and the traveling-direction detection are to be continued, the controller 500 repeats the above-described flow. On the other hand, when the image capture and the traveling-direction detection are to be finished, the controller 500 ends the flow.

Figure 11A:
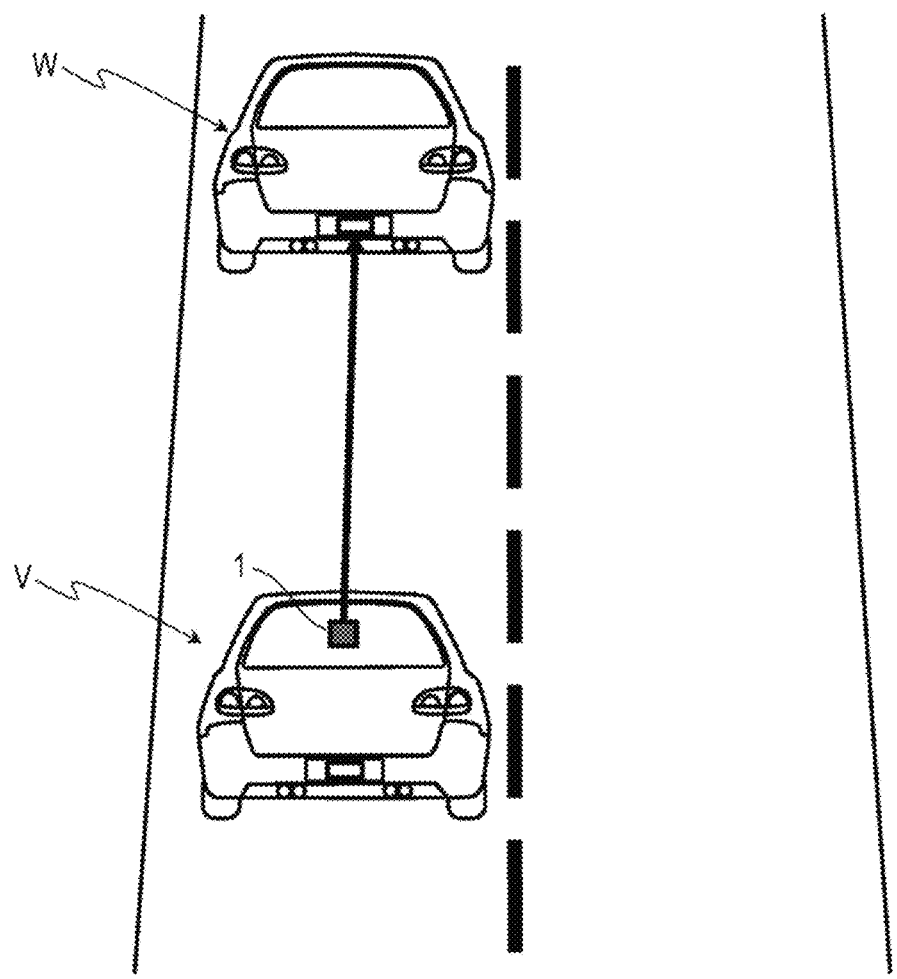
FIG. 11A is a schematic diagram illustrating a state in which a host vehicle on which the detecting device is mounted is traveling while following a vehicle ahead.
Figure 11B:
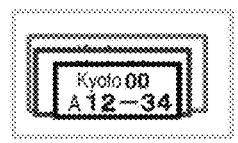
FIG. 11B is a schematic diagram illustrating a measurement image in a multiple-exposure image data that is acquired.
Figure 11C:
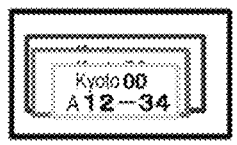
FIG. 11C is a schematic diagram illustrating a measurement image in a multiple-exposure image data that is acquired.
Figure 12A:
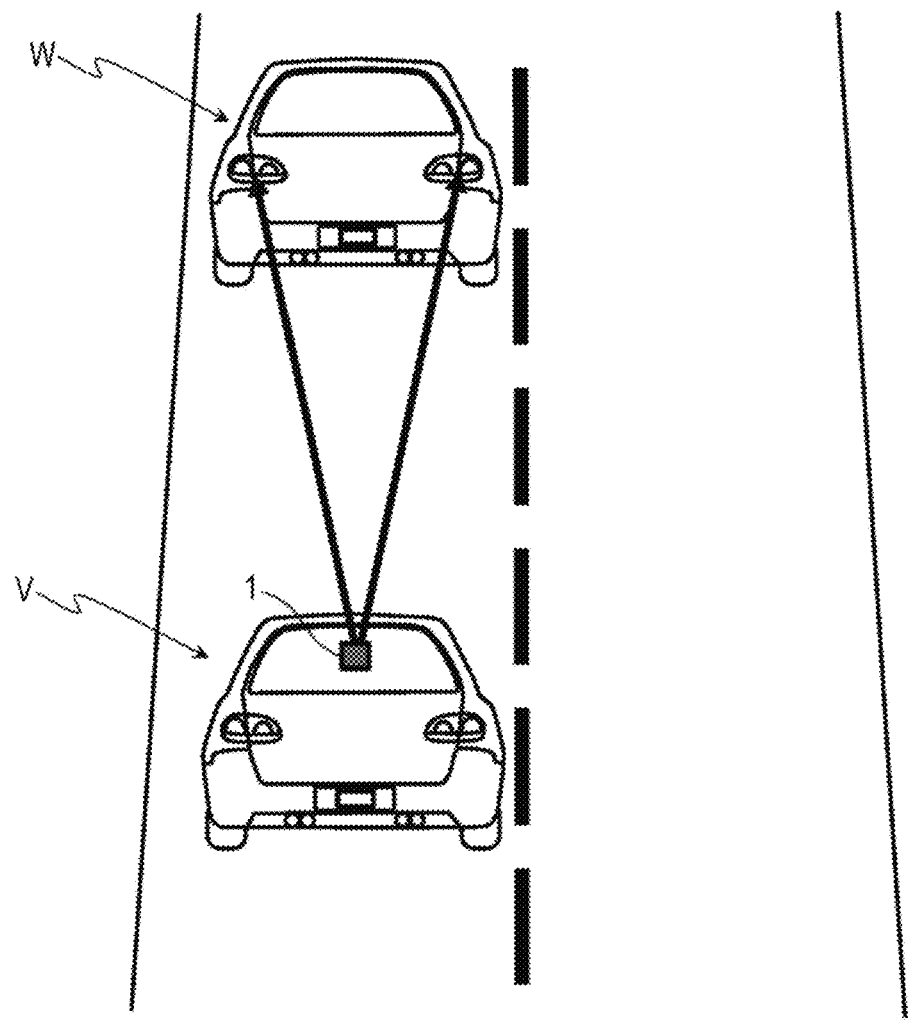
FIG. 12A is a schematic diagram illustrating a state in which the host vehicle on which the detecting device is mounted is traveling while following the vehicle W ahead.

FIGS. 11A and 12A schematically illustrate a state in which a host vehicle V on which the detecting device 1 is mounted is traveling while following a vehicle W ahead. FIGS. 11B, 11C, 12B, and 12C each schematically illustrate one example of an image represented by multiple-exposure image data that is acquired.

FIG. 11A illustrates an example in which the specific target object is a license plate. When the imaging device 100 images the license plate of the vehicle W in accordance with the drive illustrated in FIG. 7A, multiple-exposure image data illustrated in FIG. 11B is acquired. According to this drive, the later the image data is acquired, the higher the lightness of the image is. In the multiple-exposure image data illustrated in FIG. 11B, the size of the image of the license plate decreases gradually in a time series. The controller 500 detects the relative traveling direction, based on the lightness of the image of the license plate and a change in the size of the image. In this example, it can be understood that the relative traveling direction of the host vehicle V with respect to the vehicle W is backward. It can also be understood from this that the relative speed of the host vehicle V is decreasing.

FIG. 11C illustrates another example in which the specific target object is a license plate. When the imaging device 100 images the license plate in accordance with the drive illustrated in FIG. 7C, the multiple-exposure image data illustrated in FIG. 11C is acquired. According to this drive, the later the image data is acquired, the lower the lightness of the image is. In the multiple-exposure image data illustrated in FIG. 11C, the size of the image of the license plate decreases gradually in a time series. In this example, it can be understood that the relative traveling direction of the host vehicle V with respect to the vehicle W is backward. It can also be understood from this that the relative speed of the host vehicle V is decreasing.

Figure 12B:
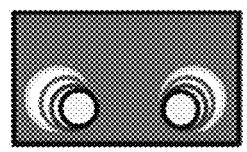
FIG. 12B is a schematic diagram illustrating a measurement image in a multiple-exposure image data that is acquired.

FIG. 12A illustrates an example in which the specific target object is brake lights. When the imaging device 100 images the brake lights of the vehicle W in accordance with the drive illustrated in FIG. 7A, the multiple-exposure image data illustrated in FIG. 12B is acquired. According to this drive, the later the image data is acquired, the higher the lightness of the image is. In the multiple-exposure image data illustrated in FIG. 12B, the size of the image of the brake lights decreases gradually in a time series. In this example, it can be understood that the relative traveling direction of the host vehicle V with respect to the vehicle W is backward. It can also be understood from this that the relative speed of the host vehicle V is decreasing.

Figure 12C:
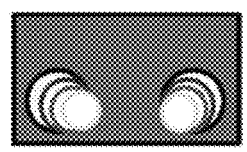
FIG. 12C is a schematic diagram illustrating a measurement image in a multiple-exposure image data that is acquired.

FIG. 12C illustrates another example in which the specific target object is brake lights. When the imaging device 100 images the brake lights in accordance with the drive illustrated in FIG. 7C, the multiple-exposure image data illustrated in FIG. 12C is acquired. According to this drive, the later the image data is acquired, the lower the lightness of the image is. In the multiple-exposure image data illustrated in FIG. 12C, the size of the image of the license plate decreases gradually in a time series. In this example, it can be understood that the relative traveling direction of the host vehicle V with respect to the vehicle W is backward. It can also be understood from this that the relative speed of the host vehicle V is decreasing. Also, when the brake lights are used as the specific target object, the relative traveling direction and the relative speed may be detected using the largeness/smallness of the gap between the left and right brake lights in the multiple-exposure image data.

Although, in the above-described example, the controller 500 starts detection of the traveling direction upon detecting the feature of the specific target object, the present disclosure is not limited thereto. For example, the controller 500 may constantly detect the traveling direction while the engine of the vehicle is running. Alternatively, the controller 500 may detect the traveling direction at regular intervals or may start detection of the traveling direction upon entering a highway. In addition, the controller 500 may detect the traveling direction upon a change in internal control information about gear shifting or the like.

The license plate and the brake lamps are examples of the specific target object. The specific target object can be any target object having dimensions specified by a standard. The specific target object can be, for example, a dedicated marker used for measuring the speed of a vehicle. It is desirable that, when the relative traveling direction and the relative speed are to be measured, the imaging device 100 be installed at a front side or rear side of the vehicle. This makes it possible to suppress error during measurement. Also, when an imaging device 100 having a wide imaging range is installed, for example, on a side mirror or a headlight of the vehicle, it is possible to minimize influences of the arrangement on the shape and design of the vehicle. The "wide imaging range" means that, for example, the angle of view is large.

<1.4. Specific Example 2 of Operation of Detecting Device>

Specific example 2 of the operation of the detecting device 1 will be described with reference to FIGS. 13A to 13C.

Figure 13A:
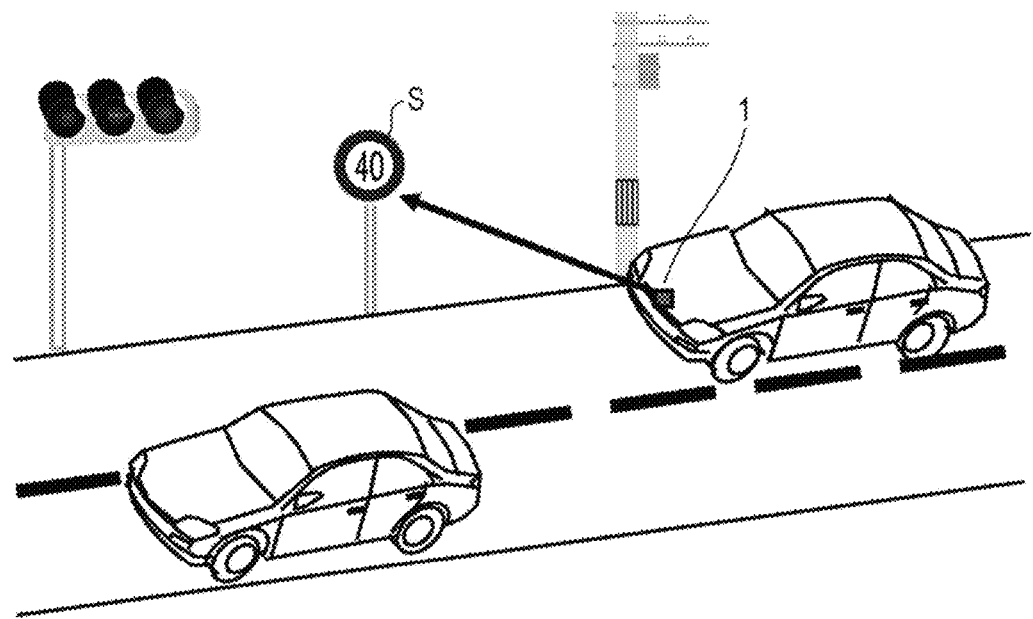
FIG. 13A is a schematic diagram illustrating a state in which the host vehicle on which the detecting device is mounted is traveling while imaging a road sign.
Figure 13B:
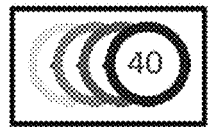
FIG. 13B is a schematic diagram illustrating a measurement image in a multiple-exposure image data that is acquired.

FIG. 13A schematically illustrates a state in which the host vehicle on which the detecting device 1 is mounted is traveling while imaging a road sign S. FIGS. 13B and 13C schematically illustrate an image represented by pieces of image data included in multiple-exposure image data that is acquired.

In this specific example, the detecting device 1 detects the absolute traveling direction of the host vehicle by imaging a stationary body. The stationary body is, for example, a road sign S installed along the road. The road sign S acts as a specific target object. When the imaging device 100 images the road sign S in accordance with the drive illustrated in FIG. 7A, the multiple-exposure image data illustrated in FIG. 13B or 13C is acquired. According to this drive, the later the image data is acquired, the higher the lightness of the image is. In the multiple-exposure image data illustrated in FIG. 13B, the lightness at the right end of the image, that is, the lightness of a rearmost image of the road sign S relative to the vehicle is the highest, and the lightness of the front most image is the lowest. This means that the host vehicle is traveling in the forward direction.

Figure 13C:
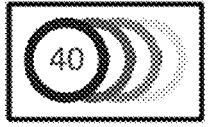
FIG. 13C is a schematic diagram illustrating a measurement image in a multiple-exposure image data that is acquired.

On the other hand, in the multiple-exposure image data illustrated in FIG. 13C, the lightness at the left end of the image, that is, the lightness of the front most image of the road sign S relative to the vehicle is the highest, and the lightness of the rearmost image is the lowest. This means that the host vehicle is traveling backward.

As described above, the detecting device 1 can detect the absolute traveling direction of the host vehicle, based on the multiple-exposure image data of the road sign S. In this example, when the installation place of the road sign S is considered, it is desirable that the imaging device 100 be installed on a side surface of the vehicle.

<1.5. Specific Example 3 of Operation of Detecting Device>

Specific example 3 of the operation of the detecting device 1 will be described with reference to FIG. 14.

FIG. 14 illustrates one example of a processing flow for detecting the relative or absolute traveling direction and the speed of a vehicle and controlling braking and accelerating of the vehicle based on the detection results.

When the controller 500 detects a feature of a specific target object, like that described above (step S200), the process proceeds to a process for detecting the traveling direction and the speed.

The controller 500 starts detection of the traveling direction and the speed (step S210).

The controller 500 acquires a multiple-exposure image data, for example, in a frame for direction detection. As in step S120 in the processing flow illustrated in FIG. 10, the controller 500 measures degrees of a display attribute in respective first and second image data in the multiple-exposure image data to detect the traveling direction (step S220).

The distance measuring unit 600, for example, a TOF, measures a distance d from the host vehicle to the specific target object, for example, in response to a start instruction from the controller 500. The controller 500 receives the distance d from the distance measuring unit 600 (step 230).

The controller 500 detects the speed by using an interval m of specific-target-object images represented by the first and second image data included in the multiple-exposure image data, the distance d from the host vehicle to another vehicle, and an exposure interval t between a first exposure period and a second exposure period (step S240). The specific target object is, for example, a license plate. The distance d from the host vehicle to the other vehicle is, to be precise, the distance from the distance measuring unit 600 to the license plate of the other vehicle. The speed is the speed of the host vehicle with respect to a vehicle traveling in the surroundings.

The interval of the specific-target-object images represented by the first and second image data included in the multiple-exposure image data can be represented by, for example, the interval of feature points in the respective specific-target-object images. The feature point is, for example, an edge of the specific target object. The controller 500 can detect the edge of the specific target object, for example, by using a known edge-detection scheme. The controller 500 computes an interval I between the edges of the specific target objects in the pieces of image data.

The exposure interval t between the first exposure period and the second exposure period is illustrated, for example, in FIG. 7A. The exposure interval t illustrated in FIG. 7A corresponds to a period from the end of the first exposure period to the end of the second exposure period. In other words, the exposure interval t corresponds to an interval of timings at which the control signal V2 goes from high to low.

For example, when a license plate is imaged with the general multiple exposures, images of the license plate are multiplexed along the traveling direction of the vehicle. Thus, with only the information, it is not possible to distinguish whether the host vehicle is approaching the surrounding vehicle or is moving away from the surrounding vehicle. In this specific example, in step S220, information indicating the traveling direction of the host vehicle is obtained. Therefore, the detecting device 1 can obtain information including the magnitude of the speed of the host vehicle and the direction thereof. That is, the detecting device 1 can obtain an accurate speed vector of the host vehicle.

The detecting device 1 transmits the information indicating the traveling direction and the speed to the ECU 800 via the image transmission IF 400.

The ECU 800 controls braking and accelerating of the vehicle, based on the information indicating the traveling direction and the speed, the information being received from the detecting device 1 (step S250). For example, when travel assistance corresponding to autonomous driving level 0 or 1 is assumed, the ECU 800 controls braking, for example, when the gap (the distance d) to the surrounding vehicle becomes a predetermined threshold or less, or when the speed exceeds a predetermined threshold. Specifically, for example, when it is detected that the distance to another vehicle traveling ahead has become smaller than a predetermined value, the brake of the host vehicle may be actuated so as to increase the distance to the other vehicle, or control may be performed so as to actuate the gas pedal of the other vehicle. Also, for example, when it is detected that the distance to another vehicle traveling ahead has become larger than a predetermined value, the gas pedal of the host vehicle may be actuated so as to reduce the distance to the other vehicle, or control may be performed so as to actuate the brake of the other vehicle. The autonomous driving levels mean automation references from levels 0 to 4 specified by the Japanese Government. For example, when autonomous driving or fully autonomous driving corresponding to autonomous driving levels 2 to 4 is assumed, the ECU 800 controls braking, for example, based on the distance d between the host vehicle and the surrounding vehicle, information of an imaged road sign, road traffic information, and map information. The map information is, for example, GPS information.

According to the vehicle-traveling control system 1000, traveling of the host vehicle and another vehicle can be controlled based on the detection results of the traveling direction and the speed. For example, the detection results obtained by the host vehicle can be used for traveling control of the host vehicle. Alternatively, the detection results obtained by the host vehicle can be used for traveling control of another vehicle. The ECU 800 may also be adapted to generate a signal for controlling the braking and accelerating of the vehicle based on the information indicating the traveling direction and the speed, the information being received from the detecting device 1, and to output the signal to outside. In this case, for example, the autonomous-driving control device in the host vehicle or the other vehicle may receive the signal and control driving of the host vehicle or the other vehicle.

The controller 500 determines whether or not the image capture is to be continued (step S260). For example, the controller 500 determines that the image capture is to be continued, when the engine is running, and determines that the image capture is to be stopped, when the engine is stopped. When the controller 500 determines that the image capture is to be continued, the process returns to step 200 again.

As described above, according to the vehicle-traveling control system 1000 including the detecting device 1 and the ECU 800, a vehicle-traveling control system supporting traveling assistance, autonomous driving, and fully autonomous driving and a vehicle on which the vehicle-traveling control system is mounted are provided.

Although an example in which the distance measuring unit 600 measures the distance d from the host vehicle to the target object has been described in step S230, the present disclosure is not limited thereto. The controller 500 can also calculate the distance d by analyzing the multiple-exposure image data.

The controller 500 can calculate the distance d from the host vehicle to another vehicle, based on a result of comparison between the actual size of a specific target object and the size of the specific target object in the multiple-exposure image data. The actual size of the specific target object is pre-specified by a standard. The size s of the specific target object in the multiple-exposure image data at the distance d is determined based on the standard and various parameters related to the imaging device 100 and the optical system 200. The correspondence relationship between the distance d and the size s of the specific target object can be, for example, pre-stored in the program memory 530. For example, based on the correspondence relationship, the controller 500 can compute the distance d from the host vehicle to another vehicle. According to this configuration, since the distance measuring unit 600 becomes unnecessary, the vehicle-traveling control system 1000 can be simplified, and the system cost can be reduced. Also, although, herein, all processes are performed in a time series, the order of the individual processes can be changed, or the individual processes can be performed in parallel. For example, the traveling-direction detection and the speed detection can also be performed in parallel with sequential image captures. In this case, all of data resulting from the image captures may be utilized or may be utilized after thinning only data required for computation.

<1.6. Specific Example 4 of Operation of Detecting Device>

Specific example 4 of the operation of the detecting device 1 will be described with reference to FIG. 15.

Figure 15:
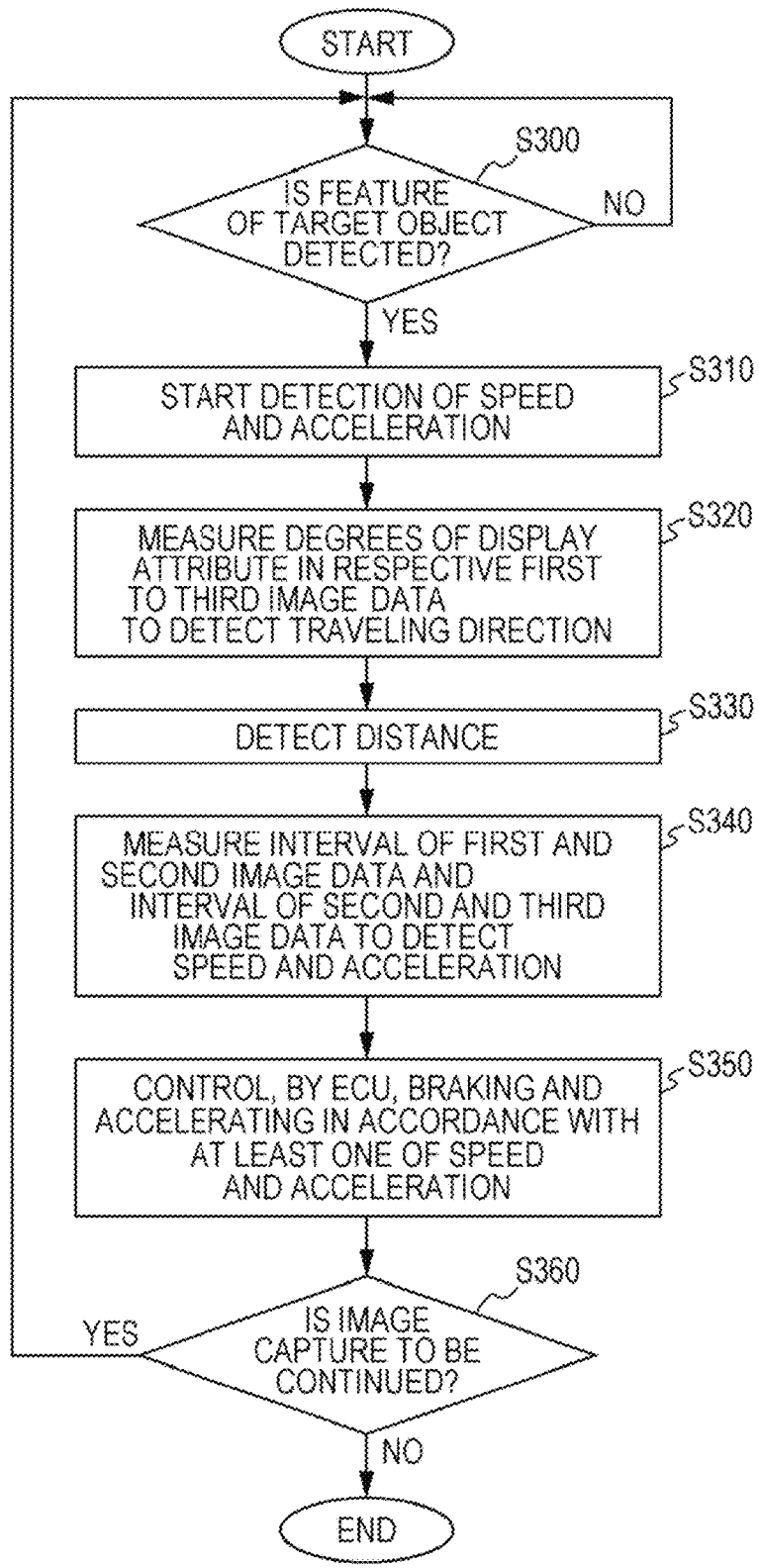
FIG. 15 is a flowchart illustrating one example of a processing flow for detecting a traveling direction, relative speed, and an acceleration of the vehicle and controlling braking and accelerating of the vehicle based on the detection results.

FIG. 15 illustrates one example of a processing flow for detecting the traveling direction, the speed, and the acceleration of a vehicle and controlling braking and accelerating of the vehicle based on the detection results.

The processing flow illustrated in FIG. 15 differs from the processing flow illustrated in FIG. 14 in that the processing flow illustrated in FIG. 15 includes a process for detecting an acceleration. The different point will be mainly described below.

The controller 500 detects the traveling direction by measuring the degrees of a display attribute of target-object images represented by first and second image data, as in step S120 in the processing flow illustrated in FIG. 10. In addition, the controller 500 measures the degrees of the display attribute of the target-object image represented by the second image data and a target-object image represented by third image data to detect the traveling direction (step S320). The first to third image data are a group of image data that are continuous in a time series. The first and second image data are typically a set of two adjacent pieces of image data whose exposure periods are adjacent to each other, and the second and third image data are typically a set of two adjacent pieces of image data whose exposure periods are adjacent to each other. However, the two pieces of image data do not have to be a set of two pieces of image data that are continuous in a time series. For example, of the first to fourth pieces of continuous image data, a set of the first and third image data and a set of the second and fourth image data may also be selected.

The controller 500 obtains speed 1 including information on the magnitude and the direction, based on the set of first and second image data. In this case, the speed is represented by a speed vector. The controller 500 further obtains speed 2, based on the set of second and third image data. The controller 500 computes the acceleration by measuring the amount of change in speeds 1 and 2 per unit time (step 340).

The detecting device 1 transmits information indicating the traveling direction, speeds 1 and 2, and the acceleration to the ECU 800 via the image transmission IF 400.

The ECU 800 can control the braking and the accelerating of the vehicle, based on at least one of the pieces of information indicating the traveling direction, speeds 1, 2, and the acceleration, the information being received from the detecting device 1.

According to this specific example, the braking and the accelerating of a vehicle can be controlled using the measured speed and acceleration. Thus, it is possible to continuously recognize the traveling state of the host vehicle, so that safer control can be performed.

A more detailed algorithm for detecting the speed and the acceleration of a vehicle will be described with reference to FIGS. 16A to 20. Before the algorithm in the present disclosure is described, a description will be given of an algorithm in a reference example.

Figure 16B:
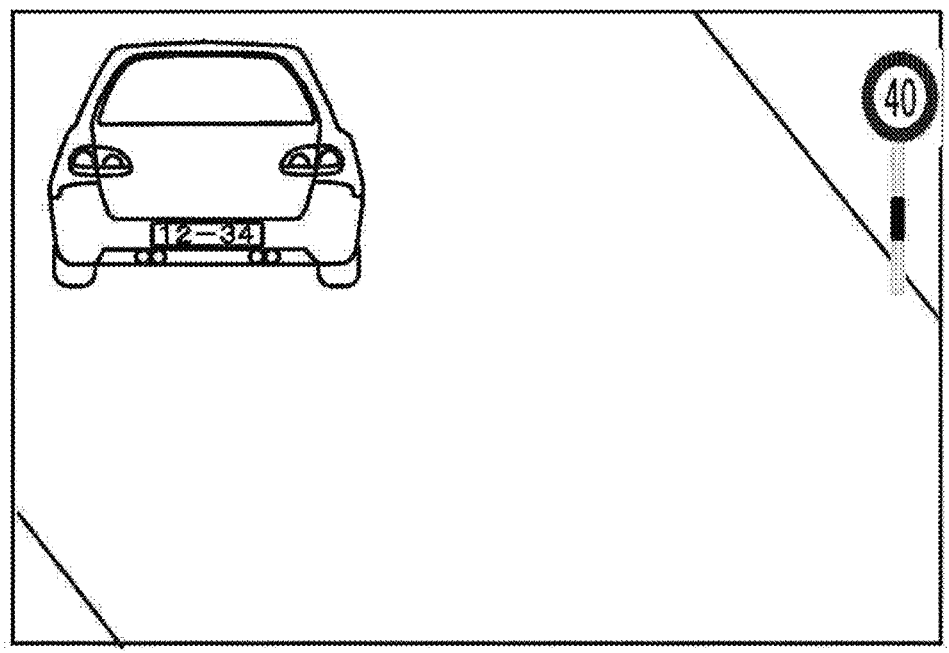
FIG. 16B is a schematic diagram illustrating an image in a frame t−1.
Figure 16C:
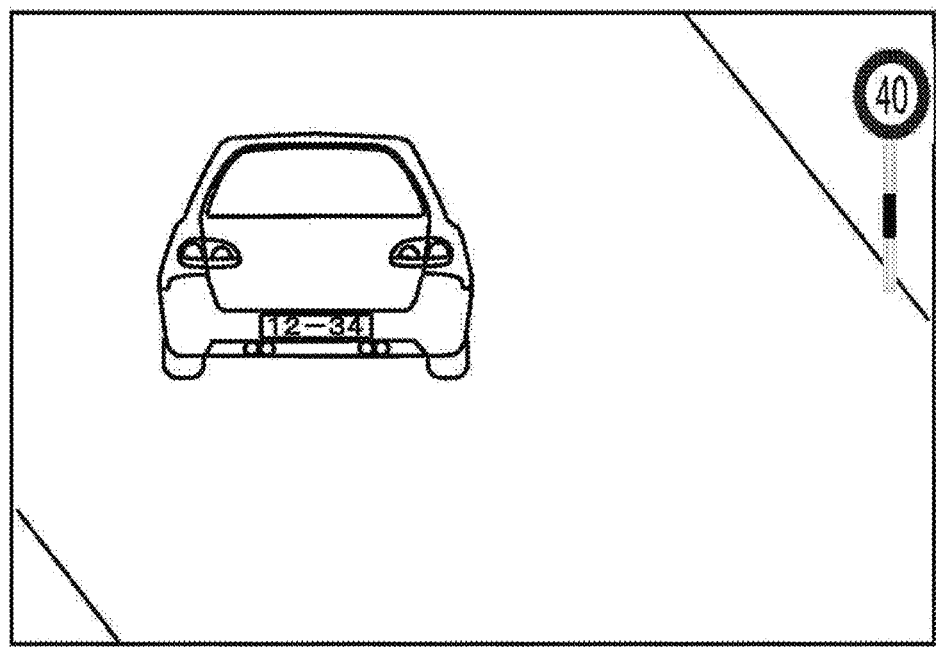
FIG. 16C is a schematic diagram illustrating an image in a frame t.
Figure 16D:
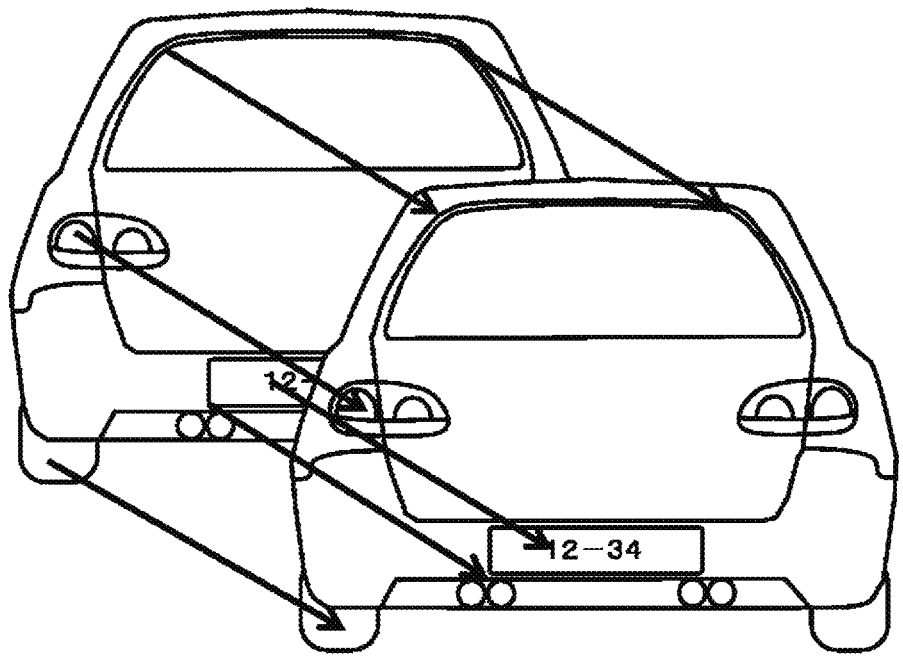
FIG. 16D is a diagram schematically illustrating the direction of movement of a specific target object.

FIG. 16A illustrates functional blocks of a controller in the reference example. FIG. 16B schematically illustrates an image in a frame t−1. FIG. 16C schematically illustrates an image in a frame t that follows the frame t−1. FIG. 16D schematically illustrates motion of a specific target object, the motion being obtained from pieces of image data in the frames t−1 and t.

The controller in the reference example includes at least two frame memories 51A and 51B, a motion-vector detecting unit 52, an object detecting unit 53, and a speed detecting unit 54. An algorithm for detecting the speed is realized by, for example, a combination of a microcontroller and software. Each of the functional blocks illustrated in FIG. 16A is illustrated in a unit of functional block, not in a unit of hardware. The pieces of image data corresponding to the respective frames t−1 and t are output from an imaging device 50. The image data corresponding to the frame t−1 is temporarily held in the frame memory 51A. The image data corresponding to the frame t is temporarily held in the frame memory 51B.

The motion-vector detecting unit 52 reads the image data corresponding to the frame t from the frame memory 51A and reads the image data corresponding to the frame t−1 from the frame memory 51B. Also, the motion-vector detecting unit 52 compares the values of the pieces of image data for each pixel to identify a pixel group in which the values of the pieces of image data have differences. In addition, based on the identified pixel group, the motion-vector detecting unit 52 generates a motion vector signal indicating the motion of a specific target object.

Specifically, as illustrated in FIG. 16D, two pieces of image data are compared with each other to thereby detect the direction of movement and the amount of movement of a specific target object in the image.

The object detecting unit 53 reads the image data corresponding to the frame t from the frame memory 51A and detects a feature part of the specific target object by using a known object-recognition algorithm. The specific target object is a target object used for image analysis for speed sensing. As described above, the specific target object refers to, for example, on-road marking information, such as a white line or a sign, or the license plate of another vehicle. Herein, a specific target object that is stationary may be referred to as a "static object", and a specific target object that is moving may be referred to as a "motioning object". The object detecting unit 53 detects a feature part of the specific target object by using a common sensing scheme, such as shape detection or edge detection.

The speed detecting unit 54 calculates at least one of a host-vehicle speed, an another-vehicle speed, and a relative speed, based on a motion vector signal output from the motion-vector detecting unit 52 and a detection result output from the object detecting unit 53. When a specific target object exists at a portion having a motion indicated by the motion vector signal, the speed detecting unit 54 detects the amount of movement thereof as a speed. For example, the speed detecting unit 54 first calculates the speed of the host vehicle, based on the size of the on-road marking information in the image and the amount of movement thereof. Next, the speed detecting unit 54 calculates the relative speed of the host vehicle or the relative speed of another vehicle, based on the speed of the host vehicle, the size of the license plate of the other vehicle, and the amount of movement of the license plate.

Figure 16E:
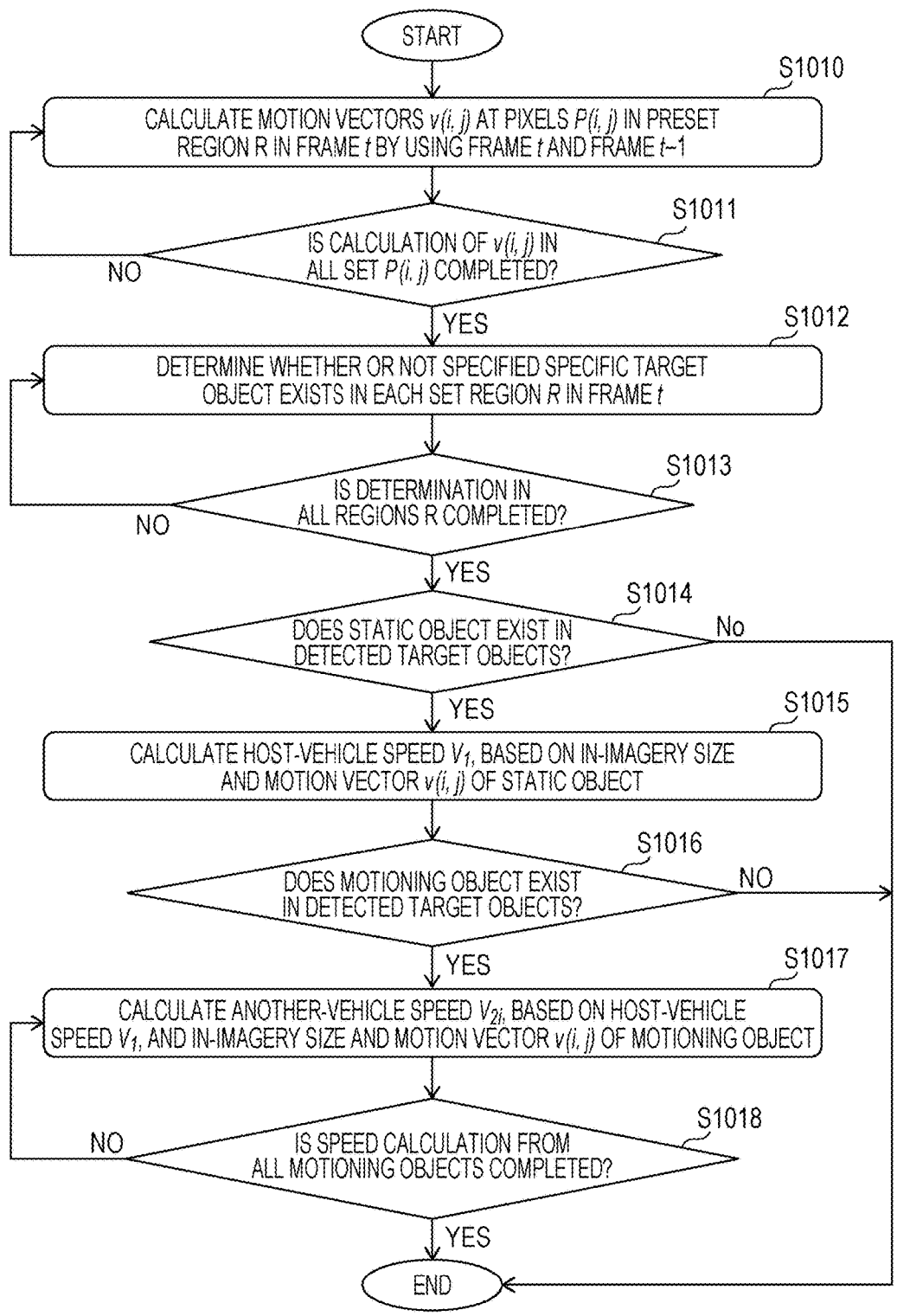
FIG. 16E is a flowchart illustrating a processing flow for an algorithm in the reference example for detecting a speed.

FIG. 16E illustrates a processing flow for an algorithm in the reference example for detecting a speed. By using image data for a frame t and image data for a frame t−1, the motion-vector detecting unit 52 calculates motion vectors v(i, j) at all pixels P(i, j) in a preset region R in the image data for the frame t (steps S1010 and S1011). The object detecting unit 53 determines whether or not a specified specific target object exists in the region R in the image data for the frame t (steps S1012 and S1013). When a static object exists in detected specific target objects (Yes in step S1014), the speed detecting unit 54 calculates a speed $V_1$ of the host vehicle, based on an in-image size and the motion vector v(i, j) of the static object (step S1015). When any motioning object exists in the detected specific target objects after the speed $V_1$ of the host vehicle is calculated (Yes in step S1016), the speed detecting unit 54 calculates speeds $V_{2i}$ of all motioning objects, based on the speed $V_1$ of the host vehicle, and in-image sizes and the motion vectors v(i, j) of the motioning objects (steps S1017 and S1018).

According to this reference example, the speed $V_1$ of the host vehicle is first determined, and then the speeds $V_{2i}$ of the motioning objects are determined. Thereafter, the relative speed of the host vehicle or the relative speed of another vehicle is determined based on the speed $V_1$ of the host vehicle and the speeds $V_{2i}$ of the motioning objects.

Figure 17:
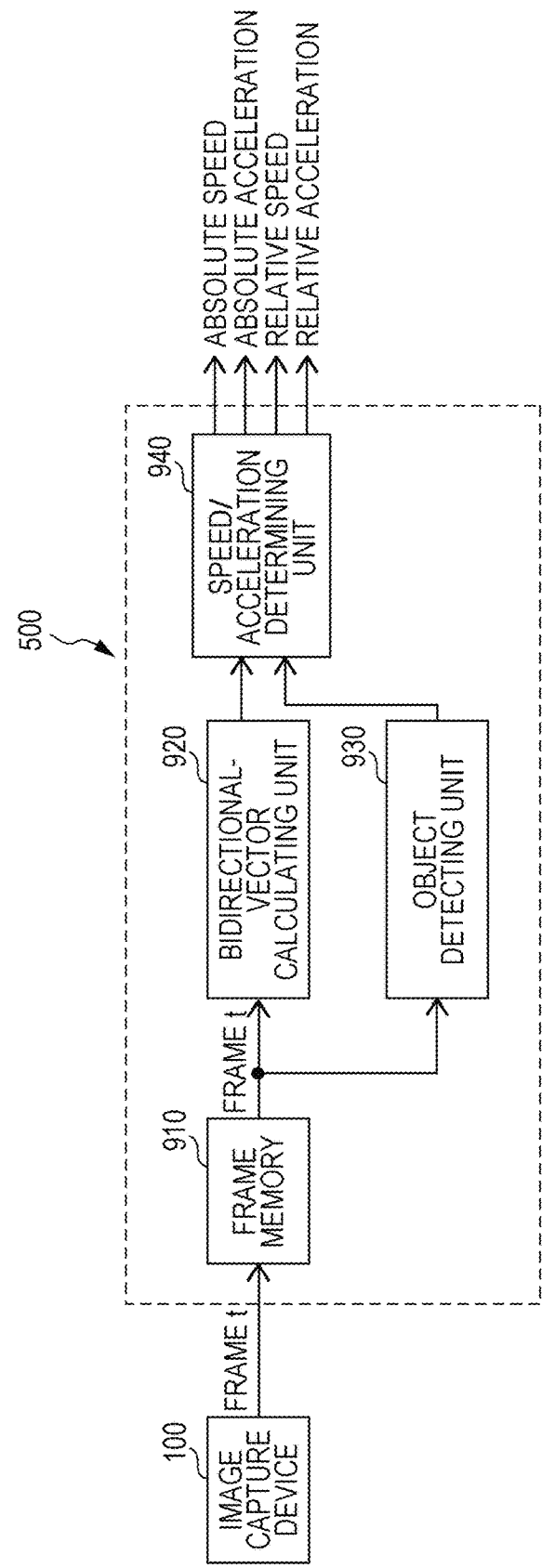
FIG. 17 is a functional block diagram illustrating functional blocks of a controller for detecting a speed and an acceleration by using multiple-exposure image data.
Figure 18:
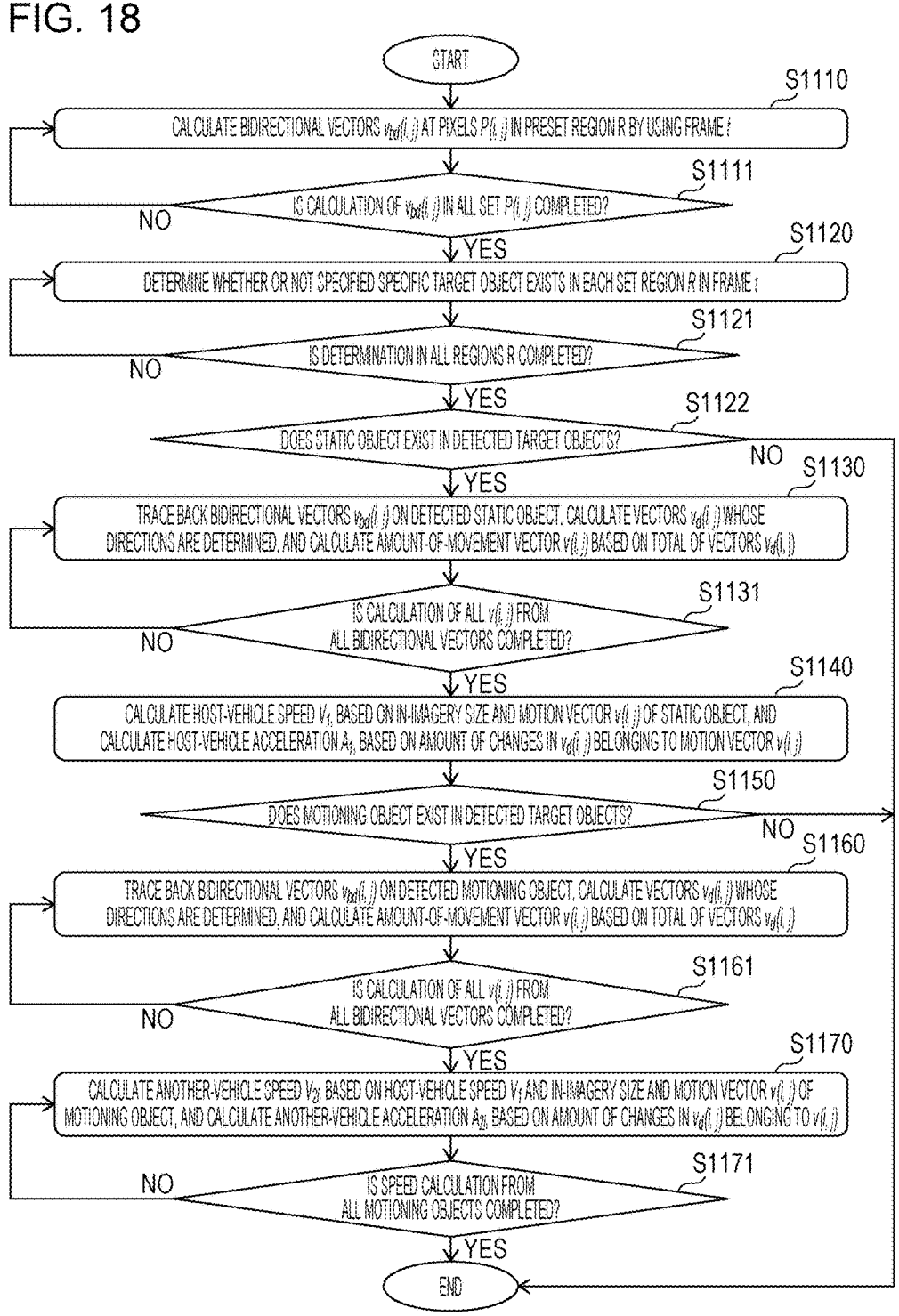
FIG. 18 is a flowchart illustrating a processing flow for an algorithm for detecting a speed and an acceleration, the algorithm being, implemented in the controller.
Figure 19A:
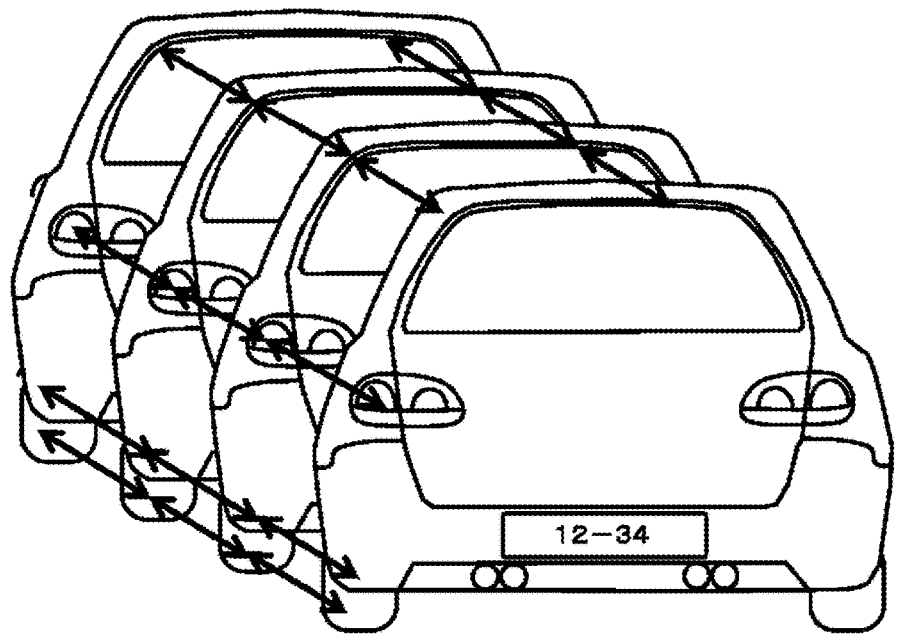
FIG. 19A is a schematic diagram illustrating one example of an image represented by multiple-exposure image data.

Next, a description will be given of an algorithm for detecting a speed and an acceleration by using multiple-exposure image data. FIG. 17 illustrates functional blocks in the controller 500. FIG. 18 illustrates a processing flow for an algorithm for detecting a speed and an acceleration. FIG. 19A illustrates one example of an image in multiple-exposure image data.

The controller 500 includes a frame memory 910, a bidirectional-vector calculating unit 920, an object detecting unit 930, and a speed/acceleration determining unit 940. The algorithm for detecting the speed and the acceleration is realized by, for example, a combination of the microcontroller 550 illustrated in FIG. 1 and software. Each of the functional block illustrated in FIG. 17 is illustrated in a unit of functional block, not in a unit of hardware. The software can be, for example, a module that constitutes a computer program for executing a specific process corresponding to each functional block. Such a computer program can be stored in the program memory 530 illustrated in FIG. 1. The microcontroller 550 can read a command from the program memory 530 and sequentially execute each process.

The frame memory 910 corresponds to the working memory 540 illustrated in FIG. 1 or 2. The frame memory 910 may have a capacity that is capable of holding an image data for one frame. The frame memory 910 holds image data for a frame t which is multiple-exposure image data.

The bidirectional-vector calculating unit 920 reads the image data for the frame t from the frame memory 910. Also, the bidirectional-vector calculating unit 920 detects a feature part of a specific target object from the image data for the frame t. When the specific target object is moving in the period of the frame t, the feature part of the specific target object is detected from a plurality of portions in the image data for the frame t. The bidirectional-vector calculating unit 920 detects the motion of the specific target object from the positions of feature parts at the plurality of portions in the image.

FIG. 19A illustrates motion vectors calculated by the bidirectional-vector calculating unit 920. The directions of the motion vectors illustrated in FIG. 19A are not uniquely specified. Herein, a motion vector whose direction is not uniquely specified is referred to as a "bidirectional vector $v_{bd}(i, j)$".

As illustrated in FIG. 16D, according to the reference example, since pieces of image data for two frames at different time points are compared with each other, the feature parts of a specific target object exist in different frames, so that the directions of motion vectors can be uniquely determined. In contrast, when the multiple-exposure image data is used, the feature parts of the specific target object obtained at different time points exist in the same frame. Thus, the directions of motion vectors cannot be uniquely determined.

When attention is paid to a certain portion of a vehicle in the image illustrated in FIG. 19A, two images that are similar to the portion appear in the vicinity thereof. Although a movement trace of the vehicle can be recognized from the positions of the series of images, the anteroposterior relationship of the times at which the images at two opposite ends of the movement trace were acquired cannot be determined.

When the multiple-exposure image data is used, it is necessary to vary an imaging condition in order to identify the start point and the end point of the series of images. For example, the exposure time when a first image is acquired may further be increased. This makes it possible to increase the brightness of the first image and makes it possible to identify the start point of the series of images. Eventually, it is possible to obtain bidirectional vectors $v_{bd}(i, j)$ and the directions thereof.

The bidirectional-vector calculating unit 920 calculates bidirectional vectors $v_{bd}(i, j)$ with respect to pixels P(i, j) by using a frame t (step S1110). The bidirectional-vector calculating unit 920 performs the process in S1110 until bidirectional vectors $v_{bd}(i, j)$ are calculated with respect to all pixels P(i, j) in a preset region R (step S1111). The object detecting unit 930 determines whether or not a specific target object exists in the preset region R in the frame t, for example, by using edge detection (step S1120). The object detecting unit 930 reads image data for the frame t from the frame memory 910. The object detecting unit 930 detects a feature part of each specific target object by using a typical sensing scheme, such as shape detection or edge detection.

Figure 19B:
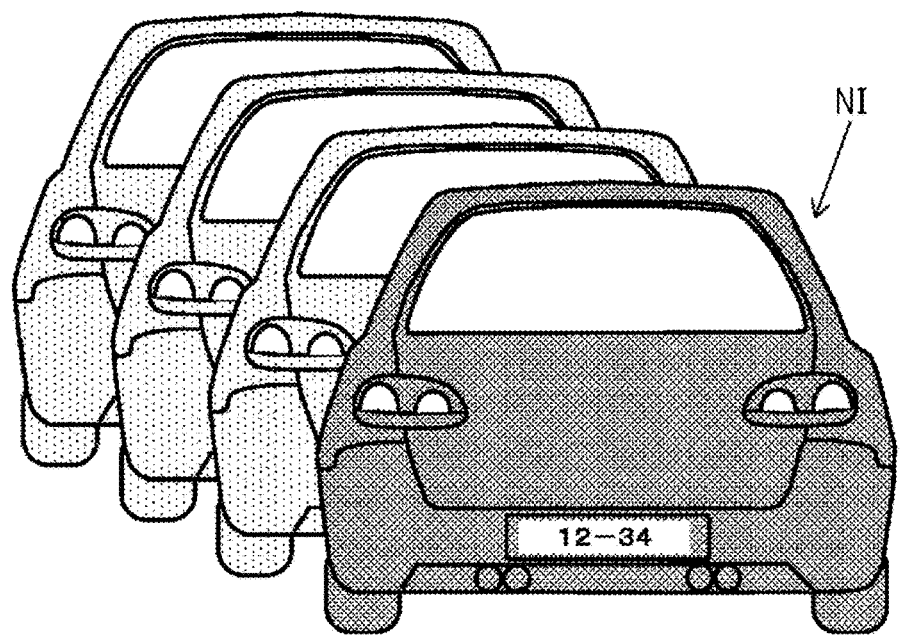
FIG. 19B is a schematic diagram illustrating one example of an multiple-exposure image including a series of vehicle images.

FIG. 19B illustrates an image represented by multiple-exposure image data resulting from image capture with the sensitivity being increased for only the last exposure of multiple exposures. In FIG. 19B, the last vehicle image acquired is NI. The brightness of an edge of a feature part in the last vehicle image acquired is higher than the brightness of the edges of the feature parts in the other images. The object detecting unit 930 senses the brightnesses of edges of feature parts in the images of the vehicle. The object detecting unit 930 performs a determination as to whether or not a specific target object exists on all regions R (step S1121). When this determination indicates that a static object and a motioning object exist in any of the regions R, the object detecting unit 930 may identify the presence of both. Also, when a plurality of motioning objects exists in any of the regions R, the object detecting unit 930 may identify the presence of the plurality of motioning objects.

When the object detecting unit 930 detects a static object (Yes in step S1122), the bidirectional-vector calculating unit 920 calculates bidirectional vectors $v_{bd}(i, j)$, based on the positions of feature parts of the specific target object detected by the object detecting unit 930. In addition, the bidirectional-vector calculating unit 920 compares the brightnesses of edges of the feature parts of the specific target object with each other to identify the last image acquired and determines the directions of the bidirectional vectors $v_{bd}(i, j)$. A bidirectional vector $v_{bd}(i, j)$ whose direction is uniquely specified is referred to as a "vector $v_d(i, j)$".

Figure 19C:
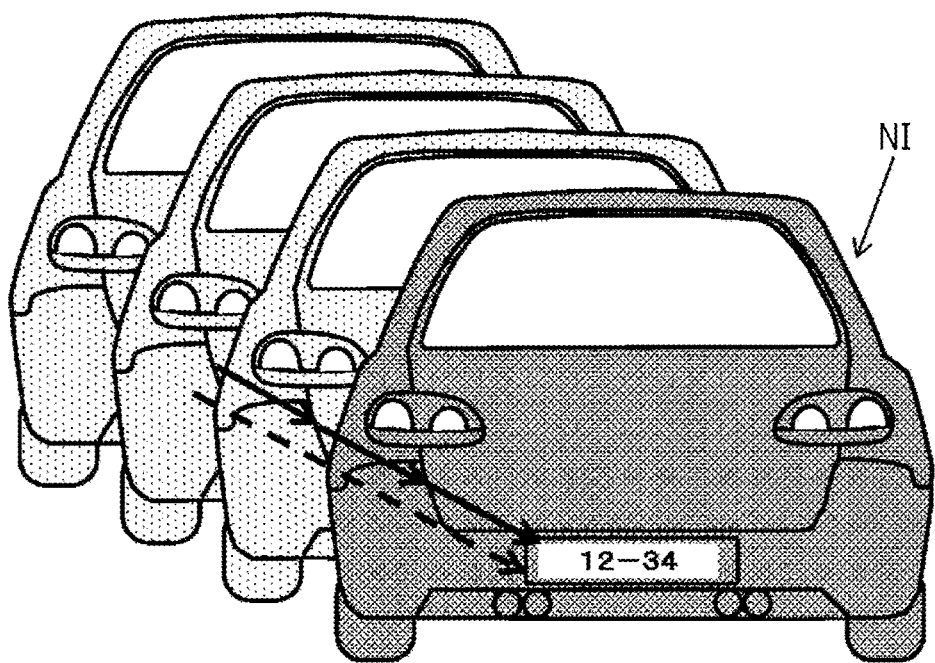
FIG. 19C is a schematic diagram illustrating an amount-of-movement vector representing the total of vectors at one point on the vehicle.

FIG. 19C illustrates a motion vector when attention is paid to one point on the license plate of a vehicle. A vector denoted by a dashed line represents an entire amount-of-movement vector $v(i, j)$, which is a total amount of movement in a frame. Vectors denoted by solid lines each represent a vector $v_d(i, j)$, which is an amount of movement between exposures of multiple exposures. Based on the total of the vectors $v_d(i, j)$, the bidirectional-vector calculating unit 920 calculates an entire amount-of-movement vector $v(i, j)$ (step S1130). The bidirectional-vector calculating unit 920 performs the process in S1130 until entire amount-of-movement vectors $v(i, j)$ are calculated with respect to all bidirectional vectors $v_{bd}(i, j)$ (step S1131). The bidirectional-vector calculating unit 920 outputs bidirectional vector signals including the entire amount-of-movement vector $v(i, j)$ of each static object to the speed/acceleration determining unit 940.

Based on the bidirectional vector signals from the bidirectional-vector calculating unit 920 and the detection result from the object detecting unit 930, the speed/acceleration determining unit 940 calculates the speed and the acceleration of the vehicle. Based on the size of the static object in the image and the entire amount-of-movement vector $v(i, j)$ of the static object, the speed/acceleration determining unit 940 calculates a host-vehicle speed $V_1$. In addition, the speed/acceleration determining unit 940 calculates a host-vehicle acceleration $A_1$, based on the amount of changes in the vectors $v_d(i, j)$ belonging to the entire amount-of-movement vector $v(i, j)$ (step S1140).

When the object detecting unit 930 detects a motioning object (Yes in step S1150), the bidirectional-vector calculating unit 920 traces back bidirectional vectors $v_{bd}(i, j)$ on the detected motioning object, based on the result of the motioning object detection performed by the object detecting unit 930, and calculates vectors $v_d(i, j)$ whose directions are determined. In addition, based on the total of the vectors $v_d(i, j)$, the bidirectional-vector calculating unit 920 calculates an entire amount-of-movement vector $v(i, j)$ as a motion vector of the motioning object (step S1160). The bidirectional-vector calculating unit 920 performs the process in S1160 until entire amount-of-movement vectors $v(i, j)$ are calculated with respect to all bidirectional vectors $v_{bd}(i, j)$ (step S1161). The bidirectional-vector calculating unit 920 outputs bidirectional vector signals further including the entire amount-of-movement vectors $v(i, j)$ of the motioning objects to the speed/acceleration determining unit 940.

The speed/acceleration determining unit 940 detects the speed, based on the amount of motion of the motioning object. More specifically, the speed/acceleration determining unit 940 calculates the speed and the acceleration of the vehicle by using the amount of motion of the motioning object, the amount being determined based on the bidirectional vector signals from the bidirectional-vector calculating unit 920 and the detection result from the object detecting unit 930. Based on the host-vehicle speed $V_1$ and the in-image size and the entire amount-of-movement vector $v(i, j)$ of the motioning object, the speed/acceleration determining unit 940 calculates a motioning-object speed $V_{2i}$, that is, the speed of another vehicle. In addition, based on the amount of changes in the vectors $v_d(i, j)$ belonging to the entire amount-of-movement vector $v(i, j)$ of the motioning object, the speed/acceleration determining unit 940 calculates an acceleration $A_{2i}$ of the other vehicle (step S1170). The speed/acceleration determining unit 940 performs the process in S1170 until motioning-object speeds $V_{2i}$ and moving body accelerations $A_{2i}$ are calculated with respect to all the motioning objects detected by the object detecting unit 930 (step S1171).

The speed/acceleration determining unit 940 can determine the relative speed of the host vehicle or another vehicle, based on the calculated host-vehicle speed $V_1$ and another-vehicle speed $V_{2i}$. Also, the speed/acceleration determining unit 940 can determine the relative acceleration of the host vehicle or another vehicle, based on the calculated host-vehicle acceleration $A_1$ and another-vehicle acceleration $A_{2i}$.

Figure 20:
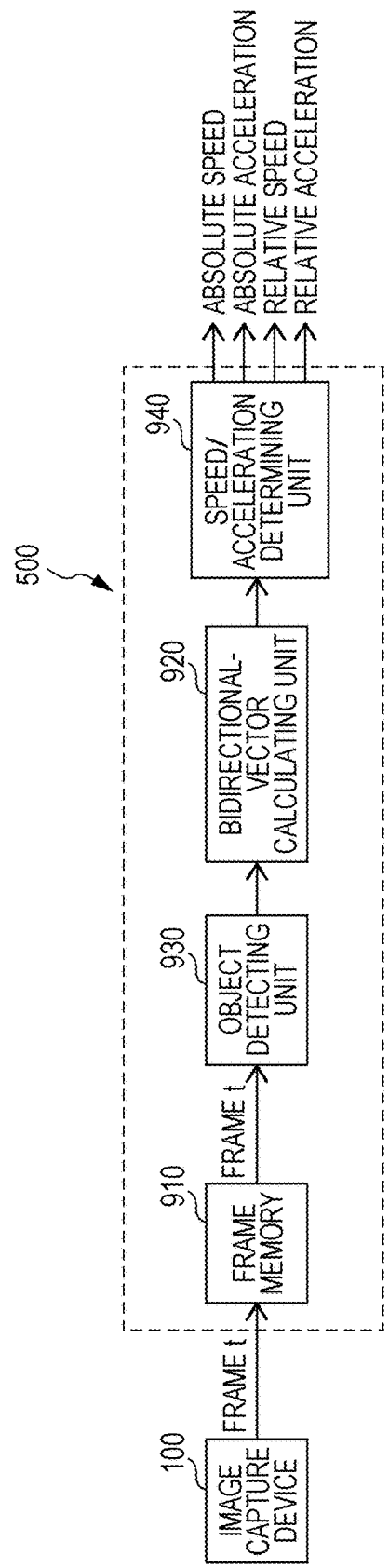
FIG. 20 is a functional block diagram illustrating variations of functional blocks of the controller for detecting a speed and an acceleration by using the multiple-exposure image data.

FIG. 20 illustrates another example of the functional blocks in the controller 500 that detects a speed and an acceleration by using the multiple-exposure image data. As illustrated, after a process in which the object detecting unit 930 senses a specific target object, the bidirectional-vector calculating unit 920 may execute a process for generating bidirectional vector signals.

In this manner, it is possible to detect the speed and the acceleration of a specific target object by using the multiple-exposure image data. Thus, for example, in driving control on the braking, accelerating, or the like of a vehicle, it is expected that the amount of computation for determining details of the control can be significantly reduced. Also, it is possible to reduce the number of frame memories that are used.

In the reference example, the interval of measuring a specific target object is limited by the reading speed of the image sensor. When the multiple-exposure image data is used, the interval of measuring a specific target object is defined by the interval of exposures of multiple exposures. As a result, it is possible to improve the measurement accuracy. Also, since the amount of movement of each specific target object is small, the measurement accuracy is also expected to improve. In addition, a computational area required for the speed sensing can be narrowed down, and the amount of computation can be reduced.

Also, in this description, the speed is determined by calculating an entire amount-of-movement vector $v(i, j)$ as a motion vector of a motioning object, based on the total of vectors $v_d(i, j)$. However, for example, the speed changes significantly during right or left turn or during full turn. In such a case, the speed and the acceleration may be calculated from each vector $v_d(i, j)$. A subsequent operation may be predicted or driving control of the host vehicle or another vehicle may be performed, based on the calculated speed and acceleration.

Although, in the above-described embodiment, the sensitivity of the last exposure of the multiple exposures is increased to perform image capture, the present disclosure is not limited thereto. For example, the sensitivity of the last exposure of the multiple exposures may be reduced to perform image capture, or the sensitivity of the first exposure of multiple exposures may be varied to perform image capture. In addition, of the multiple exposures, the sensitivity of the exposure in a predetermined order, for example, the second exposure, may be varied to perform image capture. Also, the number of exposures in which the sensitivity is varied does not have to be one, and the sensitivities of a plurality of exposures may be made different from the sensitivity of other exposures. When the sensitivities of some exposures are made different from the sensitivity of other exposures, the anteroposterior relationship of images corresponding to the respective exposures can be recognized in an multiple-exposure image. In addition, when the sensitivities of other exposures are aligned to a certain sensitivity, the lightnesses of images corresponding to respective exposures become substantially the same, thus making it easy to detect feature points in the images.

<1.7. Specific Example 5 of Operation of Detecting Device>

Specific example 5 of the operation of the detecting device 1 will be described with reference to FIGS. 21A to 21C.

Figure 21A:
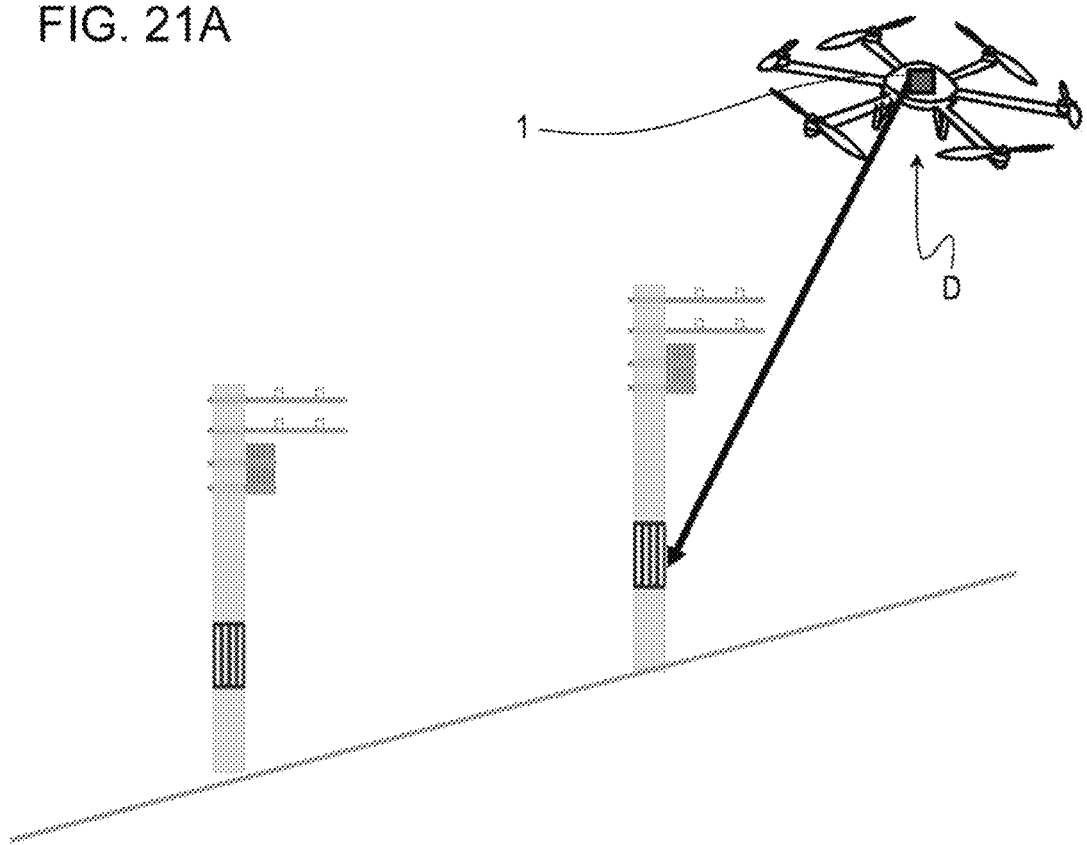
FIG. 21A is a schematic diagram illustrating a state in which a drone on which the detecting device is mounted is flying.

FIG. 21A schematically illustrates a state in which a drone D on which the detecting device 1 is mounted is flying. FIGS. 21B and 21C each schematically illustrate one example of an image represented by multiple-exposure image data that is acquired.

The detecting device 1 can also be desirably mounted on not only a vehicle but also an aircraft. The detecting device 1 is used as a speed sensing device for any moving body. An example in which the detecting device 1 is mounted on the drone D will be described below.

The drone D includes the detecting device 1. The imaging device 100 in the detecting device 1 images a dedicated marker for measurement, the dedicated marker being attached to a utility pole. The detecting device 1 acquires multiple-exposure image data including the dedicated marker and analyzes the multiple-exposure image data to thereby acquire, for example, speed information. FIGS. 21B and 21C each indicate one example of an image represented by the multiple-exposure image data.

Figure 21B:
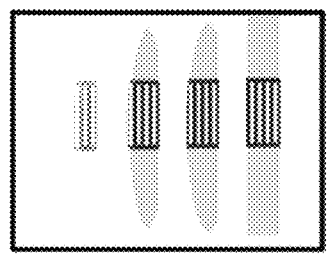
FIG. 21B is a schematic diagram illustrating one example of an image represented by multiple-exposure image data that is acquired.
Figure 21C:
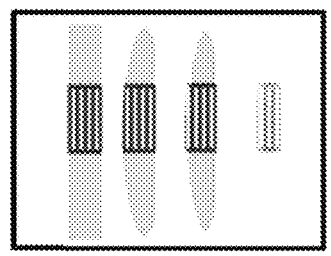
FIG. 21C is a schematic diagram illustrating one example of an image represented by multiple-exposure image data that is acquired.

When the imaging device 100 images the dedicated marker in accordance with the drive illustrated in FIG. 7A, for example, the image illustrated in FIG. 21B or 21C is acquired. According to the drive illustrated in FIG. 7A, the later the image is acquired, the higher the lightness thereof is. In the image illustrated in FIG. 21B, the lightness of the dedicated marker at the right end, that is, the lightness of the image of a rearmost dedicated marker relative to the drone D is the highest, and the lightness of the image of a front most dedicated marker is the lowest. The front of the drone D means the immediately front direction of the drone D. The image illustrated in FIG. 21B means that the drone D is flying frontward. In the image illustrated in FIG. 21C, the lightness at the right end, that is, the lightness of the image of a front most dedicated marker relative to the drone D is the highest, and the lightness of the image of a rearmost dedicated marker is the lowest. The image illustrated in FIG. 21B means that the drone D is flying backward.

The flight of the drone D may be controlled based on the detected speed information. For example, mounting the detecting device 1 and an artificial intelligence (AI) on the drone D allows the drone D to perform unmanned autonomous flight.

Also, although an example of traveling-direction detection for an aircraft has been described above in conjunction with an example of the drone D, traveling-direction detection and speed detection using a similar scheme are possible for various moving bodies, such as the human, industrial control equipment, and autonomous robots.

Second Embodiment

In the present embodiment, an operation example for detecting a speed will be mainly described.

A detecting device 2 according to the present embodiment can include, for example, the hardware configuration illustrated in FIG. 1 or 2. Hence, the description of blocks in the detecting device 2 is omitted.

<2.1. Specific Example 1 of Operation of Detecting Device 1>

Specific example 1 of the operation of the detecting device 2 will be described with reference to FIGS. 22A to 25.

Figure 22A:
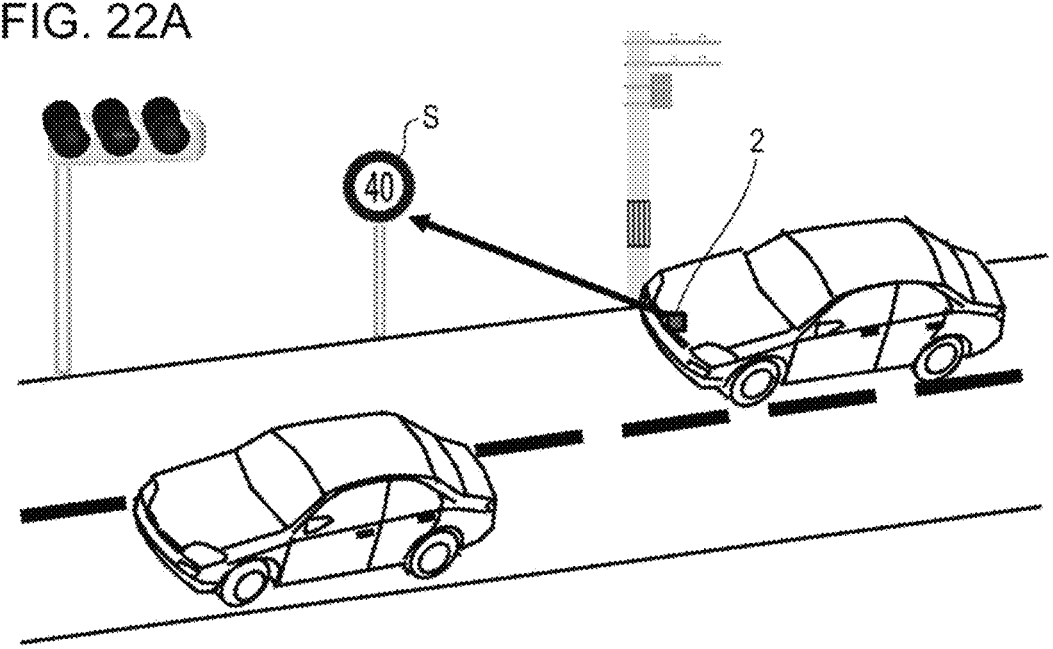
FIG. 22A is a schematic diagram illustrating a state in which a host vehicle on which a detecting device is mounted is traveling while imaging a road sign.
Figure 22B:
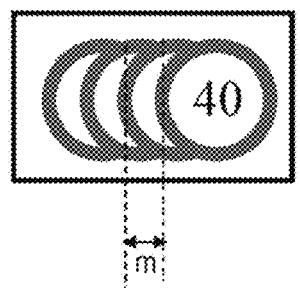
FIG. 22B is a schematic diagram illustrating one example of an image represented by multiple-exposure image data that is acquired.
Figure 22C:
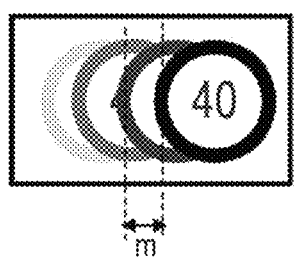
FIG. 22C is a schematic diagram illustrating one example of an image represented by multiple-exposure image data that is acquired.
Figure 22D:
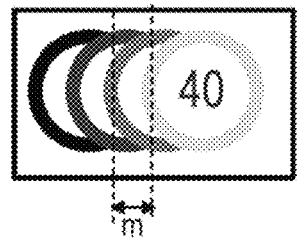
FIG. 22D is a schematic diagram illustrating one example of an image represented by multiple-exposure image data that is acquired.

FIG. 22A schematically illustrates a state in which a host vehicle on which the detecting device 2 is mounted is traveling while imaging a road sign S. FIGS. 22B to 22D each schematically illustrate one example of an image in multiple-exposure image data that is acquired.

As illustrated in FIG. 22A, the detecting device 2 mounted on a host vehicle, which is a moving body, images the road sign S, which is a stationary body. The detecting device 2 detects an absolute speed of the vehicle, based on the acquired multiple-exposure image data. When the imaging device 100 performs the general multiple-exposure image capture in accordance with the drive illustrated in FIG. 6A, for example, the image illustrated in FIG. 22B is acquired.

When the imaging device 100 performs multiple-exposure image capture while performing sensitivity modulation in accordance with the drive illustrated in FIG. 7A or 8A, for example, the image illustrated in FIG. 22C is acquired. When the imaging device 100 performs multiple-exposure image capture while performing sensitivity modulation in accordance with the drive illustrated in FIG. 7C or 8C, for example, the image illustrated in FIG. 22D is acquired.

In this specific example, detection of the absolute speed of the host vehicle can be realized using the general multiple exposure. In this specific example, since the traveling direction of the host vehicle is not detected, it is not necessary to perform multiple exposures via sensitivity modulation.

Figure 23A:
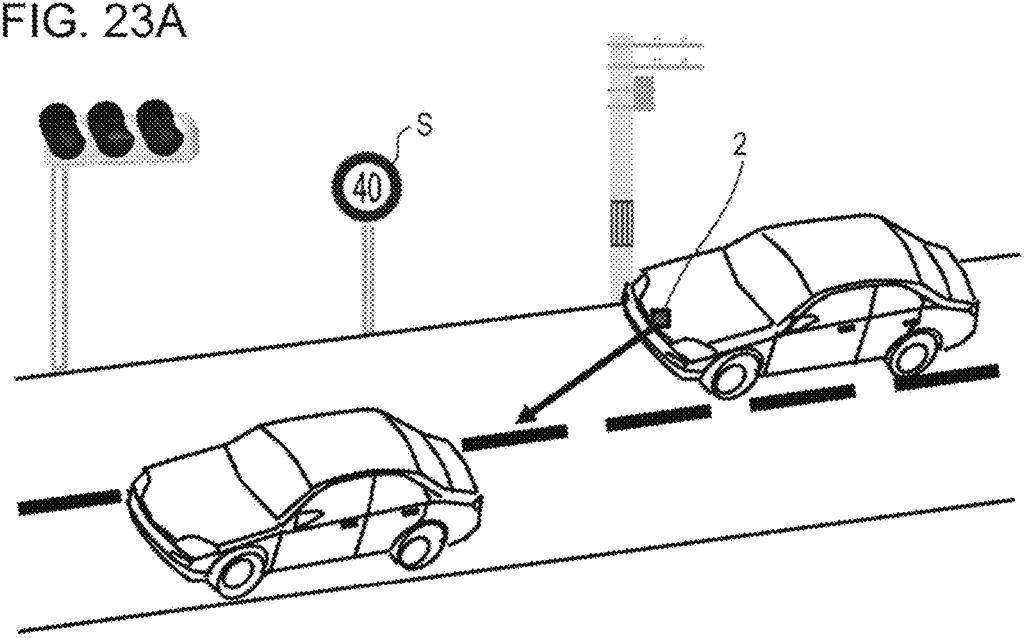
FIG. 23A is a schematic diagram illustrating a state in which the host vehicle on which the detecting device is mounted is traveling while imaging a white line on a road.
Figure 23B:
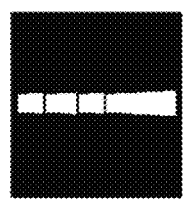
FIG. 23B is a schematic diagram illustrating one example of an image represented by multiple-exposure image data that is acquired.
Figure 24A:
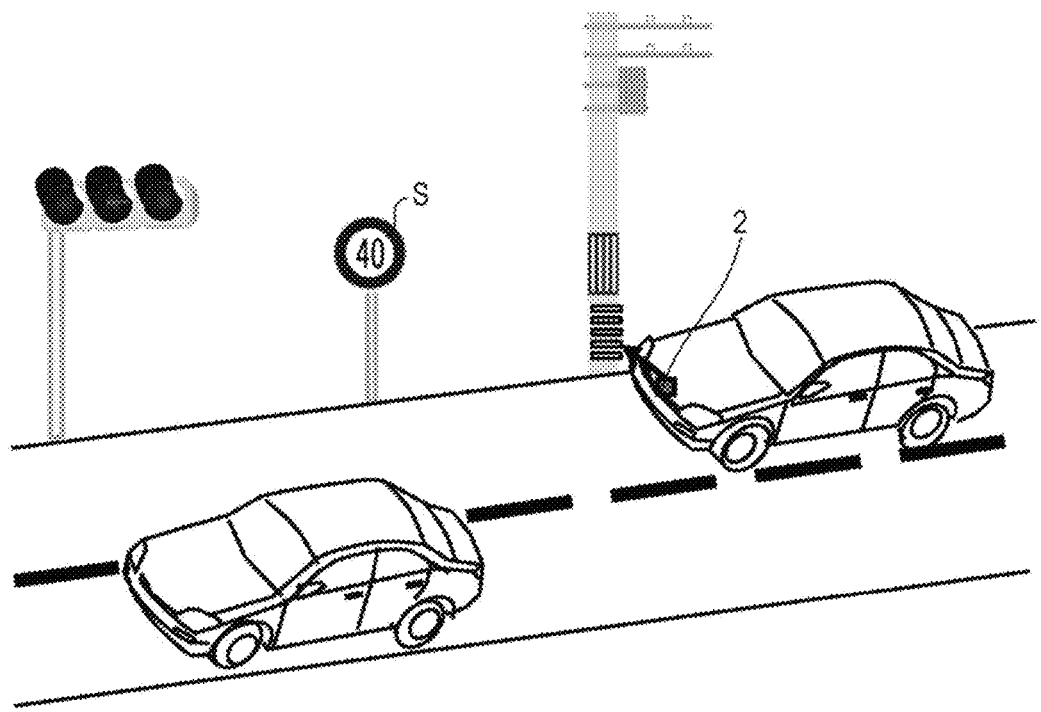
FIG. 24A is a schematic diagram illustrating a state in which the host vehicle on which the detecting device is mounted is traveling while imaging a dedicated marker for measurement, the dedicated marker being attached to a utility pole.
Figure 24B:
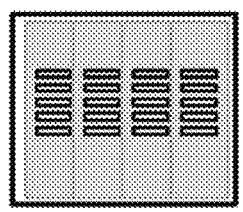
FIG. 24B is a schematic diagram illustrating one example of an image represented by multiple-exposure image data that is acquired.

FIG. 23A schematically illustrates a state in which the host vehicle on which the detecting device 2 is mounted is traveling while imaging a white line on a road. FIG. 23B schematically illustrates one example of an image that is acquired. FIG. 24A schematically illustrates a state in which the host vehicle on which the detecting device 2 is mounted is traveling while imaging a dedicated marker for measurement, the dedicated marker being attached to a utility pole. FIG. 24B schematically illustrates one example of an image represented by multiple-exposure image data that is acquired.

FIGS. 23B and 24B each illustrate one example of an image represented by multiple-exposure image data when the imaging device 100 performs the general multiple-exposure image capture in accordance with the drive illustrated in FIG. 6A. A specific target object for performing speed measurement may be an on-road installation whose size has been standardized. The specific target object is, for example, a road sign S, a white line, a utility-pole sign board, or a traffic light. The specific target object may also be the license plate or lamps of a vehicle, like those described above. In addition, the specific target object may be a dedicated marker whose size has been standardized. A marker having a plurality of markers arranged in a vertical direction may be used as the dedicated marker. With such a dedicated marker, even when the vehicle moves forward, the amount of distortion in an image is small, and measurement error is less likely to occur.

Figure 25:
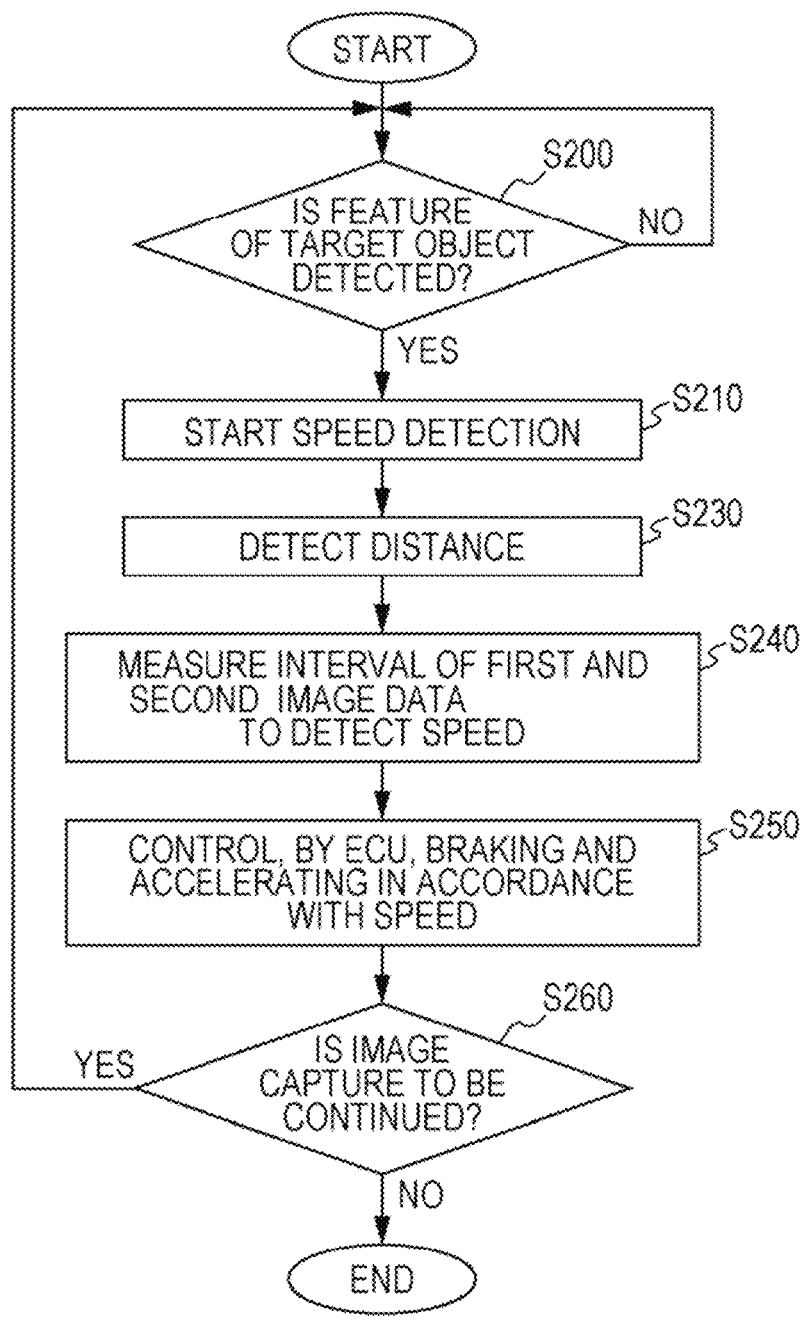
FIG. 25 is a flowchart illustrating one example of a processing flow for detecting an absolute speed based on multiple-exposure image data and controlling the braking and accelerating of the vehicle based on the absolute speed.

FIG. 25 illustrates one example of a processing flow for detecting an absolute speed based on multiple-exposure image data and controlling the braking and accelerating of a vehicle based on the absolute speed.

The processing flow for detecting the absolute speed is basically the same as the processing flow illustrated in FIG. 14. However, step S220 for detecting the traveling direction is omitted.

As described in the first embodiment, in step S230, the distance d from the host vehicle to the road sign S may be obtained by the distance measuring unit 600 or may be obtained by the controller 500 performing analysis on the multiple-exposure image data. The distance measuring unit 600 is, for example, a TOF sensor.

Figure 26A:
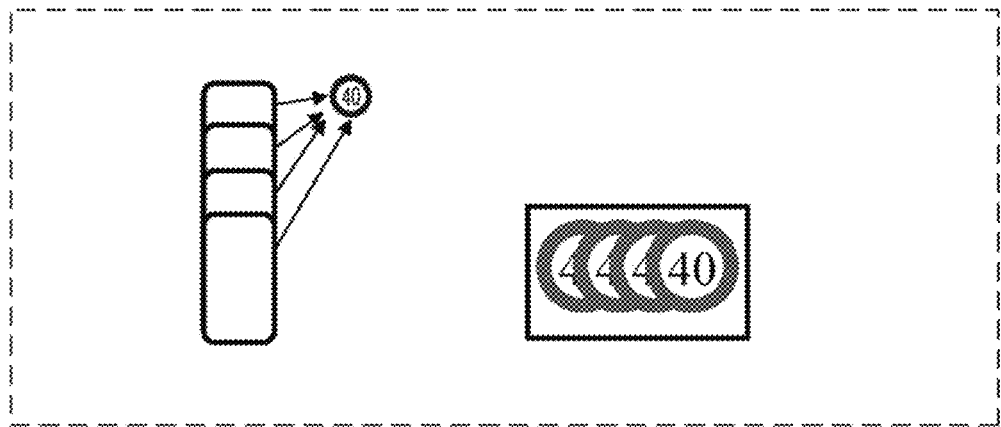
FIG. 26A is a schematic diagram illustrating one example of an image represented by multiple-exposure image data acquired by a vehicle that is traveling at a side closer to the road sign in FIG. 24A.
Figure 26B:
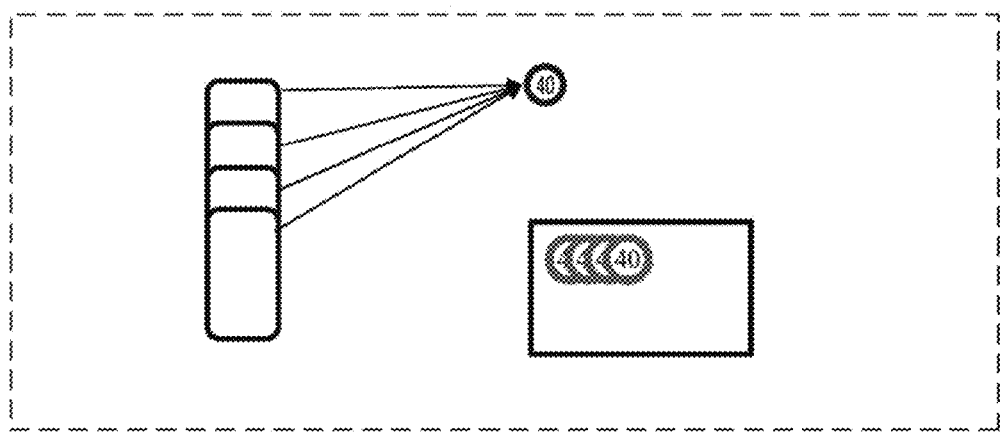
FIG. 26B is a schematic diagram illustrating one example of an image represented by multiple-exposure image data acquired by a vehicle that is traveling at a side farther from the road sign in FIG. 24A.

FIG. 26A schematically illustrates one example of an image represented by multiple-exposure image data acquired by a vehicle that is traveling at a side closer to the road sign S in FIG. 24A. FIG. 26B schematically illustrates one example of an image represented by multiple-exposure image data acquired by a vehicle that is traveling at a side farther from the road sign S in FIG. 24A.

The size of the road sign S in the multiple-exposure image data varies according to the distance d from the vehicle to the road sign S. As described above, the actual size of the specific target object has been pre-specified by a standard. The size s of the specific target object in the multiple-exposure image data at the distance d is determined based on the standard and various parameters related to the imaging device 100 and the optical system 200. The controller 500 can compute the distance from the host vehicle to the road sign S, based on a result of comparison between the actual size of the road sign S and the size of the road sign S in the multiple-exposure image data.

Reference is made to FIG. 25 again.

The controller 500 acquires multiple-exposure image data by performing the general multiple-exposure image capture. The controller 500 acquires multiple-exposure image data, for example, illustrated in FIG. 22B and detects the absolute speed of the vehicle by using the distance d, an interval m of edges of the road sign S, and an interval t of two adjacent control signals V2 (step S240).

Thereafter, the detecting device 2 transmits information indicating the absolute speed to the ECU 800 via the image transmission IF 400.

The ECU 800 can control the braking and accelerating of the vehicle, based on the information indicating the absolute speed, the information being received from the detecting device 2. As in the first embodiment, the ECU 800 can perform, for example, control corresponding to autonomous driving levels 0 to 4.

Although, in the above-described example, the controller 500 starts detecting the vehicle speed upon detecting a feature of a specific target object, the present disclosure is not limited thereto. For example, the controller 500 may constantly detect the vehicle speed while the engine of the vehicle is running. Alternatively, the controller 500 may also detect the vehicle speed in only periods set at regular intervals. For example, the controller 500 may detect the vehicle speed only in the period of the frame for direction detection, the period being illustrated in FIG. 9D. Alternatively, the controller 500 may detect the vehicle speed upon entering a highway or may detect the vehicle speed upon a change in internal control information about gear shifting or the like.

When the detecting device 2 is to measure the absolute speed, the imaging device 100 may be installed on a side surface of the vehicle. This makes it possible to suppress error during the measurement.

<2.2. Specific Example 2 of Operation of Detecting Device 2>

Specific example 2 of the operation of the detecting device 2 will be described with reference to FIG. 27.

FIG. 27 illustrates one example of a processing flow for detecting an absolute speed and an acceleration based on multiple-exposure image data and controlling the braking and accelerating of the vehicle based on the absolute speed and the acceleration.

The processing flow for detecting the speed and the acceleration is basically the same as the processing flow illustrated in FIG. 15. However, step S320 for detecting the traveling direction is omitted.

In this specific example, the controller 500 computes the absolute speed and the acceleration of the vehicle, based on the multiple-exposure image data (step S340). The absolute speed and the acceleration in this specific example respectively correspond to the speed and the acceleration obtained in step S340 illustrated in FIG. 15.

The ECU 800 can control the braking and accelerating of the vehicle, based on at least one of the pieces of information indicating the absolute speed and the acceleration, the information being received from the detecting device 2. As in the first embodiment, the ECU 800 can perform, for example, control corresponding to autonomous driving levels 0 to 4.

According to this specific example, it is possible to control the braking and accelerating of the vehicle by using the measured absolute speed and acceleration. Thus, it is possible to continuously recognize the traveling state of the host vehicle. As a result, it is possible to perform safer control.

<2.3. Specific Example 3 of Operation of Detecting Device 2>

Specific example 3 of the operation of the detecting device 2 will be described with reference to FIG. 28.

Figure 28:
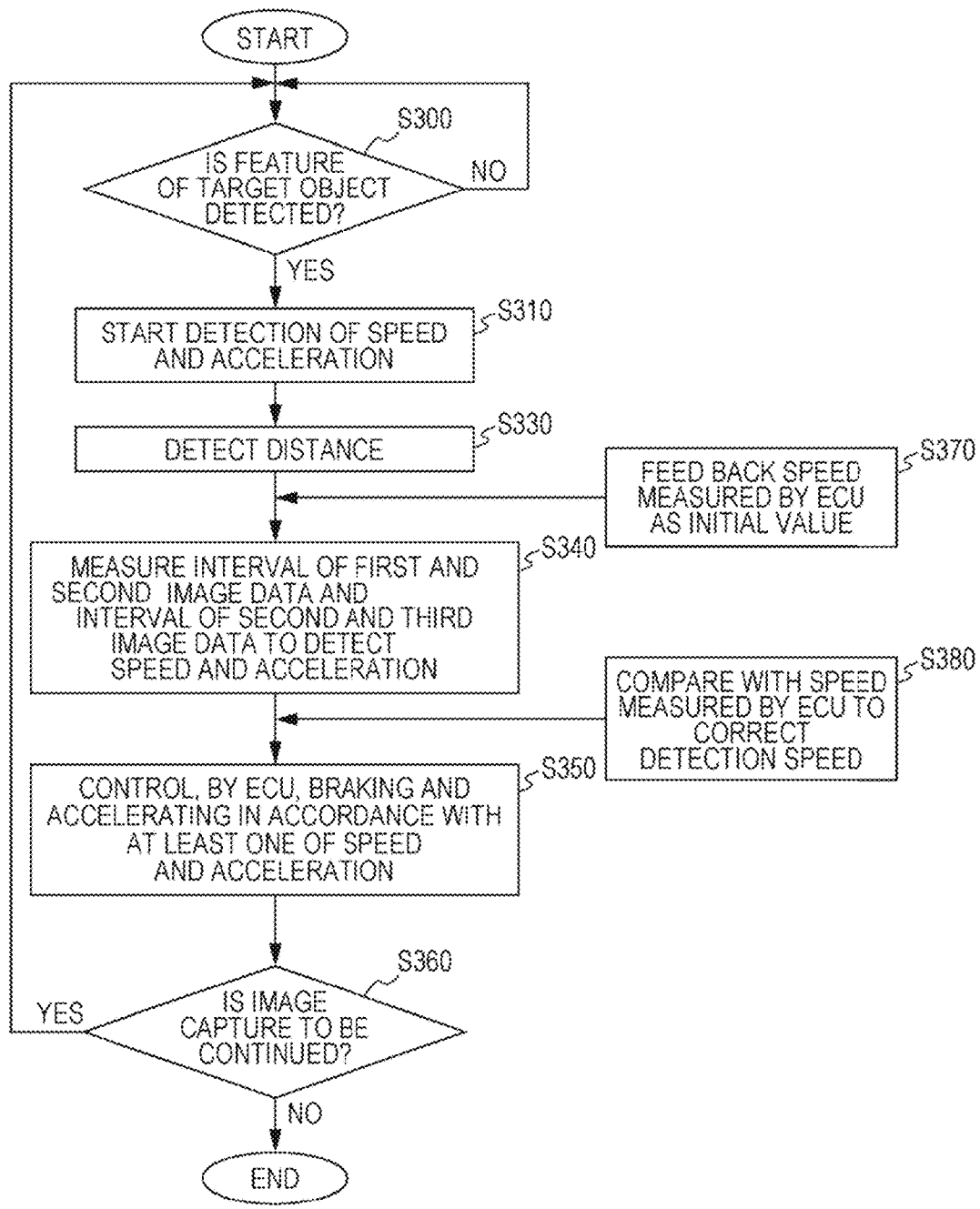
FIG. 28 is a flowchart illustrating one example of a processing flow for controlling the braking and accelerating of a vehicle by further using the vehicle speed measured by an ECU.

FIG. 28 illustrates one example of a processing flow for controlling the braking and accelerating of a vehicle by further using the vehicle speed measured by the ECU 800.

The processing flow illustrated in FIG. 28 includes steps that are analogous to those in the processing flow illustrated in FIG. 27. The processing flow further includes at least one of step S370 in which the vehicle speed measured by the ECU 800 is fed back as an initial value for detection of the absolute speed and step S380 in which comparison is made with the speed measured by the ECU 800 to correct the detection speed of the controller 500.

The ECU 800 can measure the vehicle speed independently from the detecting device 2, for example, based on the rotational speed of wheels. The ECU 800 transmits the measured vehicle speed to the controller 500 in the detecting device 2. The vehicle speed measured by the ECU 800 is fed back to the controller 500, for example, through the CAN as an initial value for detection of the absolute speed. However, the feedback control can also be realized by a standard different from the CAN or by an individual standard.

The controller 500 can perform speed detection based on the multiple-exposure image data, by using an initial value determined based on the speed information measured by the ECU 800 (step S370).

The controller 500 can correct the vehicle speed information detected based on the multiple-exposure image data, by using the speed information measured by the ECU 800. In other words, it is possible to calibrate the detecting device 2 by using the vehicle speed measured by the ECU 800 (step S380). The absolute speed detected by the controller 500 is compared with the vehicle speed measured by the ECU 800. The absolute speed of the vehicle is corrected based on the vehicle speed measured by the ECU 800 and according to the comparison result. Both the above-described feedback control and calibration may be applied, or one of the feedback control and the calibration may be applied.

According to this specific example, close cooperation between the ECU 800 and the detecting device 2 makes it possible to reduce offset between individual mechanisms during control. In addition, it is possible to realize high-speed feedback during speed control.

<2.4. Specific Example 4 of Operation of Detecting Device 2>

Figure 30A:
FIG. 30A is a schematic diagram illustrating one example of an image represented by multiple-exposure image data acquired via general multiple exposures.
Figure 30B:
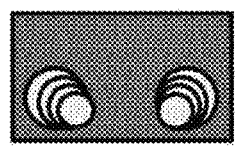
FIG. 30B is a schematic diagram illustrating one example of an image represented by multiple-exposure image data acquired via the general multiple exposures.
Figure 30C:
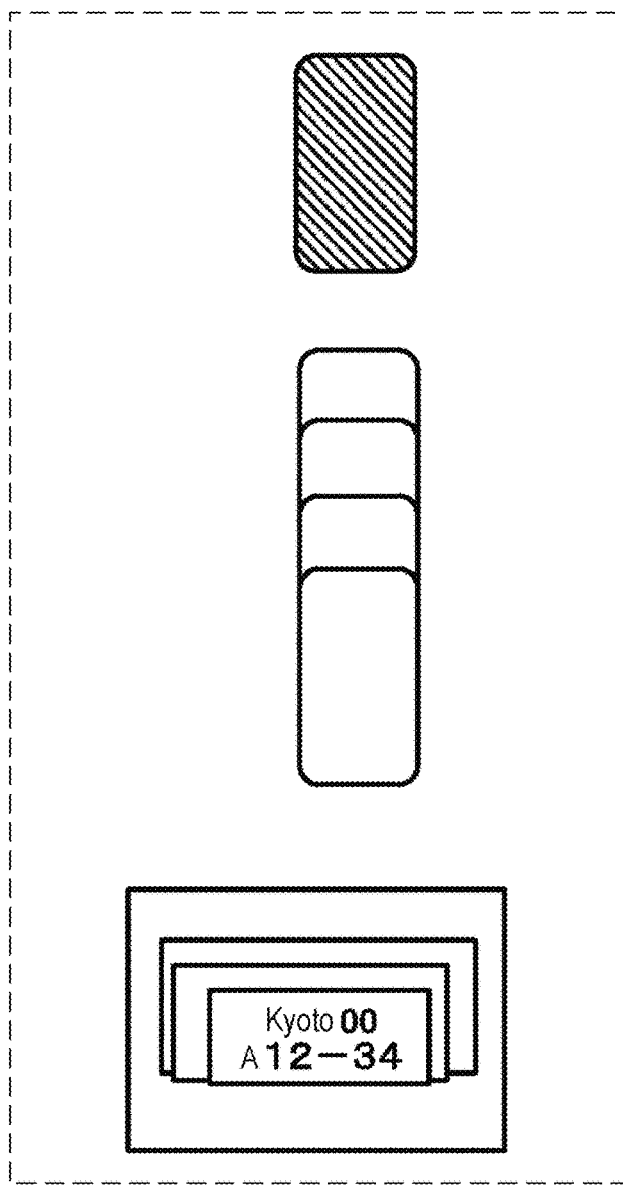
FIG. 30C is a schematic diagram illustrating one example of an image represented by multiple-exposure image data acquired via the general multiple exposures, when the distance between a vehicle traveling a head and the host vehicle is small.
Figure 30D:
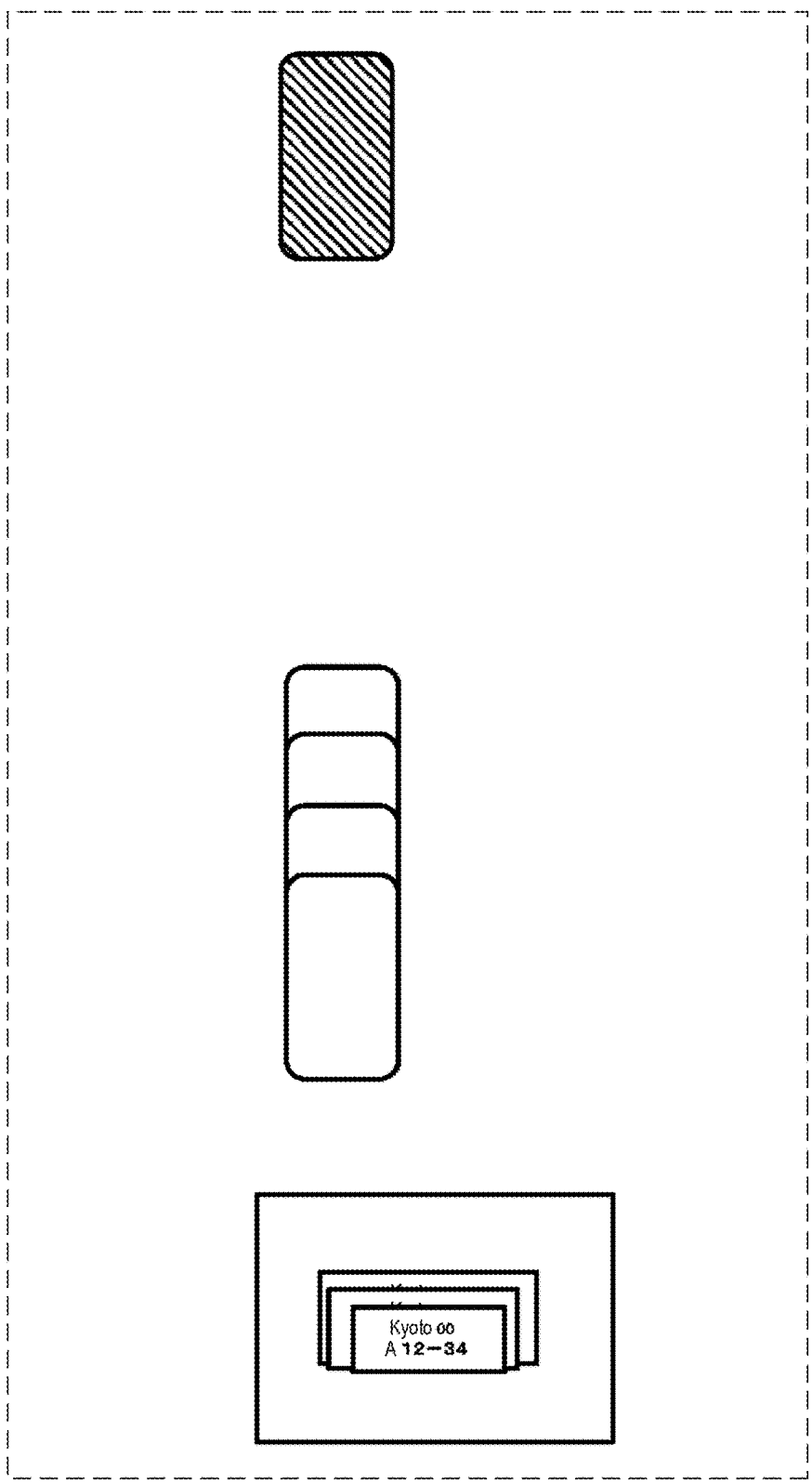
FIG. 30D is a schematic diagram illustrating one example of an image represented by multiple-exposure image data acquired via the general multiple exposures, when the distance between the vehicle traveling ahead and the host vehicle is large.

Specific example 4 of the operation of the detecting device 2 will be described with reference to FIGS. 29 to 30D.

FIG. 29 illustrates one example of a processing flow for detecting a speed based on multiple-exposure image data, further detecting the traveling direction, and controlling the braking and accelerating. FIGS. 30A, 30B, and 30C each schematically illustrate one example of an image represented by multiple-exposure image data acquired via general multiple exposures.

FIG. 30C illustrates one example of an image represented by multiple-exposure image data of a license plate, the data being acquired when a vehicle traveling ahead and the host vehicle are close to each other. FIG. 30D illustrates an image of a license plate, the image being acquired when the vehicle traveling ahead and the host vehicle are far from each other.

In step S230, the distance measuring unit 600 may measure a distance d to a vehicle traveling ahead. Alternatively, the controller 500 may measure the distance d by using the above-described scheme to analyze, for example, the multiple-exposure image data illustrated in FIG. 30C.

The detecting device 2 according to this specific example obtains the speed of the vehicle by analyzing multiple-exposure image data acquired by the general multiple-exposure imaging (step S240). Specifically, the controller 500 acquires multiple-exposure image data, for example, illustrated in FIGS. 30A and 30B and detects the speed of the vehicle by using the distance d, an interval m between edges of the specific target object, and an interval t of two adjacent control signals V2.

FIG. 30A illustrates one example of an image of a license plate, the image being acquired by the general multiple-exposure imaging, and FIG. 30B illustrates one example of an image of brake lamps, the image being acquired by the general multiple-exposure imaging. According to the general multiple-exposure imaging, images of a target object are superimposed in the traveling direction of the vehicle. Thus, a distinction cannot be made as to whether or not the host vehicle has accelerated to reduce the distance to a vehicle ahead or the host vehicle has decelerated to increase the distance.

After obtaining the speed of the vehicle, the controller 500 according to this specific example detects the traveling direction of the vehicle (step S220). For example, it is possible to obtain information indicating the traveling direction of the vehicle, by using the traveling-direction measuring unit 700. The traveling-direction measuring unit 700 is, for example, a TOF sensor. The obtained information is transmitted to the controller 500. Detecting the traveling direction makes it possible to obtain the speed of the vehicle. The specific target object for speed detection is not limited to a license plate and lamps and may be, for example, a marker for speed detection, the marker being attachable to a vehicle.

As described above, in the present embodiment, when a target object to be imaged is a stationary body, the controller 500 can detect the absolute speed of the host vehicle. The stationary body is, for example, a road sign S. Alternatively, when a target object to be imaged is provided on another moving body, the controller 500 can detect the relative speed of the host vehicle with respect to the other moving body. The other moving body is, for example, a traveling vehicle, and the target object to be imaged is a license plate.

The relative traveling direction and the relative speed can be used for the braking and accelerating of the host vehicle or a vehicle that is a measurement target. The absolute traveling direction and the absolute speed, on the other hand, can be used for, for example, braking-mode control or failure detection of the host vehicle through use of the value of the absolute speed, in addition to being used for the braking and accelerating of the host vehicle or a vehicle that is a measurement target. In addition, the absolute traveling direction and the absolute speed can be used for determining a violation of a traffic regulation and so on.

The detecting device 2 may acquire the multiple-exposure image data illustrated in FIG. 11B or 12B by performing multiple-exposure image capture via sensitivity modulation. The detecting device 2 may detect the traveling direction by analyzing the multiple-exposure image data.

Multiple-exposure image data for detecting the speed of a vehicle and multiple-exposure image data for detecting the traveling direction may be acquired in different frames. Specifically, as illustrated in FIG. 29, the speed is detected based on multiple-exposure image data acquired in one frame (step S240). Thereafter, the traveling direction may be detected based on multiple-exposure image data acquired in another frame (step S220). Alternatively, the speed and the traveling direction may be detected based on multiple-exposure image data acquired in one frame (step S220). In addition, the order of the processes may be interchanged so as to make a change so that the speed is detected (step S240) after the traveling direction is detected (step S220). The detection of the speed detection and the detection of the traveling direction may be alternately performed. The order of the processes can be selected in any form, as long as it is optimum for the vehicle-traveling control system 1000.

The detecting device 2 transmits information regarding the traveling direction and the speed to the ECU 800 via the image transmission IF 400. Based on the information regarding the traveling direction and the speed, the information being received from the detecting device 2, the ECU 800 can control the braking and accelerating of the vehicle (step S250). As in the first embodiment, the ECU 800 can perform, for example, control corresponding to autonomous driving levels 0 to 4.

Figure 31:
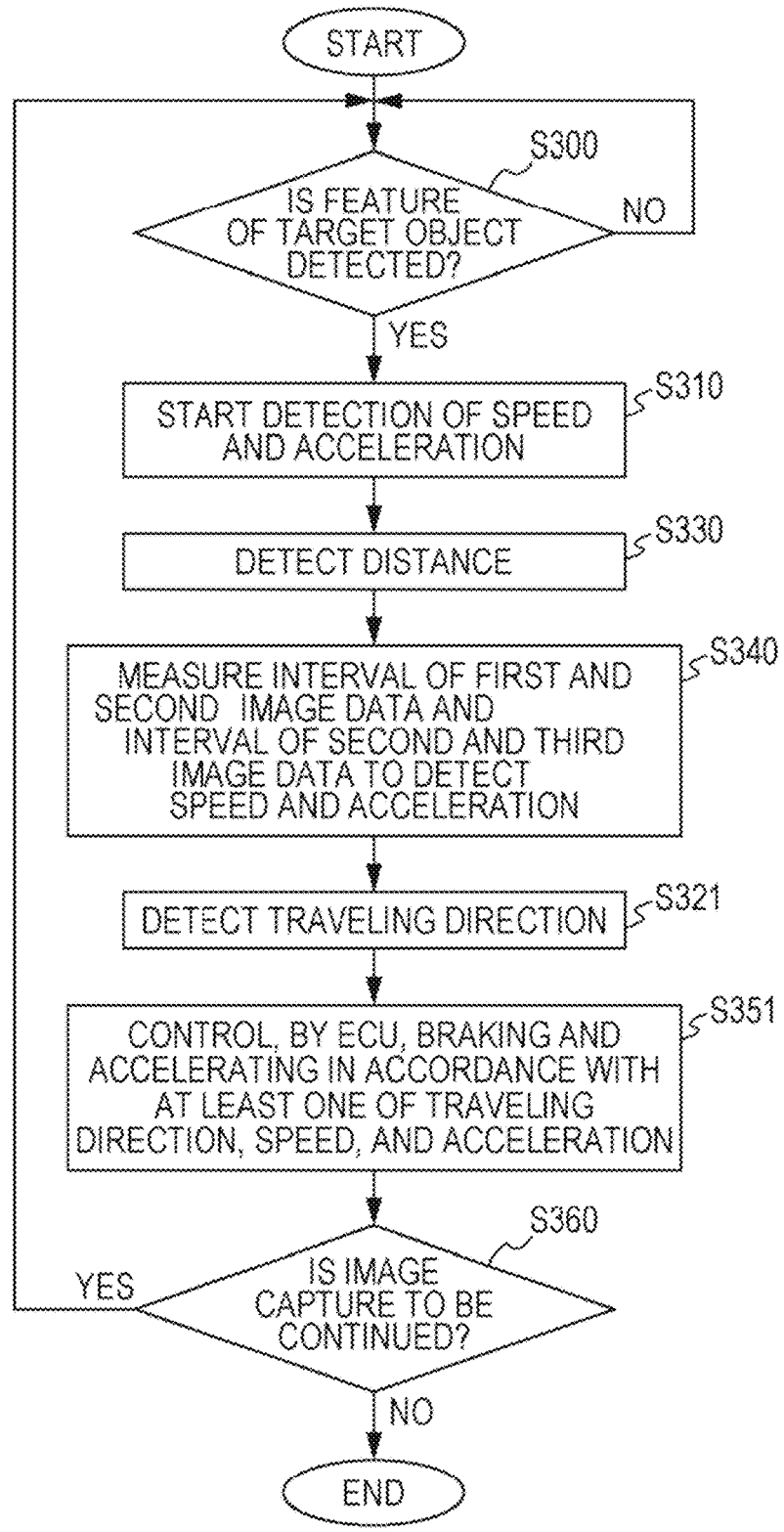
FIG. 31 is a flowchart illustrating one example of a processing flow for detecting a relative speed and an acceleration based on multiple-exposure image data, further detecting a traveling direction, and controlling braking/accelerating.

FIG. 31 illustrates one example of a processing flow for detecting a speed and an acceleration based on multiple-exposure image data, further detecting a traveling direction, and controlling braking/accelerating.

The processing flow illustrated in FIG. 31 includes the processing steps illustrated in FIG. 27 and further includes step S320 for detecting the traveling direction. According to this processing flow, the ECU 800 can control the braking and accelerating of the vehicle, based on at least one of the pieces of information about the traveling direction, the speed, and the acceleration. It is possible to continuously recognize the traveling state of the host vehicle, so that safer control can be performed.

As described above, the multiple exposures via sensitivity modulation is not necessarily required for detecting the vehicle speed. Also, for example, the detecting device 2 may have a first mode in which the traveling direction of a surrounding vehicle is detected using a plurality of pieces of brightness information in multiple-exposure image data and a second mode in which the relative speed of a surrounding vehicle relative to the host vehicle is calculated using a plurality of pieces of brightness information. The detecting device 2 may also be adapted to alternately switch between the first and second modes every predetermined period. The predetermined period may be, for example, a certain frame cycle. Also, the first mode and the second mode may also be switched when the speed or acceleration information changes, or when braking or a steering wheel operation is performed.

FIG. 32 illustrates one example of a processing flow for controlling the braking/accelerating by using a vehicle speed measured by the ECU 800.

As illustrated in FIG. 32, step S320 for detecting the traveling direction can also be added to the processing flow for detecting the speed and the acceleration, the processing flow being illustrated in FIG. 28. According to this processing flow, the ECU 800 can control the braking and accelerating of the vehicle, based on at least one of the pieces of information about the traveling direction, the speed, and the acceleration. Close cooperation between the ECU 800 and the detecting device 2 makes it possible to reduce offset among mechanisms during control and further makes it possible to perform high-speed feedback during speed control.

<2.5. Specific Example 5 of Operation of Detecting Device 2>

Specific example 5 of the operation of the detecting device 2 will be described with reference to FIGS. 33A to 33C.

When the vehicle enters a curved road, the detecting device 2 can compute a speed change relative to the inner circumference of the curve and a speed change relative to the outer circumference, based on the multiple-exposure image data, and can compute the vehicle's entry angle, based on the speed changes relative to the inner and outer circumferences.

Figure 33A:
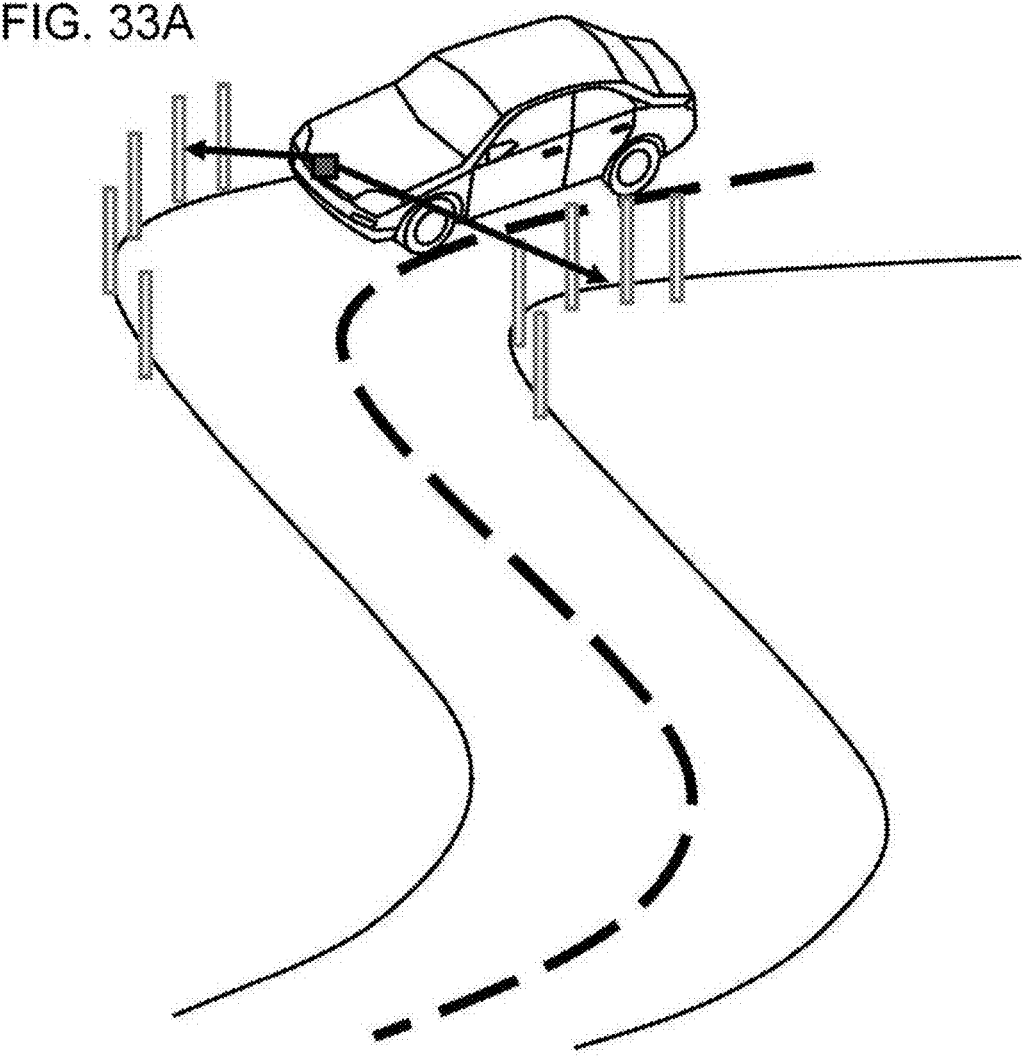
FIG. 33A is a schematic diagram illustrating a state in which the vehicle enters a curved road.
Figure 33B:
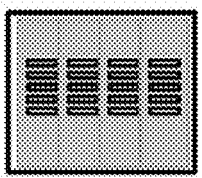
FIG. 33B is a schematic diagram illustrating one example of an image represented by multiple-exposure image data acquired by imaging the outside of the curved road when the vehicle enters the curved road.
Figure 33C:
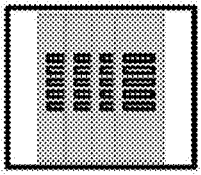
FIG. 33C is a schematic diagram illustrating one example of an image represented by multiple-exposure image data acquired by imaging the inside of the curved road.

FIG. 33A schematically illustrates a state in which the vehicle enters a curved road. FIG. 33B schematically illustrates one example of an image represented by multiple-exposure image data acquired by imaging the outside of the curved road when the vehicle enters the curved road, and FIG. 33C schematically illustrates one example of an image represented by multiple-exposure image data acquired by imaging the inside of the curved road.

The vehicle-traveling control system 1000 according to this specific example can control the braking/accelerating and steering of the vehicle, for example, in accordance with the processing flow illustrated in FIG. 25. As illustrated in FIG. 33A, for example, dedicated poles for measuring the vehicle's entry angle are assumed to be installed on inside and outside shoulders of a curved road at predetermined intervals. Dedicated markers for measurement which are analogous to the marker illustrated in FIGS. 24A and 24B may be installed on the dedicated poles.

The controller 500 can sense the vehicle entry to the curve by using steering wheel operation, road traffic information, or map information. Upon being triggered by the sensing, the controller 500 starts measuring the vehicle's entry angle (step S210). The controller 500 starts, specifically, computation for detecting a speed relative to the inner circumference of the curved road and a speed relative to the outer circumference of the curved road. Hereinafter, the speed relative to the inner circumference of the curved road is referred to as an "inner circumference speed", and the speed relative to the outer circumference of the curved road is referred to as an "outer circumference speed".

For example, the distance measuring unit 600 measures distances d_in and d_out from the host vehicle to the corresponding inside dedicated pole and outside dedicated pole. The controller 500 obtains the distances d_in and d_out from the distance measuring unit 600 (step S230).

The controller 500 obtains multiple-exposure image data acquired by performing multiple-exposure imaging on the inside pole. The controller 500 detects the inner circumference speed of the host vehicle by using an interval m_in between the dedicated poles in first and second image data in the multiple-exposure image data, an interval t_in between a first exposure period and a second exposure period, and the distance d_in. Similarly, the controller 500 obtains multiple-exposure image data acquired by performing multiple-exposure image capture on the outside poles. The controller 500 detects the outer circumference speed of the host vehicle by using an interval m_out between the dedicated poles in first and second image data in the multiple-exposure image data, an interval t_out between a first exposure period and a second exposure period, and the distance d_out. In addition, the controller 500 computes the angle of entering the curve, based on the outer circumference speed and the inner circumference speed of the host vehicle (step S240).

The detecting device 2 transmits the outer circumference speed and the inner circumference speed or information about the entry angle to the ECU 800 via the image transmission IF 400. Based on those pieces of information received from the detecting device 2 and other information, such as road traffic information or map information, the ECU 800 can control the braking, accelerating, and steering of the vehicle (step S250).

As described above, the information about the vehicle speed measured by the ECU 800 may be used for calibrating the detecting device 2, and may be set as an initial value used when the detecting device 2 computes the inner circumference and outer circumference speeds. Further, the information may be applied to both of them. In addition, information, other than vehicle speed, obtained by various sensors commonly used in a vehicle-traveling control system may be fed back from the ECU 800 to the detecting device 2 through a CAN, together with the vehicle speed. The various sensors are, for example, a steering angle sensor and a yaw-rate sensor. The information other than the vehicle speed is, for example, a steering angle, a yaw rate, or an acceleration.

In this specific example, the imaging device 100 may be installed on a side surface of the vehicle. This makes it possible to suppress error during measurement.

According to this specific example, close cooperation between the ECU 800 and the detecting device 2 makes it possible to reduce offset among mechanisms during control and further makes it possible to realize high-speed feedback during vehicle control on braking, accelerating, steering, and so on.

<2.6. Examples of Host-Vehicle Position Estimation and Host-Vehicle Route Prediction Using Detecting Device 2>

In specific examples 1 to 5, the speed information detected by the detecting device 2 has been described as being used only for controlling the host vehicle. The present disclosure is not limited thereto, and the detected speed information can be desirably used for, for example, accurate host-vehicle position estimation and host-vehicle route prediction.

The host-vehicle position estimation and the host-vehicle route prediction can utilize information about a speed, an acceleration, a distance to a target object, or the like that can be obtained by the detecting device 2, information from various sensors used in the vehicle-traveling control system 1000, map information, inter-vehicle communication data, and data of communication between a vehicle and a stationary body, for example, between a vehicle and a road sign.

With regard to the host-vehicle position estimation, the host-vehicle position on a map can be estimated, for example, by measuring a distance to a target object, such as a road sign, position information of a target object in map information, and information about a measured-distance between a target object and the host vehicle. Also, subsequent host-vehicle position estimation may be performed with respect to the position information of a target object and the information about the measured distance between the target object and the host vehicle, or the estimation of the host-vehicle position may be continued by reflecting the host-vehicle traveling direction or speed information subsequently detected into the map information with respect to the host-vehicle position estimated at a certain point in time. In addition, the result of the host-vehicle position estimation may be corrected by measuring the distance to another target object and using position information of the other target object and the information about the distance between the target object and the host vehicle. The generated map information may also be displayed, for example, on a display provided in a vehicle cabin or a portable terminal of a user. Also, as another embodiment, the motion state of the host vehicle after a certain time passes can be predicted using information about the host-vehicle position and speed information or acceleration information measured by the above-described method. The host vehicle can also be controlled according to the prediction result, surrounding traffic information obtained from the map information, and a destination. If both vehicles can mutually predict routes, smooth traveling control on a plurality of vehicles can be performed utilizing a cloud server.

The speed information of a vehicle can be transmitted to a surrounding vehicle that is traveling in the surroundings. Transmitting the speed information detected by the detecting device 2 to a surrounding vehicle also makes it possible to perform mutual control between vehicles. Controlling both vehicles at the same time makes it possible to reduce, for example, a braking time, a distance, and so on.

For example, communication between vehicles can be realized using a pulse signal to which a recognition header is attached. However, the communication system is not limited to the inter-vehicle communication, and any system may be used as long as it is a scheme in which a surrounding vehicle can receive transmission data. The communication may be unidirectional or may be bidirectional. Also, the communication system is, for example, time division or wavelength multiplexing.

For example, headlight light can be utilized for the communication. Headlights are pulse-driven with a frequency that does not affect radiation to the surroundings, and another vehicle senses light of the headlights to thereby enable the communication. According to this communication system, since it is not necessary to additionally install new hardware dedicated to communication, it is possible to minimize the system scale, cost, and so on.

When the present disclosure is used for host-vehicle position estimation and host-vehicle route prediction, one detecting device 2 may be used, or a plurality of detecting devices 2 may be used. For example, detecting devices 2 provided at the front, rear, left, and right sides may be used. Only the number of imaging devices 100 may be two or more, and the image processing and computation may be performed by one chip.

The detecting device 2 according to the present embodiment can be desirably mounted on an aircraft, such as a drone, similarly to the detecting device 1 according to the first embodiment.

(Others)

Although the imaging device 100 and the ISP 300 have been described above as being able to be mounted on the same chip, the imaging device 100, the ISP 300, and the controller 500 can also be mounted on the chip. When such a chip is used, processing up to the computational processing for the speed, the acceleration, and so on can be realized by one chip. In recent years, there have been demands for an increase in data processing speed, a reduction in power consumption, a reduction in chip size, and a reduction in cost. In such a perspective, the configuration implemented by one chip can be said to be optimum.

Although an operation example of an imaging device having a plurality of unit pixels including a photoelectric conversion layer has been mainly described hereinabove, for example, image capture can be performed using an imaging device using known silicon PDs. In this case, multiple-exposure image data may be obtained by performing sensitivity modulation through change of the exposure length between a plurality of exposures.

Although an example in which a global shutter is realized by controlling a bias voltage to be applied to the photoelectric conversion layer has been described above, the present disclosure is not limited thereto. For example, although the number of constituent elements increases, provision of electrical-charge transfer transistors and electrical-charge storage capacitors provides advantages that are similar to those of controlling the bias voltage. Also, with regard to the multiple exposures, provision of electrical-charge transfer transistors and electrical-charge storage capacitors also provide advantages that are similar to those of controlling the bias voltage.

Hereinabove, the description has been given of an example in which the detecting device 2 is mainly mounted on a moving body to detect the speed of the moving body. However, when the detecting device 2 is mounted on a stationary body, and the stationary body images a moving body, the absolute speed of the moving body can also be detected. For example, installing the detecting device 2 on a traffic light makes it possible to crack down on speed violations of traveling vehicles.

A detection result of the traveling direction of a surrounding vehicle, the detection result being obtained by the vehicle-traveling control system 1000, can be used for, for example, automatic traveling control for controlling accelerating and decelerating of the host vehicle. Alternatively, in a system that assists a driving operation, the driver of the host vehicle may accelerate or decelerate the host vehicle by operating a brake and a gas pedal in accordance with the detection result. For example, the distance to a vehicle traveling ahead may be detected based on the size of an image of the license plate of the vehicle traveling ahead, and when it is detected that the distance has become smaller than a predetermined value, the brake of the host vehicle may be actuated. Alternatively, a warning may be issued to the driver of the host vehicle so as to decelerate. Also, when it is detected that the distance to the vehicle ahead becomes larger than a predetermined value, the gas pedal of the host vehicle may be actuated. Alternatively, a warning may be issued to the driver of the host vehicle so as to accelerate.

The detecting device, the detecting method, and the vehicle-traveling control system in the present disclosure are desirably utilized for any moving body or stationary body that is required to have the ability to detect a relative traveling direction, a relative speed, an absolute traveling direction, and an absolute speed.

What is claimed is:

1. A driving control system comprising:
    an imaging device that is installed on a moving body and that images a target object in a first frame period a plurality of times to generate a multiple-exposure image data including a first image data and a second image data; and
    a processor that detects a relative motion state of the moving body with respect to the target object, based on the first image data and the second image data included in the multiple-exposure image data, wherein
    the imaging device images the target object with a first sensitivity in a first exposure period in the first frame period to generate the first image data and images the target object with a second sensitivity in a second exposure period in the first frame period to generate the second image data, the second exposure period being different from the first exposure period, the second sensitivity being different from the first sensitivity.

2. The driving control system according to claim 1, further comprising:
    a first control device, wherein
    the first control device generates a signal for causing the motion state of the moving body to change, based on the relative motion state of the moving body.

3. The driving control system according to claim 2, further comprising:
    a second control device, wherein
    the second control device causes the motion state of the moving body to change, based on the signal.

4. The driving control system according to claim 1, further comprising:
    a first control device, wherein
    the target object is fixed to another moving body, and
    the first control device generates a signal for causing a motion state of the other moving body to change, based on the relative motion state of the moving body.

5. The driving control system according to claim 4, further comprising:
    a second control device, wherein
    the second control device causes the motion state of the other moving body to change, based on the signal.

6. The driving control system according to claim 1, wherein the moving body is a vehicle.

7. The driving control system according to claim 1, wherein
    the target object is stationary relative to a ground surface, and
    the processor detects an absolute speed of the moving body.

8. The driving control system according to claim 1, wherein
    the target object is stationary relative to a ground surface; and
    the processor detects a distance between the moving body and the target object, based on the first image data, and generates position information of the moving body, based on position information of the target object and the distance.

9. The driving control system according to claim 1, wherein
    the first image data is generated by a first imaging in the first frame period; and
    the second image data is generated by a last imaging in the first frame period.

10. The driving control system according to claim 1, wherein, of a plurality of image data included in the multiple-exposure image data, at least one image data other than the second image data is generated by imaging the target object with the first sensitivity.

11. The driving control system according to claim 1, wherein, of a plurality of image data included in the multiple-exposure image data, at least one image data other than the first image data is generated by imaging the target object with the second sensitivity.

12. The driving control system according to claim 1, wherein the processor detects a traveling direction of the moving body with respect to the target object, based on the first image data and the second image data.

13. The driving control system according to claim 1, wherein the processor detects a relative speed of the moving body with respect to the target object, based on the first image data and the second image data.

14. The driving control system according to claim 1, wherein the processor detects an acceleration of the moving body with respect to the target object, based on the first image data and the second image data.

15. The driving control system according to claim 1, wherein the processor switches, every predetermined period, between a first mode in which a traveling direction of the moving body with respect to the target object is detected and a second mode in which a relative speed of the moving body with respect to the target object is detected, based on the first image data and the second image data.

16. The driving control system according to claim 1, further comprising:
    a control device, wherein
    the target object is fixed to another moving body;
    the processor detects a change in a distance between the moving body and the target object, based on the first image data and the second image data; and
    when it is detecting that the distance has become smaller than a predetermined value, the control device generates a signal for causing a motion state of the moving body or the other moving body to change so that the distance increases.

17. The driving control system according to claim 1, further comprising:
    a control device, wherein
    the target object is fixed to another moving body; and
    the processor
        detects a change in a distance between the moving body and the target object, based on the first image data and the second image data, and generates a signal for causing a motion state of the moving body or the other moving body to change so that the distance decreases, when it is detected that the distance has become larger than a predetermined value.

18. The driving control system according to claim 1, wherein the processor detects a relative motion state of the moving body with respect to the target object, based on feature points of images of the target object in the first image data and the second image data.

19. The driving control system according to claim 3, wherein the first control device and the second control device are a common control device.

20. A driving control method, comprising:
imaging a target object with a first sensitivity in a first exposure period in a first frame period to generate a first image data, and imaging the target object with a second sensitivity in a second exposure period in the first frame period to generate a second image data, by using an imaging device installed on a moving body, to thereby generate a multiple-exposure image data including the first image data and the second image data, the second exposure period being different from the first exposure period, the second sensitivity being different from the first sensitivity;
detecting a relative motion state of the moving body with respect to the target object, based on the first image data and the second image data included in the multiple-exposure image data;
generating a signal for causing a motion state of the moving body to change, based on the relative motion state of the moving body; and
causing the motion state of the moving body to change, based on the signal.

21. A driving control method, comprising:
imaging a target object fixed to another moving body with a first sensitivity in a first exposure period in a first frame period to generate a first image data, and imaging the target object with a second sensitivity in a second exposure period in the first frame period to generate a second image data, by using an imaging device installed on a moving body, to thereby generate a multiple-exposure image data including the first image data and the second image data, the second exposure period being different from the first exposure period, the second sensitivity being different from the first sensitivity;
detecting a relative motion state of the moving body with respect to the target object, based on the first image data and the second image data included in the multiple-exposure image data;
generating a signal for causing a motion state of the other moving body to change, based on the relative motion state of the moving body; and
causing the motion state of the other moving body to change, based on the signal.

* * * * *